US007858049B2

(12) United States Patent
Smith et al.

(10) Patent No.: US 7,858,049 B2
(45) Date of Patent: Dec. 28, 2010

(54) APPARATUS AND METHODS FOR PARALLEL PROCESSING OF MULTIPLE REACTION MIXTURES

(75) Inventors: Matthew F. Smith, San Jose, CA (US); John F. Varni, Los Gatos, CA (US); G. Cameron Dales, Saratoga, CA (US); Trevor G. Frank, Fremont, CA (US); Rakesh Jain, Sunnyvale, CA (US); Lynn Van Erden, Livermore, CA (US)

(73) Assignee: Freeslate, Inc., Sunnyvale, CA (US)

( * ) Notice: Subject to any disclaimer, the term of this patent is extended or adjusted under 35 U.S.C. 154(b) by 237 days.

(21) Appl. No.: 11/961,326

(22) Filed: Dec. 20, 2007

(65) Prior Publication Data
US 2008/0138260 A1 Jun. 12, 2008

Related U.S. Application Data

(62) Division of application No. 10/060,075, filed on Jan. 28, 2002, now Pat. No. 7,335,513.

(60) Provisional application No. 60/264,489, filed on Jan. 26, 2001.

(51) Int. Cl.
*B01J 19/00* (2006.01)
(52) U.S. Cl. ...................................................... 422/130
(58) Field of Classification Search .................. None
See application file for complete search history.

(56) References Cited
U.S. PATENT DOCUMENTS

| 2,217,602 | A | 10/1940 | Smith |
| 2,409,979 | A | 10/1946 | Huber |
| 2,512,568 | A | 6/1950 | Saffir |
| 2,634,726 | A | 4/1953 | Hanson |
| 2,697,438 | A | 12/1954 | Hickey |
| 2,717,599 | A | 9/1955 | Huber |
| 2,746,454 | A | 5/1956 | Sorensen |
| 2,916,057 | A | 12/1959 | Carle et al. |
| 3,186,408 | A | 6/1965 | Jacob |

(Continued)

FOREIGN PATENT DOCUMENTS

DE    19749557 A1    5/1999

(Continued)

OTHER PUBLICATIONS

Cork et al., "Further Development of a Versatile Microscale Automated Workstation for Parallel Adaptive Experimentation," Laboratory Robotics and Automation, 1999, pp. 217-223, vol. 11, No. 4, VCH Publishers, New York, U.S.

(Continued)

*Primary Examiner*—Walter D Griffin
*Assistant Examiner*—Timothy Cleveland
(74) *Attorney, Agent, or Firm*—Senniger Powers LLP

(57) ABSTRACT

A parallel reactor system including a reactor and vessels in the reactor for holding reaction mixtures, and a cannula for introducing fluid reaction material into the vessels. A robot system is operable to insert the cannula into cannula passages in the reactor for delivery of reaction materials, including condensed gases, to respective vessels, and to withdraw the cannula from the cannula passages after delivery. Related methods are also disclosed.

23 Claims, 32 Drawing Sheets

U.S. PATENT DOCUMENTS

| | | | |
|---|---|---|---|
| 3,390,678 A | 7/1968 | Bradley et al. | |
| 3,683,977 A | 8/1972 | Crowe et al. | |
| 3,687,920 A * | 8/1972 | Johnson | 422/131 |
| 3,739,779 A | 6/1973 | Pfleger | |
| 3,859,807 A | 1/1975 | Benedict et al. | |
| 3,869,068 A | 3/1975 | Chen | |
| 3,924,617 A | 12/1975 | Ferro | |
| 4,000,976 A | 1/1977 | Kramer et al. | |
| 4,167,236 A * | 9/1979 | Taubenmann | 422/133 |
| 4,343,766 A | 8/1982 | Sisti et al. | |
| 4,422,151 A | 12/1983 | Gilson | |
| 4,499,053 A | 2/1985 | Jones | |
| 4,526,046 A | 7/1985 | Oberli | |
| 4,736,638 A | 4/1988 | Okawa et al. | |
| 4,795,445 A | 1/1989 | Jensen | |
| 4,842,585 A | 6/1989 | Witt | |
| 4,907,158 A | 3/1990 | Kettler et al. | |
| 4,927,603 A | 5/1990 | Fischer et al. | |
| 4,954,149 A | 9/1990 | Fullemann | |
| 5,017,299 A | 5/1991 | Gutierrez | |
| 5,100,390 A | 3/1992 | Lubeck et al. | |
| 5,207,658 A | 5/1993 | Rosen et al. | |
| 5,295,980 A | 3/1994 | Ersek | |
| 5,380,495 A | 1/1995 | Chang et al. | |
| 5,515,871 A | 5/1996 | Bittner et al. | |
| 5,681,799 A | 10/1997 | Song | |
| 5,746,982 A | 5/1998 | Saneii et al. | |
| 5,747,708 A | 5/1998 | Weiberth | |
| 5,976,470 A | 11/1999 | Maiefski et al. | |
| 6,245,133 B1 | 6/2001 | Bourgeois | |
| 6,306,658 B1 | 10/2001 | Turner et al. | |
| 6,913,934 B2 | 7/2005 | Dales et al. | |

FOREIGN PATENT DOCUMENTS

| | | |
|---|---|---|
| WO | 9633805 A2 | 10/1996 |
| WO | 9951980 A2 | 10/1999 |
| WO | 0009255 A2 | 2/2000 |
| WO | 0136087 A1 | 5/2001 |

OTHER PUBLICATIONS

PCT International Search Report for International Application No. PCT/US02/02617, dated Nov. 25, 2002, 9 Pages Annex to Form PCT/ISA/206, Communication Relating to the Results of the Partial International Search Report for International Application No. PCT/US02/02617, 2 Pages.

* cited by examiner

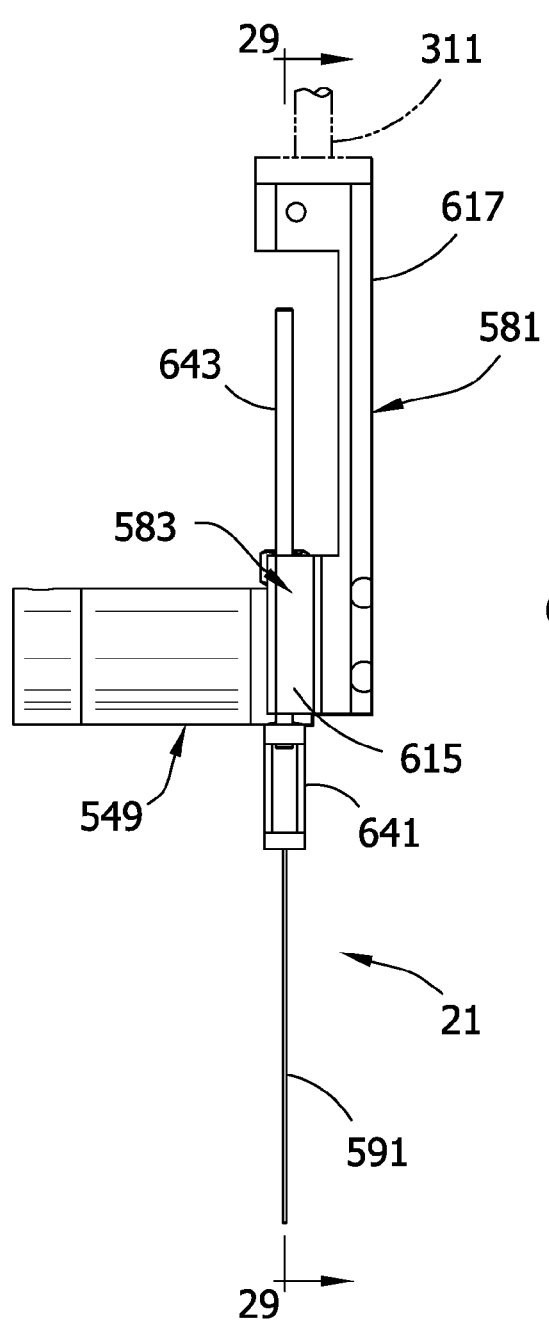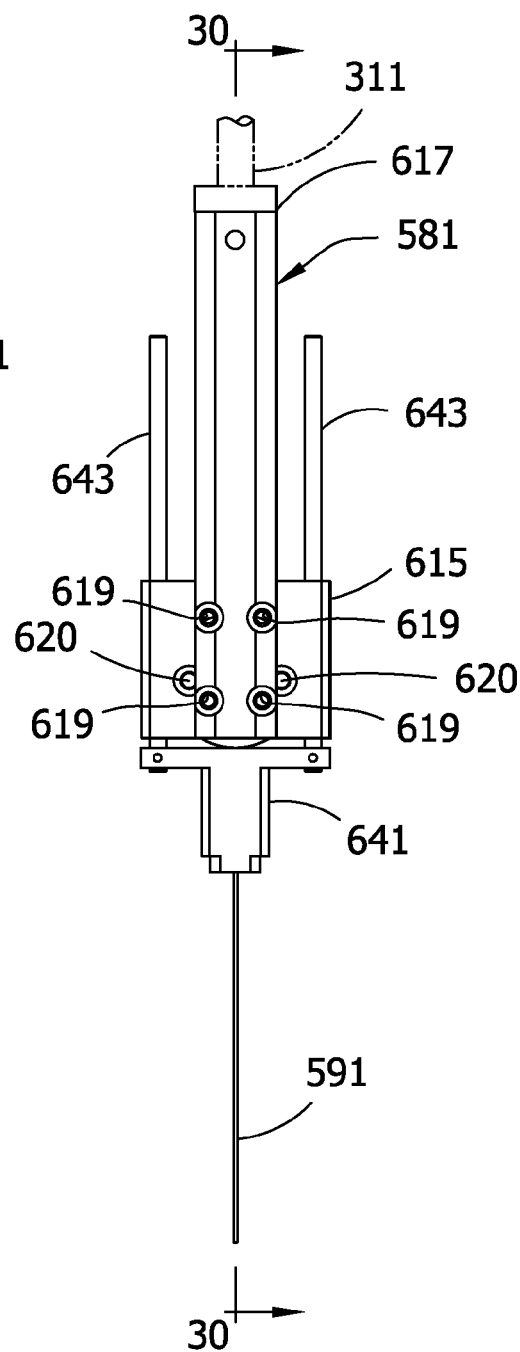

APPARATUS AND METHODS FOR PARALLEL PROCESSING OF MULTIPLE REACTION MIXTURES

CROSS-REFERENCE TO RELATED APPLICATIONS

This application is a divisional of U.S. patent application Ser. No. 10/060,075, filed Jan. 28, 2002, which claims the benefit of U.S. Provisional Application Ser. No. 60/264,489, filed Jan. 26, 2001, the disclosures of which are incorporated herein by reference.

BACKGROUND OF THE INVENTION

The present invention relates generally to parallel reactors, and in particular, to parallel research reactors suitable for use in a combinatorial (i.e., high-throughput) science research program in which chemical reactions are conducted simultaneously using small volumes of reaction materials to efficiently and economically screen large libraries of chemical materials.

Parallel reactors of this type are disclosed in co-owned International Application No. PCT/US99/18358, filed Aug. 12, 1999 by Turner et al., entitled Parallel Reactor with Internal Sensing and Method of Using Same, published Feb. 24, 2000 (International Publication No. WO 00/09255), which is incorporated herein by reference for all purposes. This PCT application claims priority from the following co-owned U.S. applications bearing the same title, all of which are also incorporated by reference for all purposes: U.S. application Ser. No. 09/211,982, filed Dec. 14, 1998 by Turner et al., now U.S. Pat. No. 6,306,658, issued Oct. 23, 2001; U.S. Ser. No. 09/177,170, filed Oct. 22, 1998 by Dales et al., now U.S. Pat. No. 6,548,026, issued Apr. 15, 2003; and U.S. provisional application Ser. No. 60/096,603, filed Aug. 13, 1998 by Dales et al. Parallel reactors of the type to which the present invention relates are also disclosed in co-owned U.S. application Ser. No. 09/548,848, filed Apr. 13, 2000 by Turner et al., now U.S. Pat. No. 6,455,316, issued Sep. 24, 2002, entitled Parallel Reactor with Internal Sensing and Method of Using Same, the U.S. national application based on the aforementioned PCT application; U.S. application Ser. No. 09/239,223, filed Jan. 29, 1999 by Wang et al., now U.S. Pat. No. 6,489,168, issued Dec. 3, 2002, entitled Analysis and Control of Parallel Chemical Reactions; and U.S. application Ser. No. 09/873,176, filed Jun. 1, 2001 by Nielsen et al., now U.S. Pat. No. 5,994,827, issued Feb. 7, 2006, entitled Parallel Semi-continuous or Continuous Stirred Reactors, which claims the benefit of U.S. provisional application Ser. No. 60/209,142, filed Jun. 3, 2000, and Ser. No. 60/255,716, filed Dec. 14, 2000 by Nielsen et al., bearing the same title, all of which are hereby incorporated by reference for all purposes. These applications disclose a number of embodiments for parallel research reactors suitable for use, for example, in combinatorial chemistry applications such as polymer research and catalyst research.

However, these embodiments are not well suited for introducing precise, reproducible amounts of low boiling reaction materials (i.e., substances having a boiling point no greater than about 25° C. at a pressure of one atmosphere) into the reaction vessels of the reactor. This is because such materials are in the gas phase at typical ambient temperature and pressure conditions. In order to better control the quantity of low boiling reaction materials introduced into the vessels of a parallel reactor, it would be desirable to deliver such substances in a condensed, liquid phase form to the reaction vessels of the reactor. However, previous parallel reactor systems are lacking in this capability. There is a need, therefore, for a system capable of handling such materials.

The present invention is also generally related to systems for effecting the transfer of fluid materials, particularly low boiling reaction materials in the form of liquids, to the reaction vessels of a parallel reactor system. Such fluid transfer systems include robotic fluid transfer systems of the type comprising a cannula for holding fluid material, and a robot system for transporting the cannula to a fluid transfer location.

SUMMARY OF THE INVENTION

In view of the foregoing, the objectives of this invention include the provision of a parallel reactor and related methods which overcome deficiencies of known parallel reactors, especially parallel research reactors and methods; the provision of such a reactor and methods which provide for the delivery of precise quantities of reaction materials to the reaction vessels of a parallel reactor, particularly the delivery of precise quantities of liquids having boiling points below ambient temperature at ambient pressure conditions (i.e., materials which would normally be in gaseous phase at ambient conditions), preferably without the need to cool the reactor to extreme temperatures; the provision of such a reactor and methods which provide for the delivery of reaction materials under pressure and/or temperature to one or more reaction vessels of the reactor; and the provision of certain consumables (cannulas and vessels) useful in the parallel reactor and methods of this invention.

In general, the present invention is directed to a method of delivering a low boiling reaction material to a reactor comprising a reaction vessel, a passage communicating with the vessel and a sealing mechanism in the passage. The method comprises pressurizing the reaction vessel and inserting a cannula of a condensate transfer system into the passage of the reactor to a position past the sealing mechanism. The condensate transfer system comprises a source of the low boiling reaction material and a flow path for the low boiling reaction material from the source to the cannula. Low boiling reaction material comprising liquid phase condensate is introduced into the cannula through the flow path and the liquid phase condensate of the low boiling reaction material is delivered from the cannula into the reaction vessel.

In another aspect, the present invention provides a method of delivering a low boiling reaction material to a plurality of vessels in a reactor that has, for each vessel, a passage communicating with the vessel and a sealing mechanism in the passage. The method comprises (a) providing a condensate transfer system comprising a source of the low boiling reaction material, a cannula and a flow path for the low boiling reaction material from the source to the cannula, (b) cooling the low boiling reaction material in at least a portion of the flow path, (c) pressurizing the reaction vessels, (d) inserting the cannula into a first of the passages in the reactor to a position past the sealing mechanism, (e) introducing the low boiling reaction material into the cannula through the flow path, the low boiling reaction material introduced into the cannula comprising liquid phase condensate, (f) delivering the liquid phase condensate of the low boiling reaction material from the cannula into the reaction vessel, (g) withdrawing the cannula from the passage, (h) sealing the passage upon withdrawal of the cannula from the passage, and (i) repeating steps (d) through (h) for a second passage and a second vessel of the plurality of vessels.

In accordance with another embodiment, the method comprises providing a condensate transfer system comprising a source of the low boiling reaction material, a cannula and a flow path for the low boiling reaction material from the source to the cannula, (b) pressurizing the flow path such that the low boiling reaction material in the flow path comprises liquid phase condensate, (c) pressurizing the reaction vessels, (d) inserting the cannula into a first of the passages in the reactor to a position past the sealing mechanism, (e) introducing the low boiling reaction material into the cannula through the flow path, the low boiling reaction material introduced into the cannula comprising liquid phase condensate, (f) delivering the liquid phase condensate of the low boiling reaction material from the cannula into the reaction vessel, (g) withdrawing the cannula from the passage, (h) sealing the passage upon withdrawal of the cannula from the passage, and (i) repeating steps (d) through (h) for a second passage and a second vessel of the plurality of vessels.

The present invention is also directed to an apparatus for parallel processing of multiple reaction mixtures. The apparatus comprises a reactor having an exterior surface and pressurized vessels for holding the reaction mixtures comprising a liquid reaction material condensate delivered to the vessels, the reaction mixtures in the vessels being maintained at a pressure in excess of the vapor pressure of the condensate delivered to the vessels. The apparatus includes a cannula having an inlet port and an outlet port. Cannula passages in the reactor extend between the aforementioned exterior surface of the reactor and the vessels. A sealing mechanism is provided in each cannula passage. In accordance with this aspect of the invention, a delivery system delivers the condensate to the inlet port of the cannula, and a robot system operates to insert the cannula into each cannula passage to a point past the sealing mechanism for the delivery of the condensate from the outlet port of the cannula to a respective vessel. The robot system is further operable to withdraw the cannula from the passage after the delivery, the sealing mechanism being adapted to seal the cannula passage upon withdrawal of the cannula from the passage.

In another aspect, apparatus of the present invention the aforementioned delivery system functions to deliver condensed gas under pressure to the inlet port of the cannula. The delivery system comprises a source of condensed gas, a flow path from the source to the inlet port of the cannula, and a control valve in the flow path adjacent the cannula for controlling flow through the flow path to the inlet port. A robot system carrying the cannula is operable to insert the cannula into each cannula passage for the delivery of the condensed gas to a respective vessel, and to withdraw the cannula from the passage after the delivery.

In another aspect, apparatus for transfer of a condensed gas to or from a reaction vessel is provided. The apparatus comprises a reactor having an exterior surface, a pressurizable vessel within the exterior surface of the reactor for holding a reaction mixture comprising a liquid reaction material condensate of a low boiling reaction material, and a cannula having an inlet port and an outlet port. A cannula passage extends between the exterior surface of the reactor and the vessel and there is a sealing mechanism in the cannula passage. The apparatus further comprises a condensate transfer system for transferring the condensate to or from the inlet port of the cannula for delivery or withdrawal of the condensate thereto, respectively. The condensate transfer system is configured and arranged to maintain the condensate substantially in its condensed liquid phase while residing in the condensate transfer system. Lastly, a robot system is operable to insert the cannula into the cannula passage to a point past the sealing mechanism for the delivery of the condensate from the outlet port of the cannula to the vessel, and additionally, or alternatively, for the withdrawal of the condensate to the outlet port of the cannula from the vessel, and operable to withdraw the cannula from the passage after the delivery or withdrawal. The sealing mechanism is adapted to seal the cannula passage upon withdrawal of the cannula from the passage.

In a further aspect of the present invention, an apparatus for parallel processing of multiple reaction mixtures is provided. The apparatus comprises a reactor having an exterior surface and vessels within the reactor for holding the reaction mixtures comprising a low boiling reaction material delivered to the vessels in the form of a liquid phase condensate. The vessels and reactor are adapted to maintain the reaction mixtures in the vessels at a pressure in excess of the vapor pressure of the condensate delivered to the vessels. The apparatus further comprises a condensate delivery system comprising a source of the low boiling reaction material, a cannula having an inlet port and an outlet port, and a flow path for the low boiling reaction material from the source to the inlet port of the cannula. The condensate delivery system is adapted for delivering the liquid phase condensate of the low boiling reaction material to the reaction vessels through the cannula. Cannula passages in the reactor extend between the exterior surface of the reactor and the vessels and there is a sealing mechanism in each cannula passage. A robot system is operable to insert the cannula into the cannula passages to a point past the sealing mechanism for the delivery of the condensate from the cannula to a respective vessel, and to withdraw the cannula from the passages after the delivery. The sealing mechanism is adapted to seal the cannula passage upon withdrawal of the cannula from the passage.

In a further embodiment the apparatus for parallel processing of multiple reaction mixtures comprises a reactor having an exterior surface, pressurizable vessels within the exterior surface of the reactor for holding reaction mixtures comprising a liquid reaction material condensate of a low boiling reaction material, and a condensate transfer system comprising a cannula having an inlet port and an outlet port. The condensate transfer system is for transferring the condensate to or from the inlet port of the cannula for delivery or withdrawal of the condensate thereto, respectively, and is configured and arranged to maintain the condensate substantially in its condensed liquid phase while residing in the condensate transfer system. Cannula passages in the reactor extend between the exterior surface of the reactor and the vessels and there is a sealing mechanism in each cannula passage. A robot system is operable to insert the cannula into one or more of the cannula passages to a point past the sealing mechanism for the delivery of the condensate from the outlet port of the cannula to a vessel, and additionally, or alternatively, for the withdrawal of the condensate to the outlet port of the cannula from a vessel, and operable to withdraw the cannula from the passage after the delivery or withdrawal. The sealing mechanism is adapted to seal the cannula passage upon withdrawal of the cannula from the passage.

In a further embodiment, the apparatus for parallel processing of multiple reaction mixtures comprises a reactor having an exterior surface and pressurizable vessels within the exterior surface of the reactor for holding reaction mixtures comprising a liquid reaction material condensate of a low boiling reaction material. The apparatus further comprises a cannula having an inlet port and an outlet port and cannula passages in the reactor extending between the exterior surface of the reactor and the vessels. There is a sealing mechanism in each cannula passage. A condensate delivery system is provided for delivering the condensate to the inlet port of the cannula. The condensate delivery system is configured and arranged to maintain the condensate substantially in a condensed liquid phase while residing in the condensate delivery system. A robot system is operable to insert the cannula into a cannula passage to a point past the sealing mechanism for the delivery of the condensate from the outlet port of the cannula to a vessel, and to withdraw the cannula from the passage after the delivery. The sealing mechanism is adapted to seal the cannula passage upon withdrawal of the cannula from the passage.

In a still further embodiment, the apparatus for parallel processing of multiple reaction mixtures comprises a reactor having an exterior surface and pressurizable vessels within the exterior surface of the reactor for holding reaction mixtures comprising a liquid reaction material condensate of a low boiling reaction material delivered to the vessels. The vessels and reactor are adapted to maintain the reaction mixtures in the vessels at a pressure at least as great as the vapor pressure of the condensate delivered to the vessels. The apparatus further comprises a cannula having an inlet port and an outlet port and cannula passages in the reactor extending between the exterior surface of the reactor and the vessels. There is a a sealing mechanism in each cannula passage. A condensate delivery system is provided for delivering the condensate to the inlet port of the cannula. The condensate delivery system is configured and arranged to pressurize the condensate to maintain the condensate at a pressure at least as great as the vapor pressure of the condensate, such that the condensate is maintained substantially in its condensed liquid state while residing in the condensate delivery system. A robot system is operable to insert the cannula into a cannula passage to a point past the sealing mechanism for the delivery of the condensate from the outlet port of the cannula to a respective vessel, and to withdraw the cannula from the passage after the delivery. The sealing mechanism is adapted to seal the cannula passage upon withdrawal of the cannula from the passage.

In yet another aspect, the present invention is directed to a cannula for delivering fluid under pressure to reaction vessels for the parallel processing of such materials. The cannula comprises a long straight thin needle formed from metal tubing. The needle has a longitudinal axis, a proximal end, a distal end, an inlet port adjacent its proximal end, an outlet port adjacent its distal end, and an axial passage connecting the inlet and outlet ports. A metal connector connects the needle to a needle support for supporting the needle in a fixed position relative to the support. The connector has a passage therein with an inlet end adapted for fluid communication with the fluid under pressure and an outlet end. The needle is attached at its proximal end to the connector with the outlet end of the passage in the connector in fluid communication with the inlet end of the needle passage. The metal connector has external threads for threaded engagement with the support to releasably connect the cannula to the needle support.

In a still further aspect, the present invention is directed to a fluid delivery system for delivering fluid under pressure from a fluid flow line to reaction vessels of parallel reactor. The system includes a cannula comprising a needle having a proximal end, an inlet port adjacent its proximal end, an outlet port, and an axial passage connecting the inlet and outlet ports. A robot system is provided for moving the cannula between the reaction vessels. The cannula is mounted on the robot system. A valve for controlling fluid flow through the fluid flow line to the cannula comprises a valve body carried by the mount. Passaging is provided in the valve body in fluid communication with the fluid flow line and the inlet port in the needle, and there is a valve member for selectively opening and closing the passaging.

Lastly, the present invention also provides a fluid delivery assembly adapted to be mounted on a robot system for delivering fluid under pressure from a fluid flow line to reaction vessels of parallel reactor. The assembly comprises a needle, a valve and a connector. The needle has a proximal end, an inlet port adjacent its proximal end, an outlet port, and an axial passage connecting the inlet and outlet ports. The valve is for controlling fluid flow through the fluid flow line to the needle and comprises a valve body adapted to be mounted on the robot system. Passaging is provided in the valve body in fluid communication with the fluid flow line and the inlet port in the needle. A valve member selectively opens and closes the passaging. The connector releasably connects the needle to the valve body.

Other objects and features will be in part apparent and in part pointed out hereinafter.

BRIEF DESCRIPTION OF THE DRAWINGS

FIG. 27 is a side elevation of a mounted cannula and valve assembly of the condensate delivery system;

FIG. 28 is a rear elevation of the assembly of FIG. 27;

Corresponding parts are designated by corresponding references numbers throughout the drawings.

DESCRIPTION OF PREFERRED EMBODIMENTS

Figure 1:
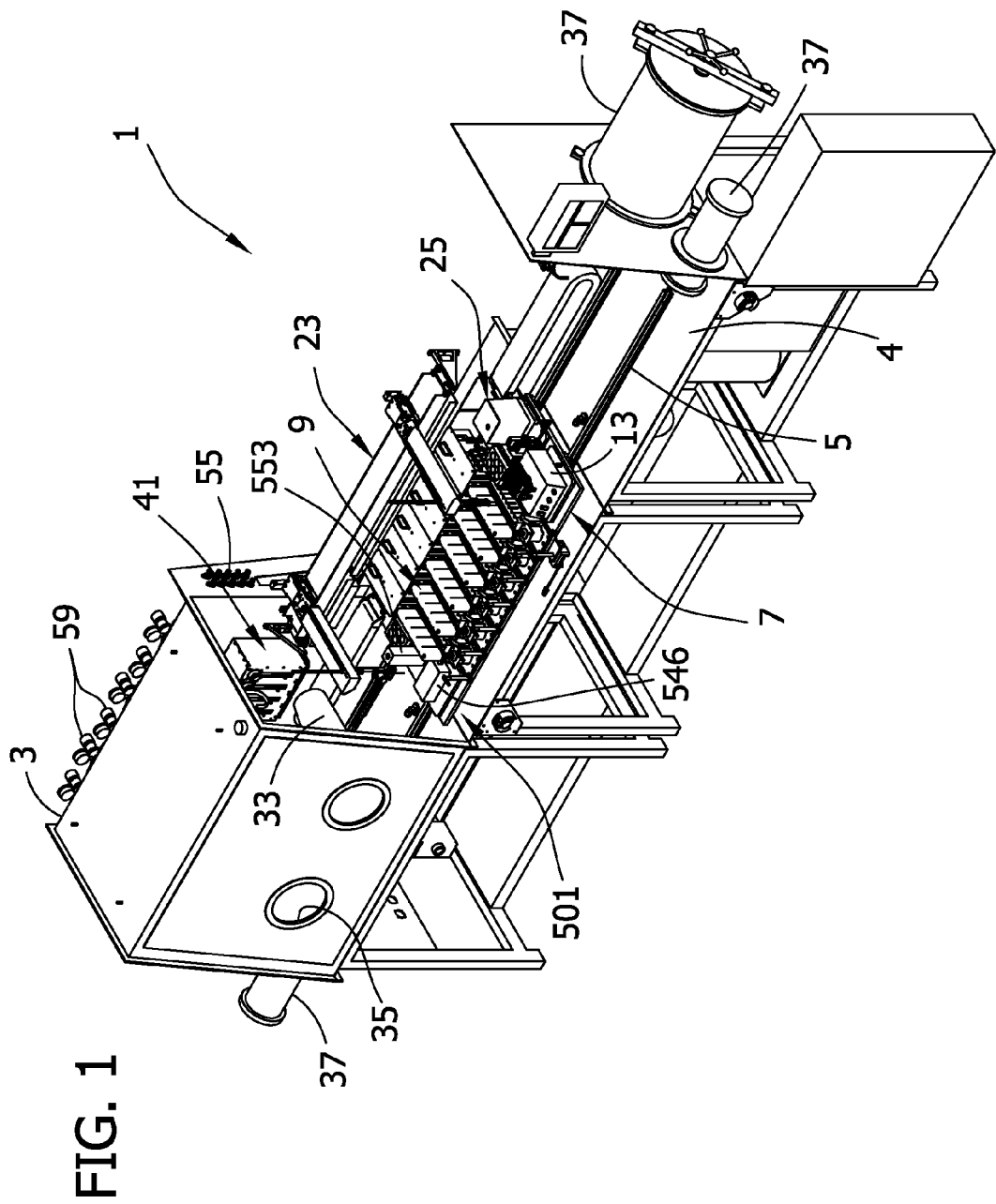
FIG. 1 is a perspective of a parallel reactor of the present invention.
Figure 2:
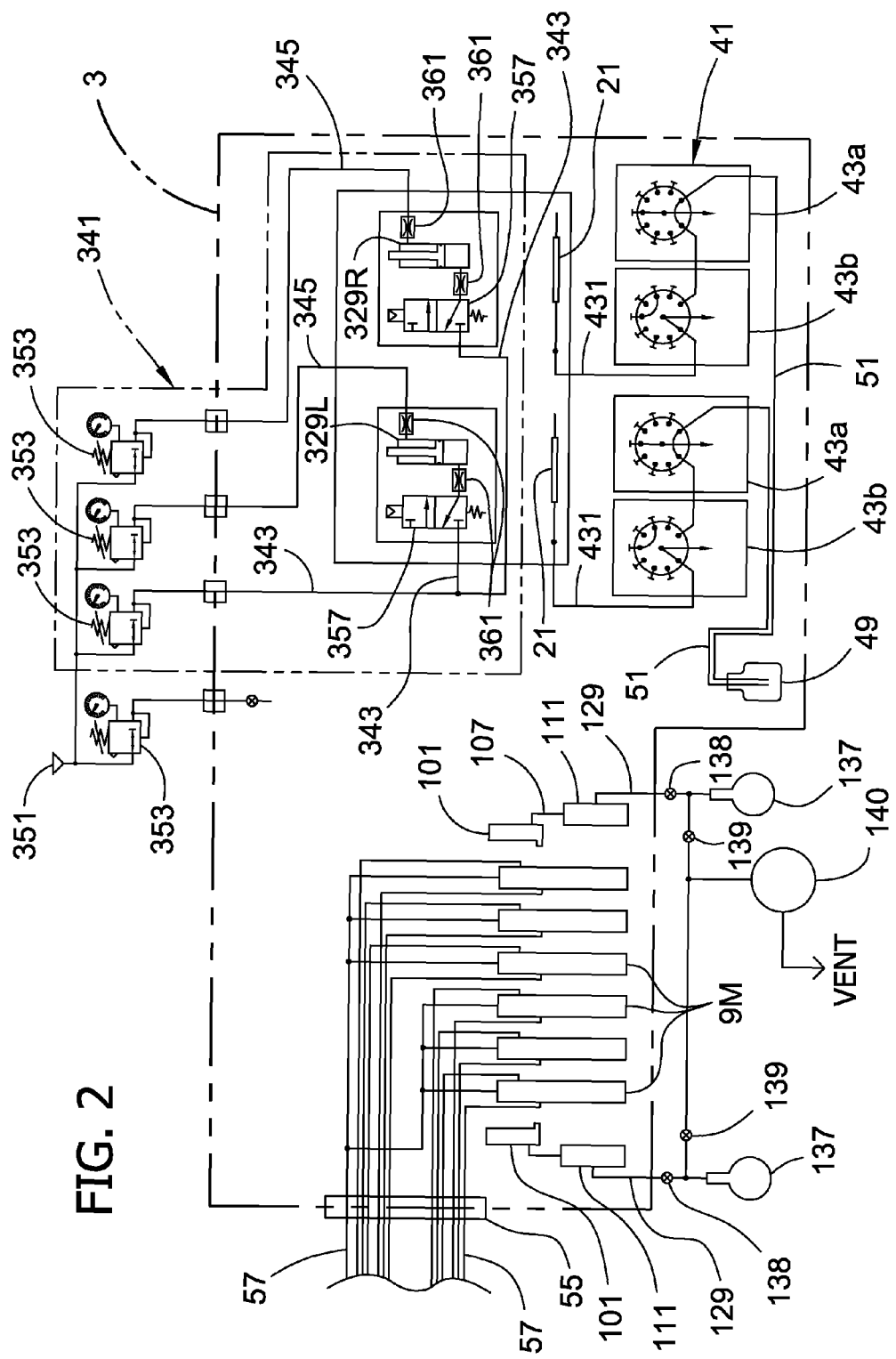
FIG. 2 is a schematic diagram showing key components of the reactor for delivering a liquid to a number of reactor modules.
Figure 3:
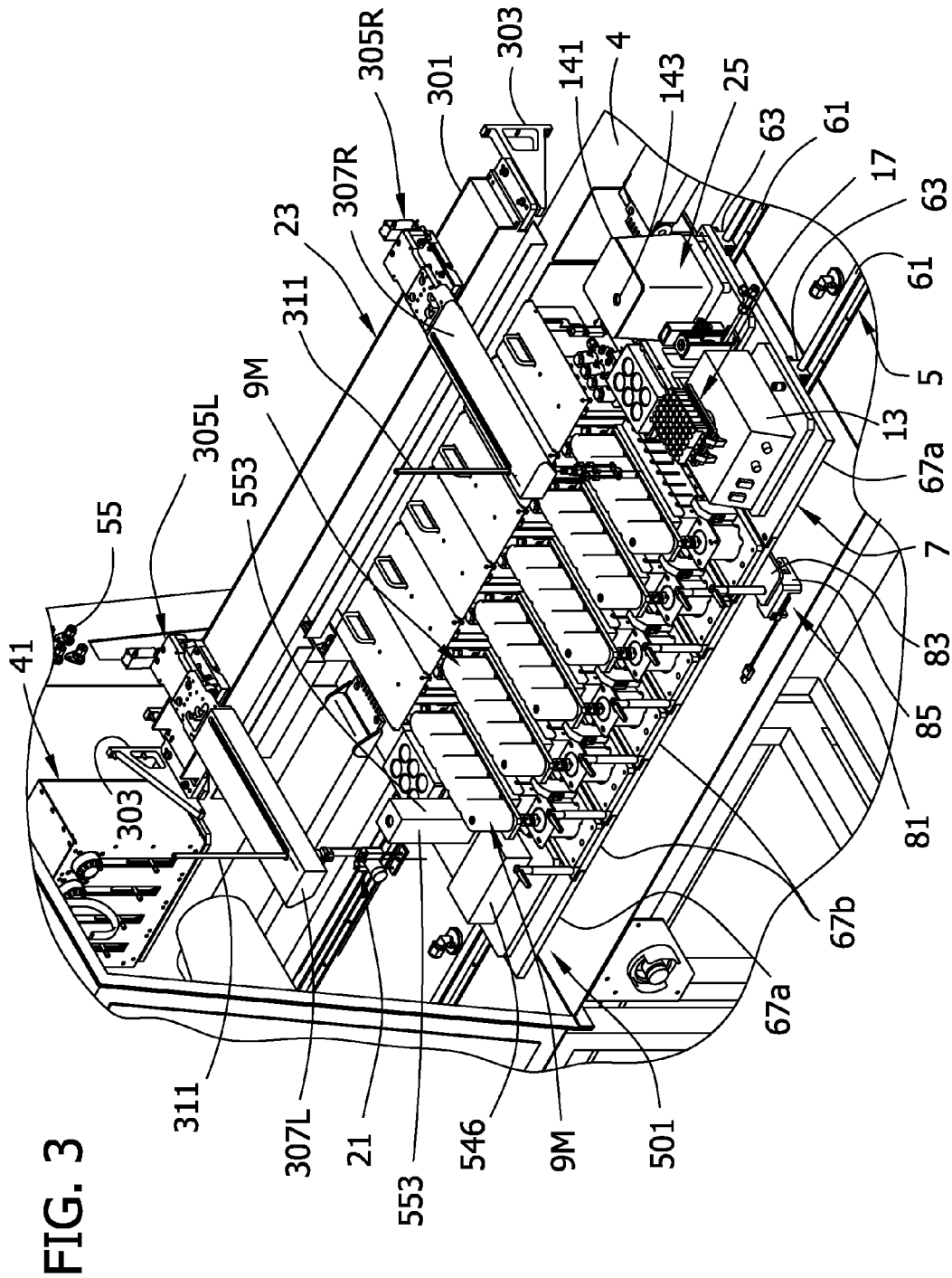
FIG. 3 is an enlarged portion of FIG. 1 showing, among other things, a modular reactor and a robot system for servicing the reactor.

Referring now to the drawings, and more particularly to FIGS. 1-3, apparatus for parallel processing of multiple reaction mixtures is indicated in its entirety by the reference numeral 1. As used herein, in the context of methodology, the term "parallel" means that two or more of the multiple reaction mixtures are processed either simultaneously or at least during overlapping time periods. In the context of apparatus, the term parallel means that the apparatus is integrated structurally or through software (e.g., control software) and is adapted for effecting reactions in two or more reaction vessels simultaneously or at least during overlapping time periods. The apparatus 1, which may be referred to as a parallel reactor system, is similar in certain respects to the parallel reactor system described in the aforementioned publications and applications, including International Application No. PCT/US99/18358 (International Publication No. WO 00/09255).

In general, the apparatus 1 comprises an enclosure 3 having a floor 4, a rail system generally designated 5 on the floor 4, and a carriage generally designated 7 slidable on the rail system. A modular reactor 9 comprising a number of reactor modules, each generally designated 9M and having two or more reaction vessels therein, are mounted side-by-side on the carriage. Six such reactor modules 9M are shown in FIGS. 1-3, but this number may vary from one to six or more. Further, the reactor 9 need not be modular, but rather it could be a single monolithic reactor having multiple reaction vessels therein. Furthermore, aspects of the present invention could be applied to a reactor matrix comprising multiple separate reaction vessels or even to a reactor comprising a single reaction vessel. The reactor is preferably a research reactor, but could also be a relatively small-volume production reactor. The apparatus 1 further includes a pair of cannulas, each generally designated 21, and a four-axis robot system, generally indicated at 23, for moving the cannulas into position for delivery of liquid reaction materials to the reaction vessels within the reactor modules 9M. Alternatively, a single cannula or more than two cannulas could be used to service the reactor modules.

In the preferred embodiment, the robot system 23, carriage 7, rail system 5 and various components on the carriage are all enclosed by the enclosure 3, which is a tubular enclosure supported by legs. (For convenience of illustrating the equipment inside the enclosure, certain portions of the top and side walls of the enclosure are omitted in FIGS. 1 and 3.) The enclosure is preferably what is referred to as a "dry box" or a "glove box" having gloves 33 affixed to the periphery of openings 35 in the side walls of the enclosure to allow an operator to manipulate items inside the enclosure and reduce possible contamination. The enclosure 3 can be gas-tight or filled with a pressurized inert gas (e.g., argon or nitrogen). In either case, the environment is controlled to eliminate contaminants or other material which might interfere with the parallel reaction processes being conducted in the enclosure. Conventional antechambers (air locks) 37 on the enclosure provide access to the interior of the enclosure. Glove box enclosures suitable for use in the present invention are available from, among others, Vacuum Atmospheres Company of Hawthorne, Calif., and M. Braun Inc. of Newburyport, Mass. Other types of enclosures may also be used, such as a purge box which is movable between a non-enclosing position and an enclosing position and purged of contaminants with a pressurized inert gas.

The parallel reactor system 1 is adapted for delivery of low boiling reaction materials (e.g., reactants, solvents, diluents, etc.) to the reaction vessels within the reactor modules 9M in the form of liquid phase condensates. Components of a condensate delivery system, generally designated 501, are shown in FIGS. 1 and 3. By low boiling reaction materials, it is meant substances having a boiling point no greater than about 25° C. at a pressure of one atmosphere. Examples of such low boiling reaction materials include propylene, 1,3-butadiene, vinyl chloride and isobutylene used in polymerization reactions, as well as methyl chloride and isobutane. The condensate delivery system of the present invention is particularly suited for delivering liquid phase condensates of low boiling reaction materials having a boiling point no greater than about 0° C. at a pressure of one atmosphere and especially a boiling point of no greater than about −25° C. at a pressure of one atmosphere. The condensate delivery system will be described in detail below.

Figure 4:
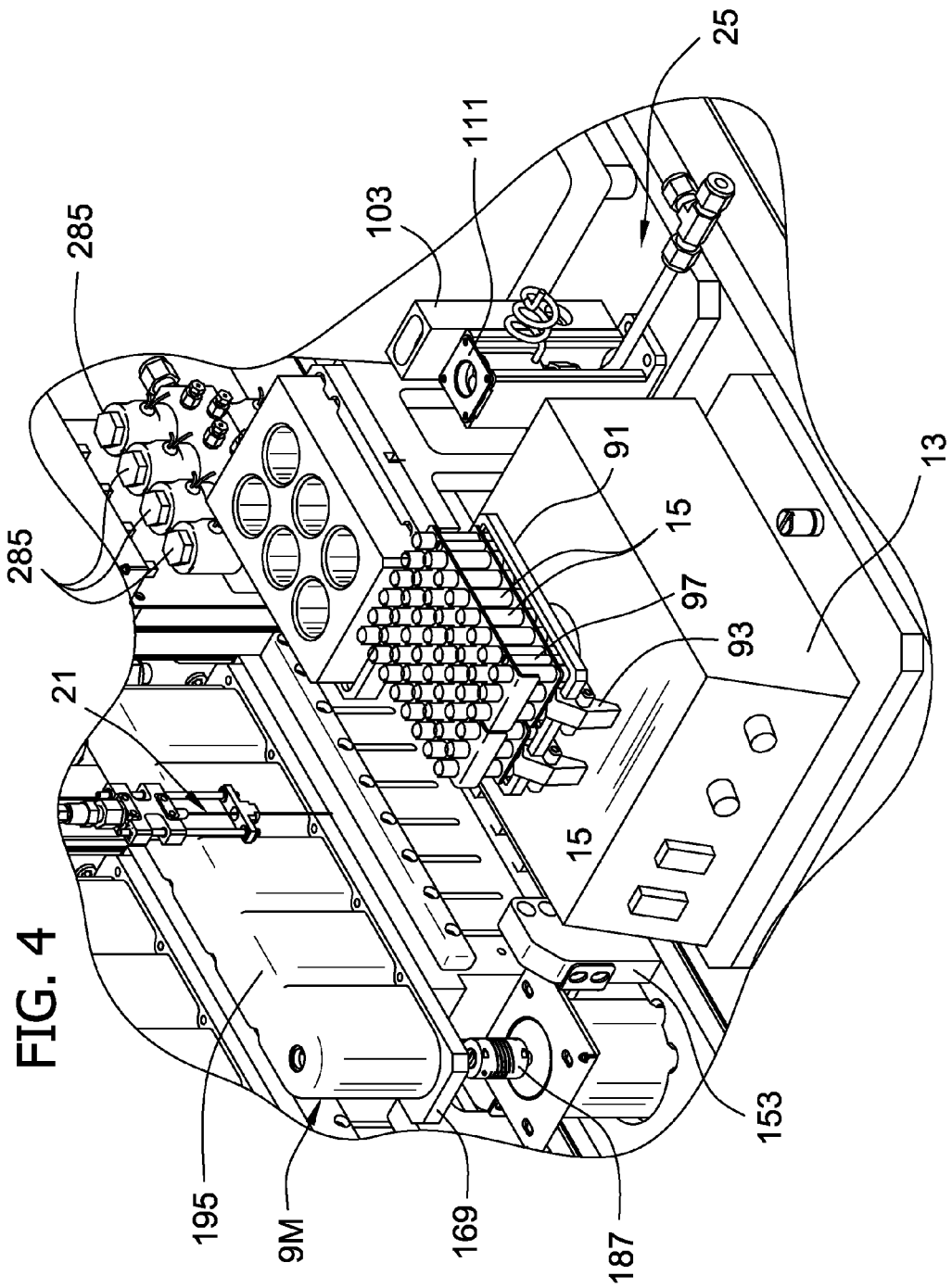
FIG. 4 is an enlarged portion of FIG. 3 showing a shaker and hot and ambient wash towers.

In addition to delivering condensates of low boiling reaction materials, the parallel reactor system 1 may also be adapted to deliver or transfer reaction materials to the reactor modules 9M that are in the liquid phase at typical ambient temperature and pressure conditions (e.g., about 25° C. and one atmosphere). For example, the apparatus may be adapted to aspirate a liquid reaction material into one of the cannulas 21 and then to deliver the materials from the cannula into the reactor modules 9M. Liquid reaction materials may be aspirated into the cannula 21 from mixing vials 15 held by rack 17 mounted on an orbital shaker 13 provided on the carriage 7 (FIG. 4). The liquid reaction materials may be in slurry form comprising solid particles, such as silica or alumina particles supporting a catalyst, suspended in a carrier fluid. A parallel reactor system adapted for delivering liquid reaction materials to the reactor in this manner is shown and described in co-owned U.S. application Ser. No. 10/040,988, filed Jan. 7, 2002 by Dales et al., now U.S. Pat. No. 6,913,934, issued Jul. 5, 2005, which is a continuation-in-part of U.S. application Ser. No. 09/772,101, filed Jan. 26, 2001 by Dales et al., now U.S. Pat. No. 6,759,014, issued Jul. 6, 2004, the entire disclosures of which are incorporated herein by reference for all purposes.

As shown in FIG. 4, vial rack 17 is releasably held in a frame 91 mounted in fixed position on shaker 13. Spring clamps, quick-acting detents 93 or other connectors on the frame 91 may be used for this purpose. The fit between the rack 17 and the frame 91 is a relatively close, tight fit so that the position of each vial in the rack is set for purposes of the computer-controlled robot system 23. The rack 17 itself is modular in design, comprising a plurality of horizontal panels 95 held in vertically spaced relation by spacers 97 fastened to the panels. The panels have vertically aligned openings therein for receiving and holding the vials. The modular nature of the construction facilitates different rack configurations, all of which can fit in the same frame 91. For example, the configuration of the rack can be readily changed to accommodate vials of different sizes, or different numbers of vials, or vials arranged in different arrays. Also, the use of relatively thin panels 95 (which may be stamped metal parts) and spacers reduces the weight of the assembly.

Also disposed within the enclosure 3 is suitable pumping equipment 41 for servicing the two cannulas 21. This equipment is of conventional design and may comprise, for example, positive displacement pumps, preferably adapted for small volume increments. Suitable pumping equipment 41 includes syringe pumps 43 comprising a pump and a syringe. The construction and operation of the syringe pumps 43 is conventional, such pumps being commercially available from Cavro Scientific Instruments of Sunnyvale, Calif., pump Part No. 730367 and syringe Part No. 730320. Accordingly, a detailed description of these syringe pumps is unnecessary.

If the apparatus 1 is to be adapted to aspirate and deliver to the reactor modules 9M reaction materials that are in the liquid phase at typical ambient temperature and pressure conditions, the pumping equipment 41 may suitably include four syringe pumps 43 as schematically depicted in FIG. 2. In this embodiment, one set of two syringe pumps 43 is available to service one cannula 21 and the other set of two syringe pumps 43 is available to service the other cannula 21. Preferably, one syringe pump 43a of each two-pump set is operable to pump a larger, but still relatively small, volume of liquid (e.g., 5 ml to 25 ml) and the other syringe pump 43b of the two-pump set is operable to pump a smaller volume (e.g., 100 µl to 1 ml). The two pumps of each two-pump set are connected to a supply 49 of working fluid (e.g., solvent) by a flow line 51. In such an embodiment, the syringe pumps are operable in two modes, the first being an intake mode to aspirate measured quantities of liquid reaction material into the cannulas 21, and the second being an output mode to pump measured volumes of working fluid to the cannulas 21 to force corresponding volumes of reaction material from the cannulas for delivery to the reactor modules 9M.

Generally speaking, the smaller volume syringe pump 43b is used to pump smaller volumes of fluid, and the larger volume syringe pump 43a is used to pump larger volumes of reaction materials. In the event fluid must be delivered under pressure to a reactor module 9M, as in the condensate delivery system 501 for low boiling reaction materials described below, the smaller volume syringe pump 43b is preferably used to pump measured volumes of reaction material to the cannula 21, since it is operable to supply fluids at pressures up to 500 psig or more.

The enclosure 3 is provided with fittings 55 for attachment of lines 57 which service the reactor modules. These lines 57 are typically used for the delivery of process gases (e.g., reactant and quenching gases) to the reactor modules 9M, as needed, and also to vent the modules, as will be described hereinafter. The gas lines 57 communicate with suitable sources of gas (not shown) under pressure. The pressure of the gas in the lines 57 is controlled by regulators indicated at 59 in FIG. 1.

Referring to FIG. 3, the rail system 5 comprises a pair of guide rails 61 (e.g., linear guide rails of the type available from Thomson Industries, Port Washington, N.Y.) mounted on the table. Slide bushings 63 mounted on the underside of the carriage allow the carriage 7 to slide back and forth on the rails.

The carriage 7 itself (FIGS. 3 and 5) comprises a plurality of interconnected carriage plates 67, including two end plates 67a carrying the orbital shakers 13, cleaning apparatus 25 and other components, and a plurality of intermediate plates 67b, each of which carries a single reactor module 9M. Adjacent carriage plates 67 are connected by rabbet joints 71 comprising overlapping recessed edge margins releasably secured in precise position relative to one another by quick-connect/disconnect devices 75, each of which extends down through aligned holes in the plates. The device may comprise, for example, a vertical shaft 77 having one or more detents (not shown) at its lower end spring-biased to an extended position for reception in corresponding recesses in the lower of the two overlapping edge margins (see FIG. 5), and a manually-operated button 79 at the upper end of the shaft for retracting the detents to allow the shaft to be withdrawn from the holes to disconnect the two carriage plates 67. Upon disconnection, the carriage plates 67 can be moved together as a unit or relative to one another on the rails 61 to facilitate maintenance and repair of the equipment on the carriage as well as to vary the number of carriage plates and reactor modules in the reactor matrix. The carriage 7 is held in a fixed, predetermined home position on the floor 4 by a "master" interlock 81 (similar to the quick connect/disconnect devices) connecting a rigid extension 83 projecting from the carriage to a stationary fixture 85 affixed to the floor (FIG. 3). In the preferred embodiment, disconnection of the "master" interlock 81 to disconnect the carriage 7 from the fixture 85 triggers a shut-off switch which prevents operation of the robot system 23 until the interlock is reinstalled to reconnect the carriage extension 83 to the fixture 85 at the home position. Such re-connection requires precise alignment of holes in the extension and the fixture, which in turn requires that all carriage plates 67 be properly connected and positioned relative to one another. Thus, the robot system 23 cannot be operated until the carriage plates 67 (and all of the components fixedly attached thereon) are precisely located on the floor 4.

In the event there is a need or desire to move, remove, and/or replace one or more of the reactor modules 9M, as during a maintenance procedure, the carriage extension 83 is disconnected from the fixture 85 on the table 3 by disconnecting the master locking device 81. This disconnection triggers a shut-off switch which renders the robot system 23 inoperable. Disconnection of device 81 allows all of the carriage plates 67 to be moved together as a unit along the rails 61. If desired, one or more of the other carriage plate locking devices 75 may be released to disconnect the appropriate carriage plates 67 from one another to allow the plates to be slidably moved relative to one another along the rails 61 and the reactor modules 9M to be separated for convenient service or rearrangement of the reactor matrix. After the modules are serviced and/or rearranged, the carriage plates 67 are reconnected and the carriage extension 83 reconnected to the table fixture 85 to render the robot operable.

Apparatus, generally designated 25, for cleaning the cannulas 21 is also provided on the carriage adjacent the orbital shaker 13. Referring again to FIG. 4, the cleaning apparatus 25 comprises a conventional wash tower 101 having a cavity or well 103 therein for receiving a cannula 21 to be washed and rinsed. Suitable cleaning solution (e.g., solvent) at ambient temperature may be pumped through the cannula to flush its interior surfaces. Solution exiting the cannula 21 is directed by the walls of the cavity up along the outside of the cannula to clean its exterior surfaces. Waste solution is directed to a drain 107 for disposal (FIG. 2). A wash tower 101 suitable for use in the system is available from Cavro Scientific Instruments of Sunnyvale, Calif., Model No. 727545.

Figure 6:
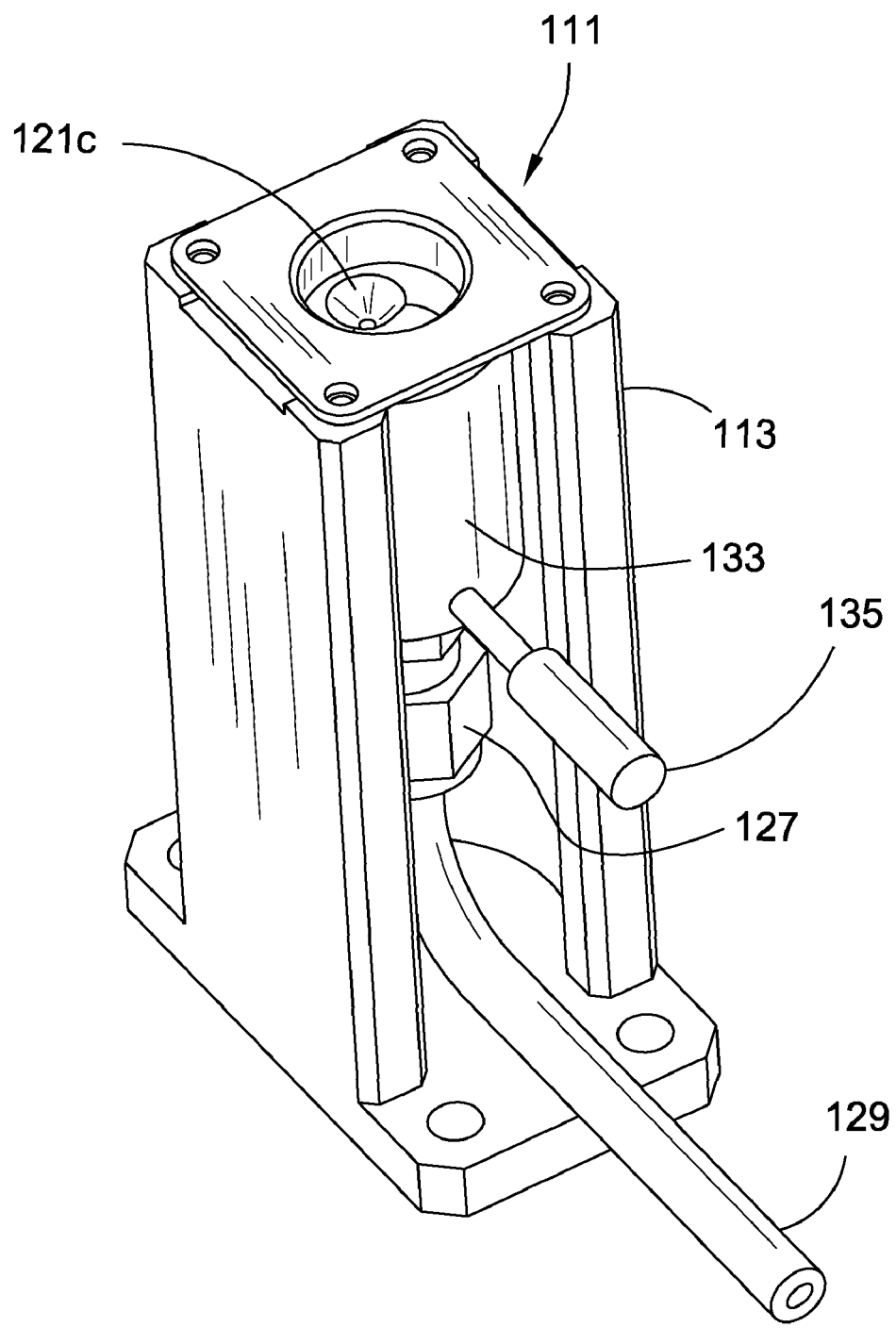
FIG. 6 is a perspective of a heated wash tower of the present invention.
Figure 7:
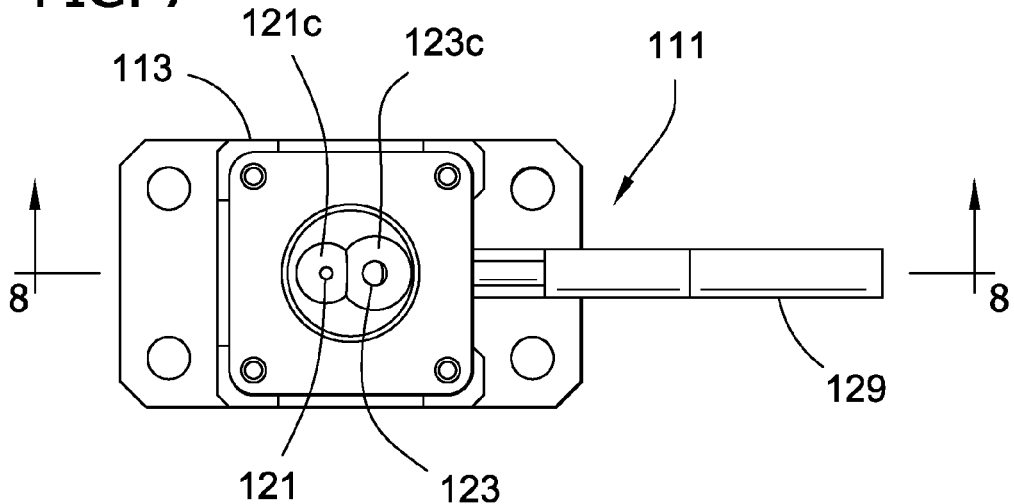
FIG. 7 is a top view of the heated wash tower.
Figure 8:
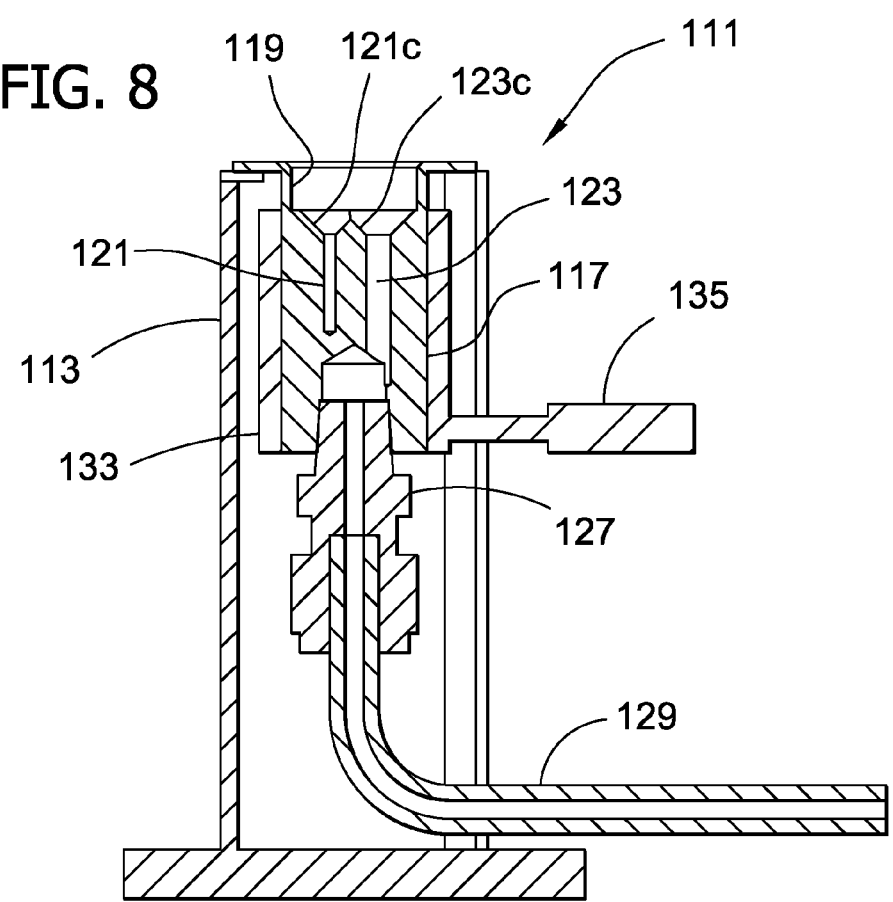
FIG. 8 is a vertical section on lines 8-8 of FIG. 7.

In the event there is a need for more aggressive washing of a cannula, as when slurry reaction materials containing small particulate solids (e.g., solution phase supported catalysts) that tend to adhere to process equipment are being delivered or transferred to the reactor modules 9M, the cleaning apparatus 25 may include an ultrasonic bath (not shown) and/or a separate heated wash tower generally indicated at 111. The construction of the heated wash tower is illustrated in FIGS. 6-8. As shown, the tower 111 comprises an upright generally channel-shaped housing 113 on a base 115 secured to an end carriage plate 67a, and a cylindric block 117 of metal supported within the housing having a flanged and recessed upper end 119 and two bores 121, 123 extending down into the block 117 from the recessed upper end 119. The first bore 121 forms a washing well and is relatively narrow in diameter, being only slightly larger in diameter (e.g., 0.035 in. (0.089 cm) larger) than the outside diameter of the needle of a cannula 21 to be washed. The second bore 123 is larger in diameter and functions as a drain. Intersecting countersinks 121c, 123c at the upper ends of the two bores 121, 123 provide for overflow of wash solution from the washing well 121 into the drain bore 123, the lower end of which is connected via a fitting 127 (e.g., available from Swagelok Company of Solon, Ohio). The cylindric block 117 of the wash tower 101 is surrounded by a jacket 133 containing resistance heating coils (not shown) connected to a source of electric power by a connection 135. The heating coils transfer heat to the cylindric block 117 to heat the block and wash solution in the washing well 121. The solution should be heated to a suitable temperature (e.g., about 170°-200° C.), sufficient to remove any coagulated reaction materials on the needle of the cannula 21. As shown in FIG. 2, the drain lines 107, 129 from the wash towers 101, 111 are connected to a suitable drain system including flasks 137 for collecting waste. Valves 138 in the waste lines can be closed to permit disconnection and emptying of the flasks 137. After reconnection of the flasks, valves 139 are opened to permit evacuation of any remaining vapor in the flasks by a means of a vacuum pump 140, following which valves 139 are closed and valves 138 opened to reestablish fluid communication between the flasks and their respective cleaning towers 101, 111 without contaminating the inert environment within the enclosure 3.

In the preferred embodiment, the cleaning apparatus 25 also includes an ultrasonic device 141 (FIG. 3) having a central recess 143 for receiving a cannula 21. This device generates ultrasonic waves which mechanically vibrate the cannula as it is flushed with solvent to provide an additional mechanism, if needed, for removing slurry particles on the interior and exterior surfaces of the needle of the cannula. The ultrasonic device 141 can be used alone or in combination with one of the wash towers 101, 111. A suitable ultrasonic device 141 is manufactured by Branson Ultrasonics Corporation of Danbury, Conn., part number B3-R, and distributed by Cole-Parmer Instrument Company of Vernon Hills, Ill., under part number P-08849-00.

Figure 9:
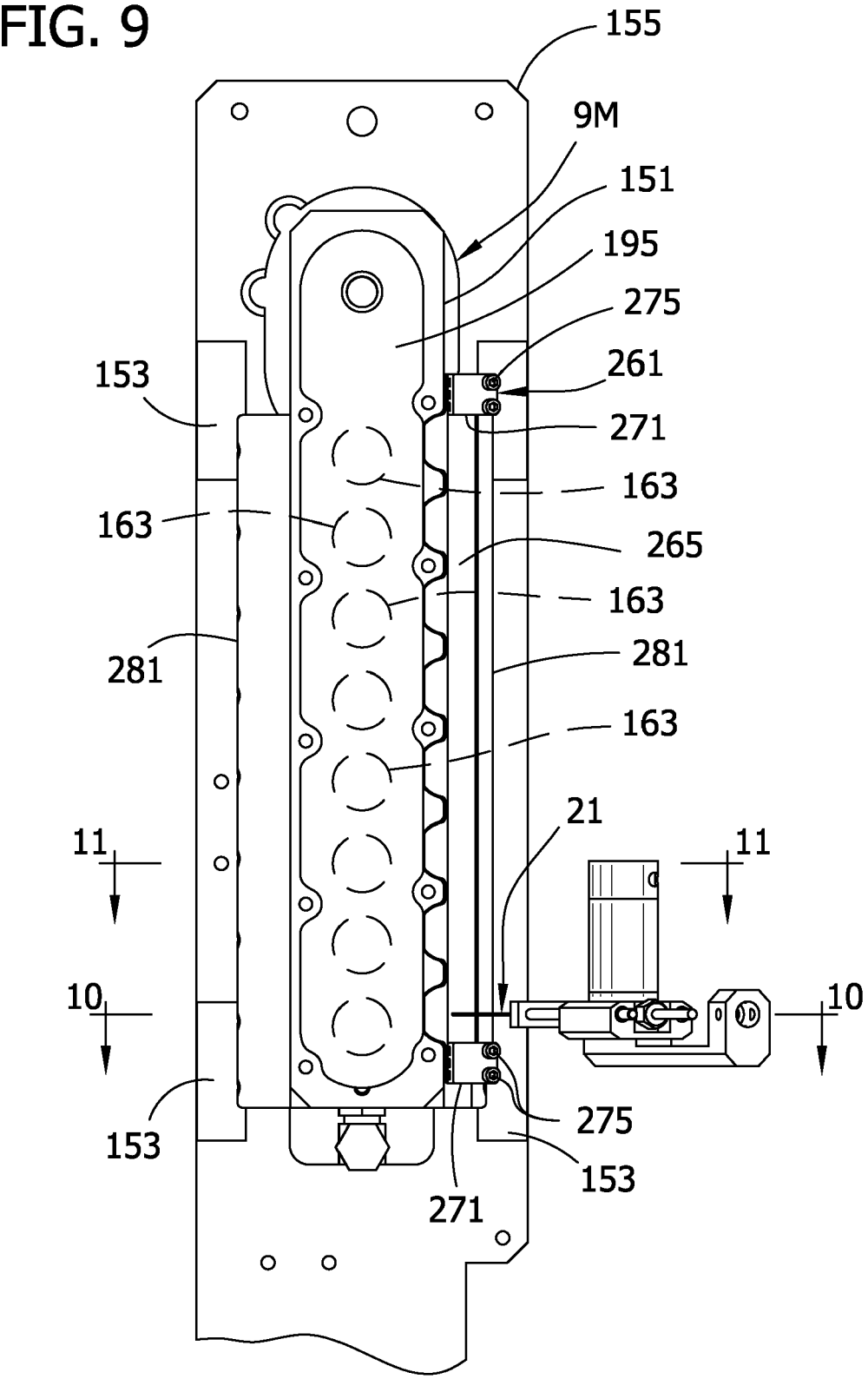
FIG. 9 is a top view of a reactor module showing a cannula immediately prior to the delivery of fluid to a vessel in the module.
Figure 10:
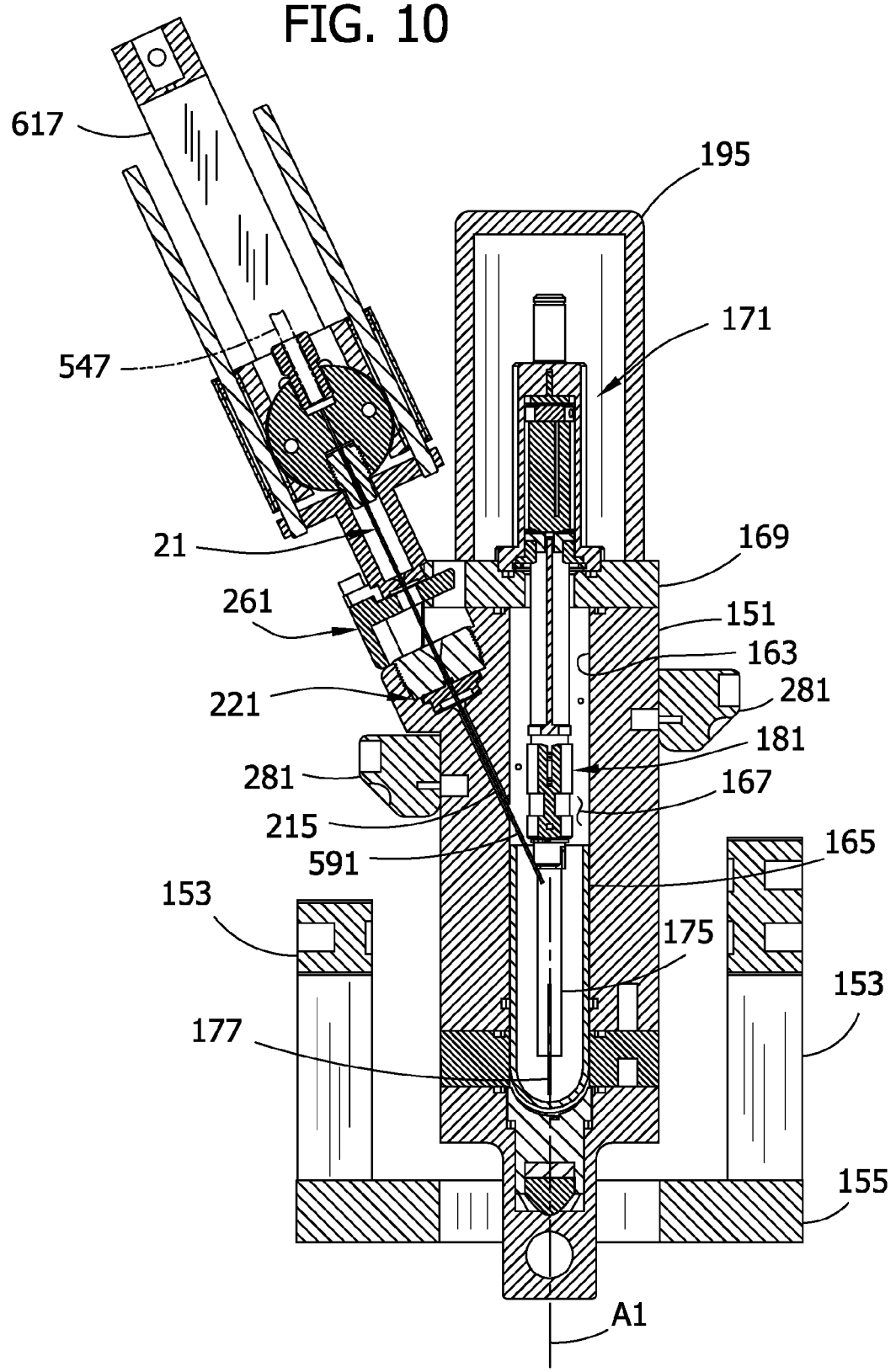
FIG. 10 is a vertical section along lines 10-10 of FIG. 9 showing the construction of a reactor module and cannula for delivering fluid to a vessel in the reactor module.
Figure 11:
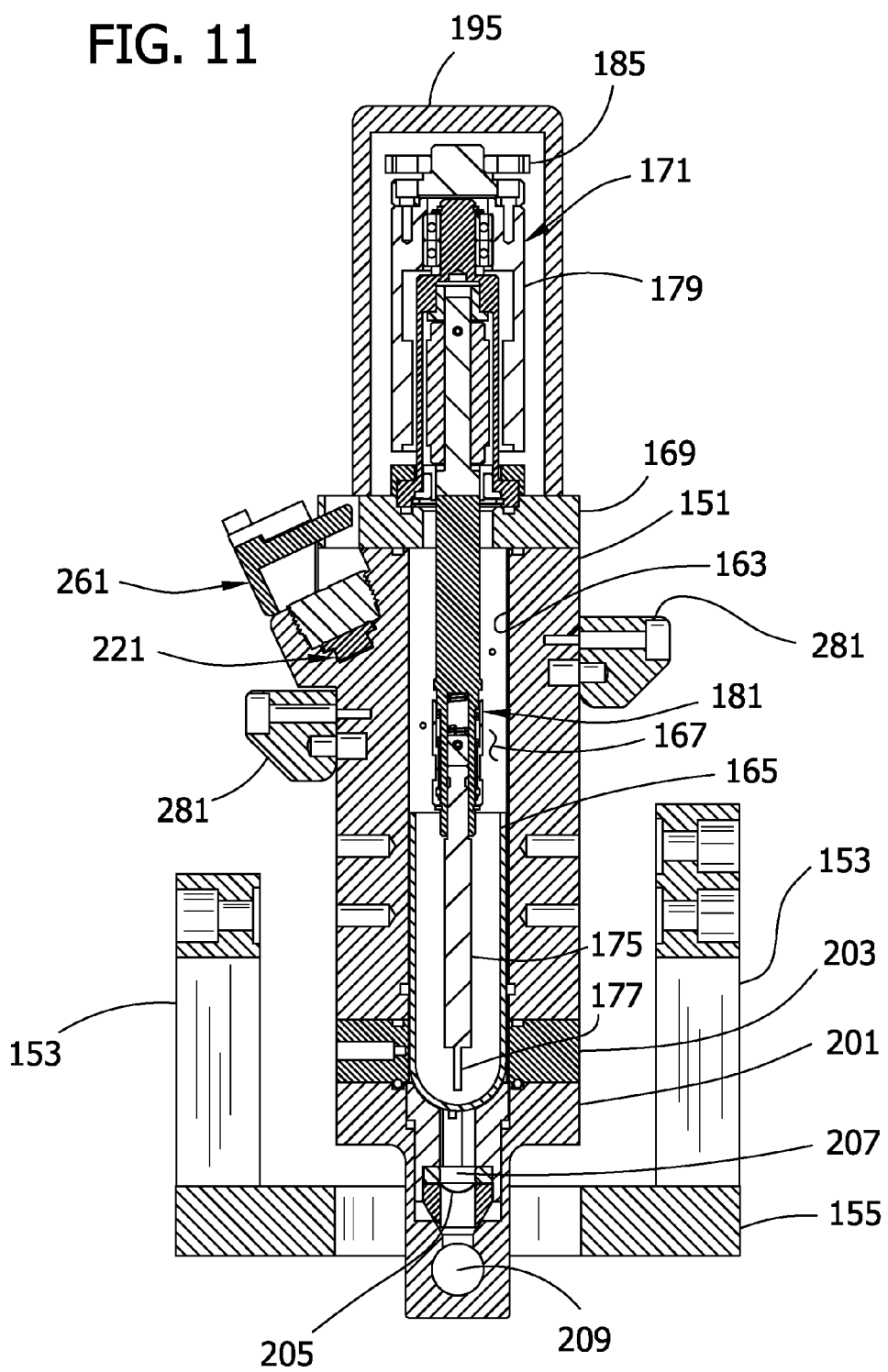
FIG. 11 is a vertical section on line 11-11 of FIG. 9 in a plane through the central axis of the vessel.

Referring now to FIGS. 9-11, each reactor module 9M comprises a reactor block 151 of suitable metal mounted on a pair of legs 153 secured to a base 155 which is fastened to a respective carriage plate 67b. The reactor block 151 is preferably mounted in a position spaced above the base so that it is thermally isolated from the base. Each reactor block 151 has two or more (e.g., eight) vessels therein formed by wells 163 each of which extends down from an upper surface of the reactor block and each of which has a central longitudinal axis A1 which is typically (but not necessarily) generally vertical. In the preferred embodiment, each well has a removable liner in the form of a reaction vial 165 for holding a reaction mixture to be processed. The reaction vial 165 may be of glass or other suitably chemically inert material capable of withstanding high-temperature chemical reactions. As used herein, the term "vessel" broadly means any structure for confining reaction materials in the reactor, including the walls defining the well 163, and/or the vial 165 or other liner in the well containing the reaction materials. In the embodiment shown in FIG. 10, the reaction vial 165 has a height substantially less than the height of the well 163, forming a head space 167 within the well above the vial, the head space and interior of the vial combining to form what may be referred to as a reaction chamber. This chamber is sealed closed by a header plate 169 releasably secured by suitable fasteners to the reactor block 151.

Figure 5:
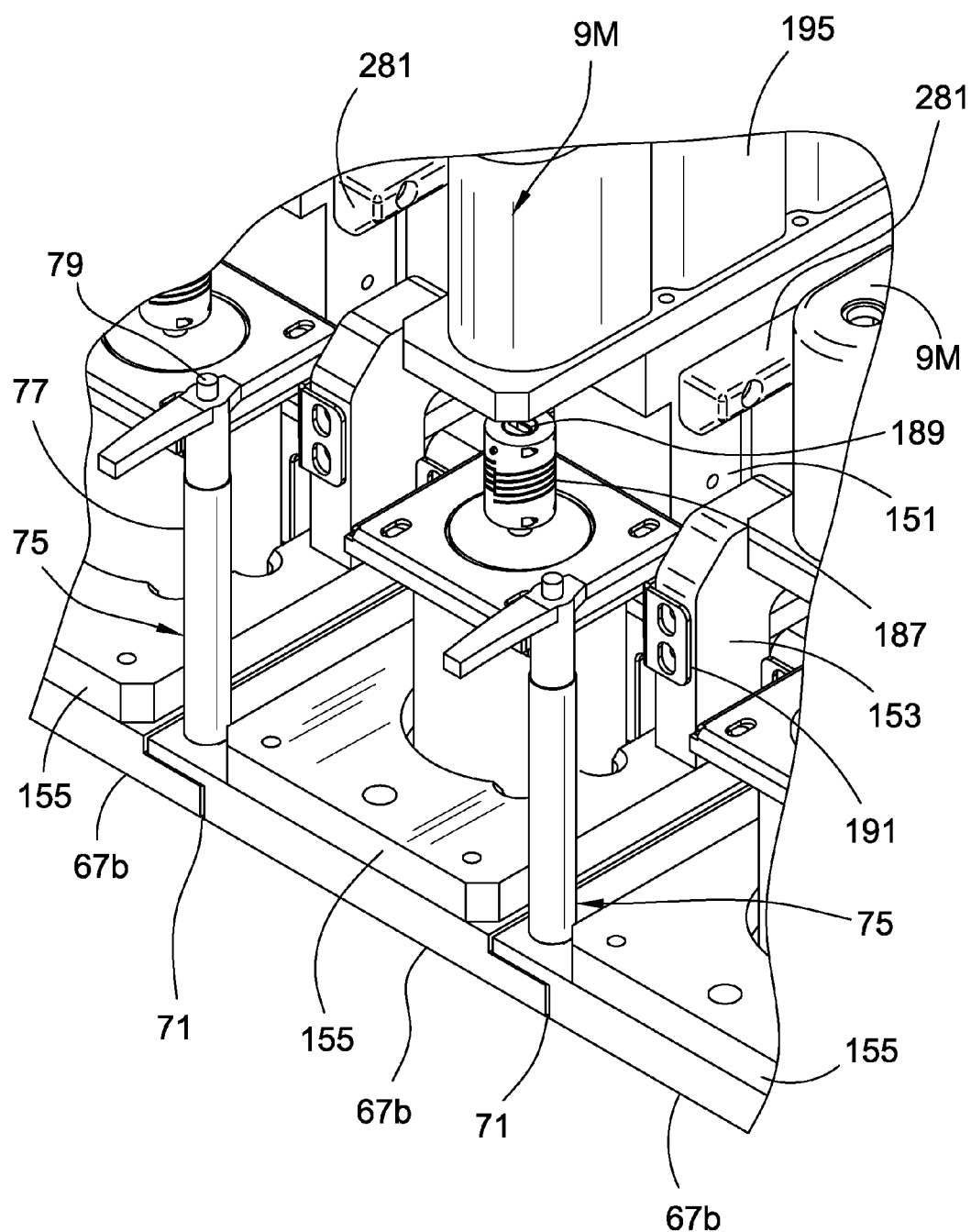
FIG. 5 is an enlarged portion of FIG. 3 showing several reactor modules mounted on a series of interconnected carriage plates.

A stirrer mechanism, generally designated 171 in FIGS. 10 and 11, is provided for stirring the contents of each vessel. This mechanism preferably comprises a stirrer in the form of a shaft 175 having a mixing blade or paddle 177 thereon engageable with the contents of the vessel, and a magnetic drive 179 of the type described in the aforementioned International Application No. PCT/US99/18358 (International Publication No. WO 00/09255) for rotating the stirrer at speeds in the range of 0 to about 3000 rpm, and preferably at a speed in the range of about 200-2000, and most preferably at a speed in the range of about 1000-2000. The drive mechanism 179 is releasably coupled to the shaft 175 by a quick-acting coupling, generally designated 181, which may be of the type disclosed in the aforementioned International Application No. PCT/US99/18358 (International Publication No. WO 00/09255) or in the aforementioned co-owned, pending U.S. application Ser. No. 09/873,176, filed Jun. 1, 2001 by Nielsen et al. The magnetic drives 179 of the various stirrer mechanisms 171 of the reactor modules 9M are powered by a drive system comprising a gear train 185 (FIG. 11) releasably coupled to a stepper motor 187 by means of a key and shaft slip connection 189, as best illustrated in FIG. 5. The motor 187, in turn, is supported by brackets 191 fastened to the legs 153 extending up from the base on opposite sides of the reactor block 151. The gear train 185 and drive mechanisms 179 are enclosed by a cover 195 releasably secured to the header plate 169 on the reactor block 151. The arrangement is such that the stepper motor 187 rotates the gears of the gear train 185 to drive the magnetic drives 179 to rotate the stir shafts 175 in the vessels of the reactor module.

It will be understood that the stirrer mechanisms 171 may be rotated by other types of drive mechanisms. Also, each stirrer mechanism can be rotated by an independent drive system so that the rotational speed of the stirrer can be varied independent of the speed of the other stirrer mechanisms.

Referring to FIG. 11, a burst manifold 201 is secured to a spacer plate 203 attached to the bottom of the reactor block 151. The manifold 201 houses a series of disks 205, each of which is mounted in a passage 207 communicating with a respective well 163. In the event the pressure in a reaction chamber exceeds a predetermined pressure, the disk 205 is designed to rupture, which allows the chamber to vent into a vent passage 209 in the manifold communicating with a suitable vent system. The rupture pressure should be somewhat above maximum expected reaction pressures. In preferred embodiments, the reaction pressures are greater than atmospheric, preferably at least about 15 psig, more preferably at least about 50-100 psig, and yet more preferably up to about 500 psig or more.

In accordance with one aspect of the present invention, each reactor module 9M has a plurality of cannula passages 215 therein extending between an exterior surface of the reactor block 151 and the wells 163 formed in the reactor block, preferably one cannula passage 215 for each well. In the preferred embodiment shown in FIGS. 10 and 12, each cannula passage is straight and extends at an angle from a location adjacent the upper end of the reactor block 151 at one side thereof to a respective well 163 in the block, intersecting the side wall of the well in the head space 167 above the upper end of the mixing vial 165 in the well or, in the event a vial is not used, above the level of any liquid and/or solid reaction components in the well. The central longitudinal axis A2 of the passage 215 is at an appropriate angle, θ, relative to the central longitudinal axis A1 of the vessel (e.g., at a 25° angle off vertical) assuming the axis A1 of the vessel is vertical, although it is not necessarily so. While the passage 215 shown in the drawings is straight, it will be understood that the passage need not be absolutely straight. For example, if the portion of the cannula 21 to be inserted into the passage is flexible or somewhat non-linear, the cannula passage 215 could also assume non-linear configurations (e.g., an arcuate configuration). However, in the preferred embodiment, the cannula passage is at least substantially straight, meaning that it is sufficiently straight to accommodate a cannula needle of the type to be described later in this specification.

The passage 215 is positioned so that when a respective cannula 21 is inserted into and through the passage 215, the distal end of the cannula is positioned inside the vessel, preferably inside the reaction vial 165 if one is used, for delivery of reaction material from the cannula at an elevation above any liquids and/or solids in the vial. The size and cross-sectional shape of the cannula passage 215 is not critical. By way of example, however, which is not intended to be limiting in any respect, the passage can be formed by a circular bore having a diameter which exceeds the outside diameter of cannula 21 by about 0.032 in. (0.081 cm). The angle θ of the cannula passage 215 may also vary, depending on the spacing between adjacent reactor modules 9M, the height of the reactor module, the size of the vessels, and other factors. In the preferred embodiment, all cannula passages 215 extend from an exterior surface of the reactor block 151 on the same side of the block, but it will be understood that the cannula passages for different wells 163 could extend from different sides of the reactor block without departing from the scope of this invention.

Figure 12:
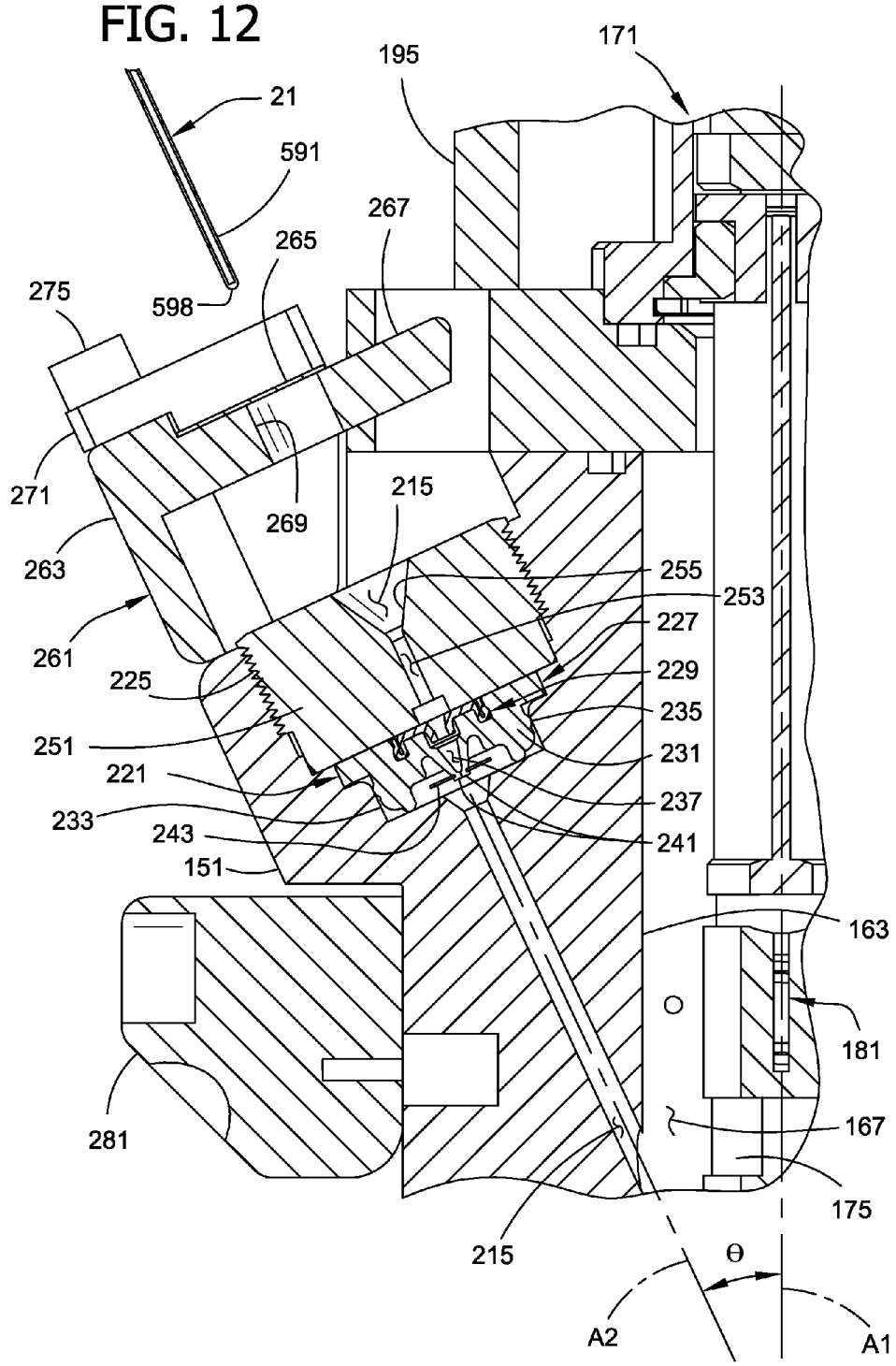
FIGS. 12-14 are sequential views illustrating various steps in the procedure for delivering fluid to a vessel via the cannula.
Figure 13:
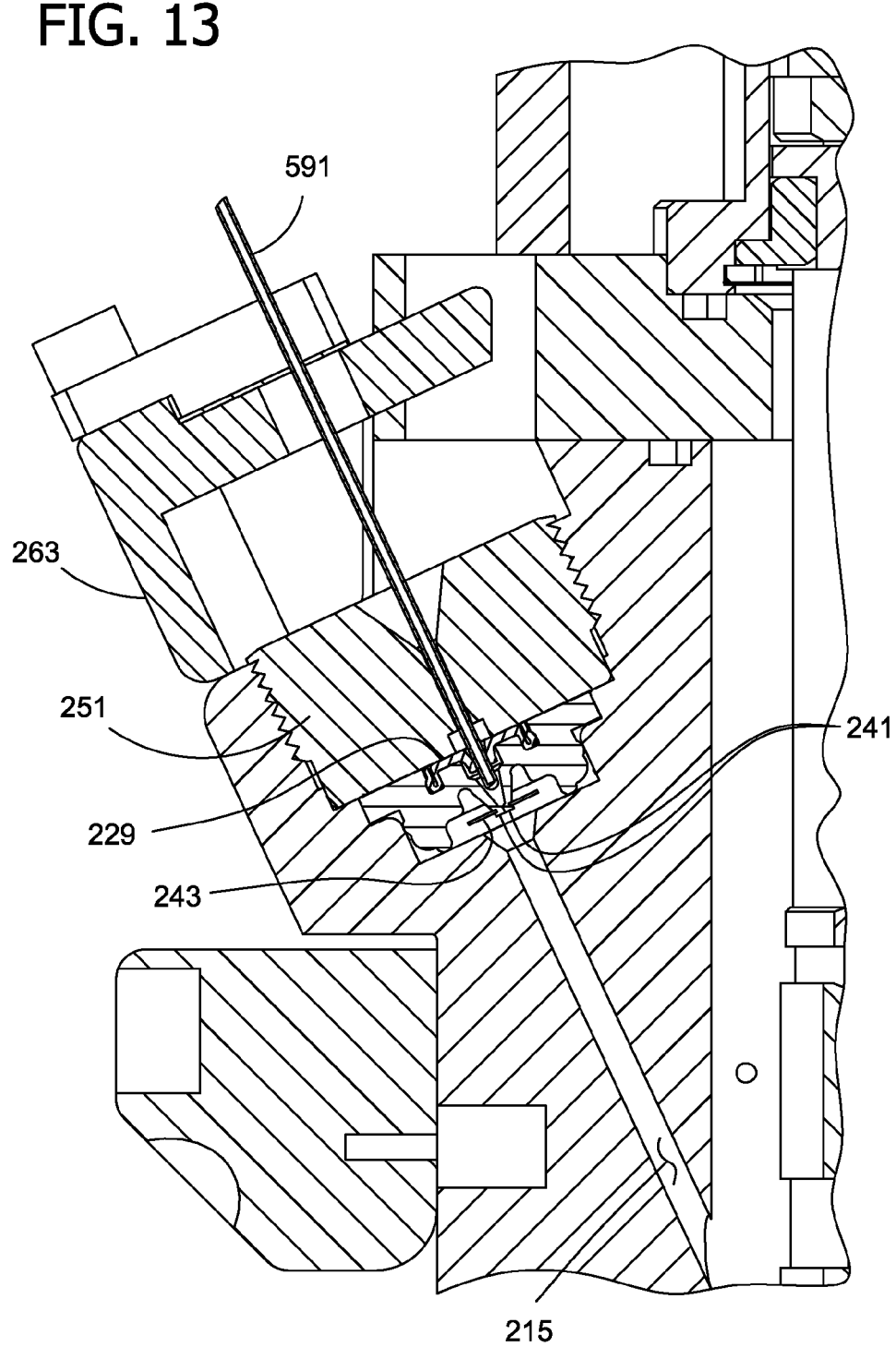

A sealing mechanism, generally designated 221 in FIG. 12, is provided in each cannula passage 215 for maintaining the reaction vessel sealed against ambient conditions when the cannula is inserted into and withdrawn from the cannula passage, thus preventing any substantial pressure losses if the pressure in the reaction vessel is positive, or any pressure gains if the pressure in the reaction vessel is negative with respect to ambient pressure. As shown best in FIGS. 12-14, the sealing mechanism 221 is located in the passage 215 adjacent its upper end at the entry port thereof which is enlarged by a counterbore 225 to accept the mechanism. The mechanism 221 includes a valve 227 movable between a closed position for closing the cannula passage 215 and an open position permitting movement of the cannula through the passage, and a seal 229 in the passage sealingly engageable with the cannula 21 when the valve 227 is in its open position. The valve 227 and seal 229 may be separate elements or formed as a single unit. In the preferred embodiment, the valve and seal are fabricated as a single assembly of the type described in U.S. Pat. No. 4,954,149, incorporated herein by reference for all purposes, owned by Merlin Instrument Company of Half Moon Bay, Calif. In this (FIG. 12) embodiment, the valve 227 has a body 231 molded from suitable material (e.g., VITON fluorocarbon rubber) received in a counterbore 233 in the reactor body 151, a sealing ridge 235 extending circumferentially around the body 231 for sealing against the reactor body, a central passage 237 through the body forming part of the cannula passage 215, a duckbill valve comprising a pair of duckbill lips 241 formed integrally with the valve body 231, and a metal spring 243 (e.g., of hardened stainless steel) which biases the lips 241 together to close the passage 237. The lips 241 are forced open against the bias of the spring by the distal end of the cannula 21 as it is inserted through the passage 237 in the valve body (FIG. 13). The lips 241 have a sliding fit against the cannula 21 as it is so inserted. The first-mentioned seal 229 is an annular seal on the body 231 immediately above the valve formed by the duckbill lips 241 on the side of the valve opposite the vial 165 in the well. The annular seal 229 is sized for sliding sealing engagement with the cannula 21 as the cannula is withdrawn from the reactor, since it may take some very small period of time for the lips 241 of the duckbill valve to close after the cannula is pulled past the lips. The sealing mechanism 221 is held in place by a nut 251 threaded in the counterbore 225 in the reactor block 151 into engagement with a circular sealing ridge (not shown) on the upper face of the valve body 231. As shown in FIG. 12, the nut 251 has a central bore 253 therethrough aligned with the passage 237 through the valve body 231. The upper end of this bore which constitutes the entry port of the cannula passage 215 is tapered to provide a lead-in 255 for the cannula 21.

A wiper assembly, generally indicated at 261, is provided adjacent the upper (inlet) end of each cannula passage 215 (see FIGS. 9 and 12). The assembly 261 comprises a wiper frame 263 mounted on the reactor module 9M immediately above the inlets of the cannula passages 215, a wiper member 265 overlying a leg 267 of the frame having one or more openings 269 therein in registry with the upper entry end of the cannula passages 215, a clamp member 271 overlying the wiper member 265, and fasteners 275 (only one shown in FIG. 12) for tightening the clamp member 271 on the frame 263 to clamp the wiper member 265 in place. The wiper member is of a material capable of being penetrated by the distal end of the needle of the cannula 21 and then wiping reaction material off the exterior surface of the needle as it is moved down into the cannula passage 215. The removal of reactant material before entry of the cannula into the cannula passages is important, especially when handling slurries containing small solid particles, since such particles could interfere with the sealing mechanisms 221 in the passages 215. One material found to be suitable as a wiper member is an expanded Teflon® gasket material sold by W.L. Gore & Associates, Inc. Other materials (e.g., silicone rubber) may also be used. Preferably, the wiper member 265 comprises a single strip of material which extends the length of the reactor block 151 at one side of the block and overlies the openings 269 at the upper ends of all cannula passages 215 in the block (see FIGS. 9 and 12). Alternatively, the wiper member 265 can comprise separate pieces for the separate cannula passages 215. The wiper frame 263 is removably mounted on the reactor block 215 so the wiper member 265 can be easily replaced after each run. In the preferred embodiment, the frame 263 sits on pins (not shown) on the reactor block 151 and is easily removed simply by lifting the frame off the pins.

Gas manifolds 281 extend along opposite sides of the reactor block 151, as shown in FIGS. 9 and 10. Process gas lines 57 extending from fittings 55 on the enclosure 3 communicate with one manifold (the right manifold as shown in FIG. 10) to provide for the delivery of process gas (e.g., reactant gas such as ethylene or propylene) to the vessels in the reactor module 9M. Lines 57 extending from the fittings 55 on the enclosure to the other (left) manifold 281 provide for the delivery of quenching or inert gas (e.g., carbon dioxide) to the reaction vessels to terminate a reaction and/or to vent the gaseous contents of the vessels. Flow through the lines 57 to the manifolds 281 is controlled by solenoid valves 285 mounted on the base 155 immediately adjacent the reactor module 9M (FIG. 4).

Figure 15:
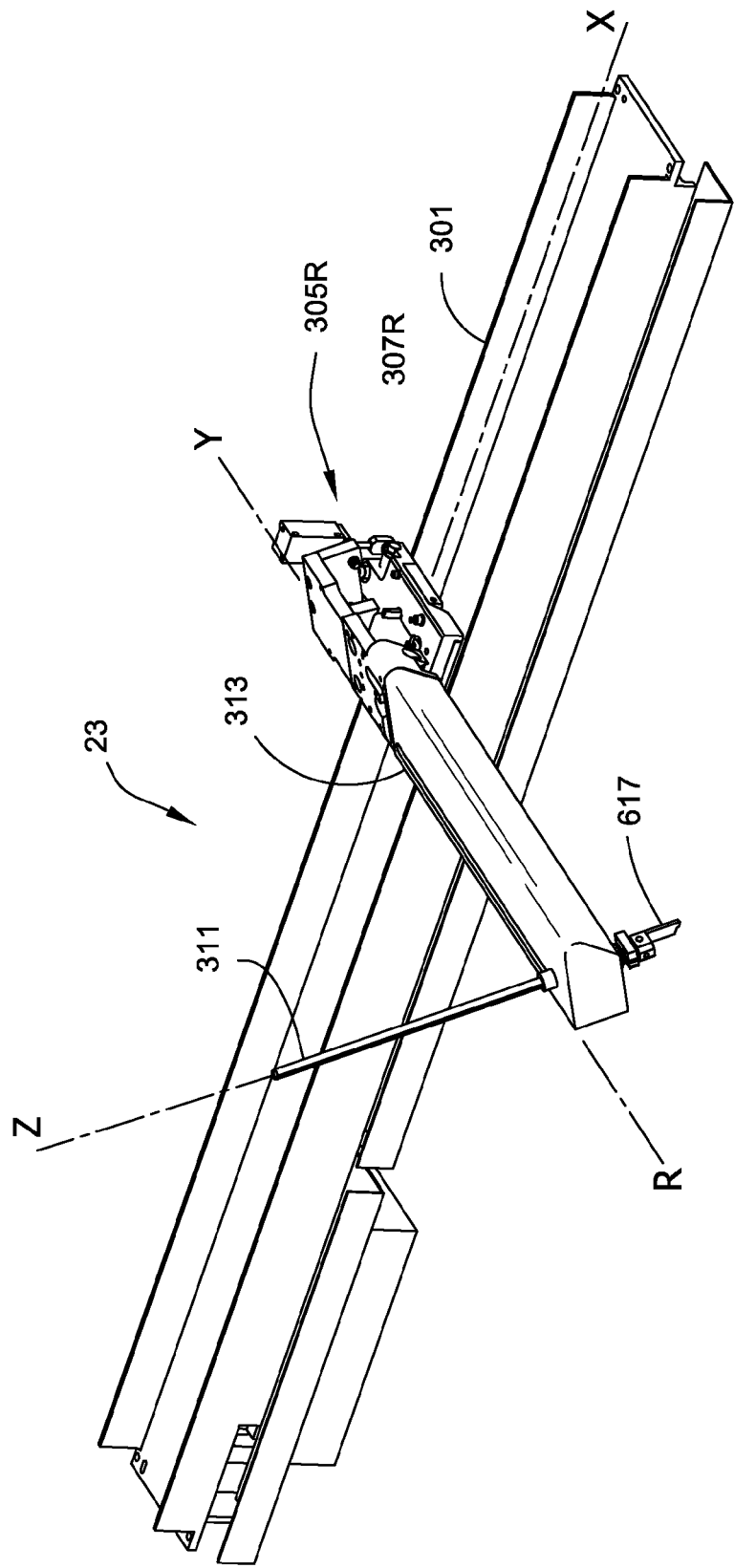
FIG. 15 is a perspective of key components of the robot system, showing the cannula in a travel position.
Figure 16:
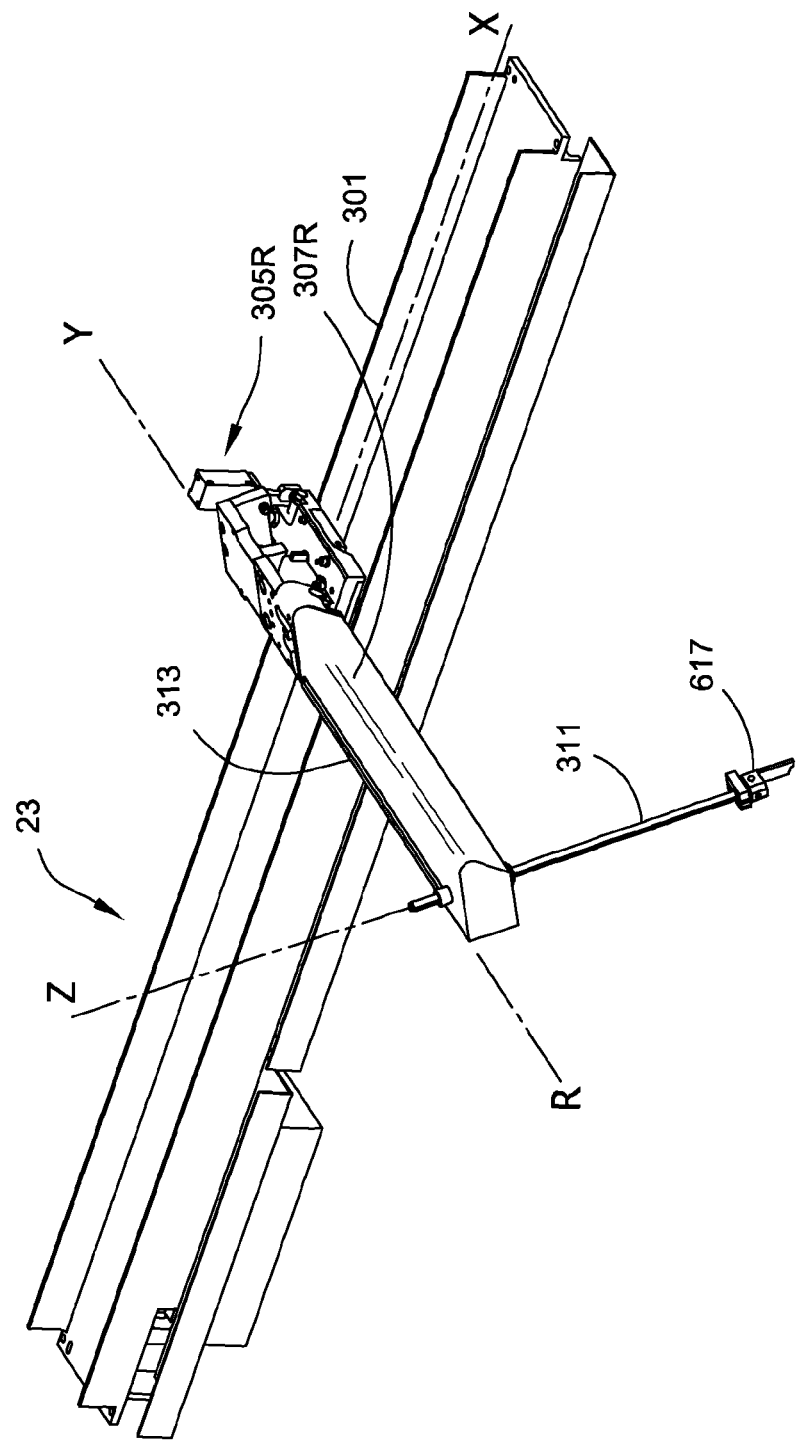
FIG. 16 is a view similar to FIG. 15 showing the cannula in a fluid delivery position.

In general, the robot system 23 is a conventional three-axis system providing translational movement along X, Y and Z axes (see FIGS. 15 and 16), except that the system is modified as described hereinafter to provide for rotational movement about a fourth axis R, which may intersect axis Z. The conventional three-axis system referred to may be a system commercially available from Cavro Scientific Instruments of Sunnyvale, Calif., Model No. 727633. Referring to FIGS. 3, 15 and 16, the robot system 23 in one embodiment comprises a horizontal track 301 mounted on the enclosure 3 by brackets 303, left and right carriages 305L, 305R mounted on the track for linear movement along the X axis, and left and right robot arms 307L, 307R extending from respective carriages. (As referred to herein, left and right is as viewed in FIGS. 1, 3, 15 and 16.) An elongate rack 311 on each arm 307L, 307R carries a respective cannula 21. The rack 311 is mounted for movement in a slot 313 in the robot arm along the Y axis, and is also engageable with a drive pinion (not shown) in the arm for movement along the Z axis. In accordance with another aspect of this invention, the carriage 305L, 305R associated with each robot arm 307L, 307R is modified to provide for rotation of the arm about axis R. Since the left and right carriages may be of somewhat different construction, both will be described.

Figure 17:
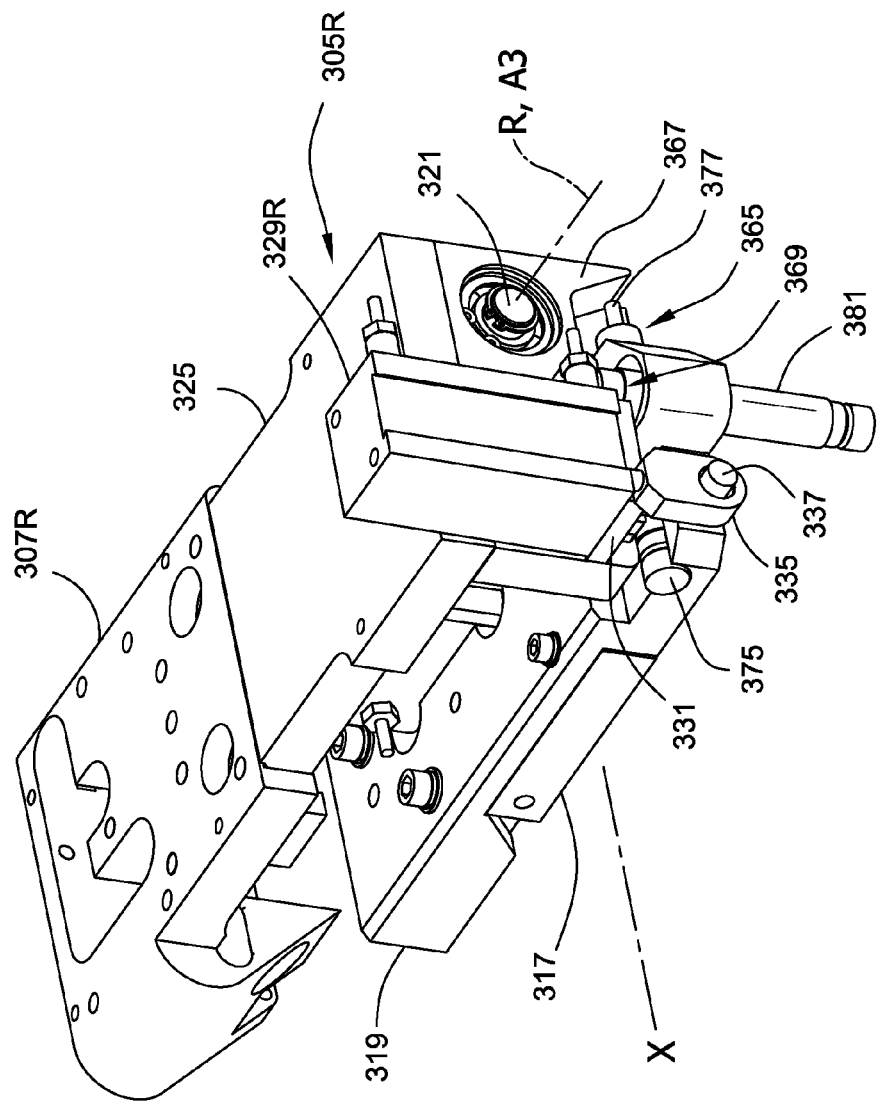
FIG. 17 is a perspective showing a mechanism for rotating the right robot arm about its axis, the mechanism being shown in a flat or non-rotated position.
Figure 18:
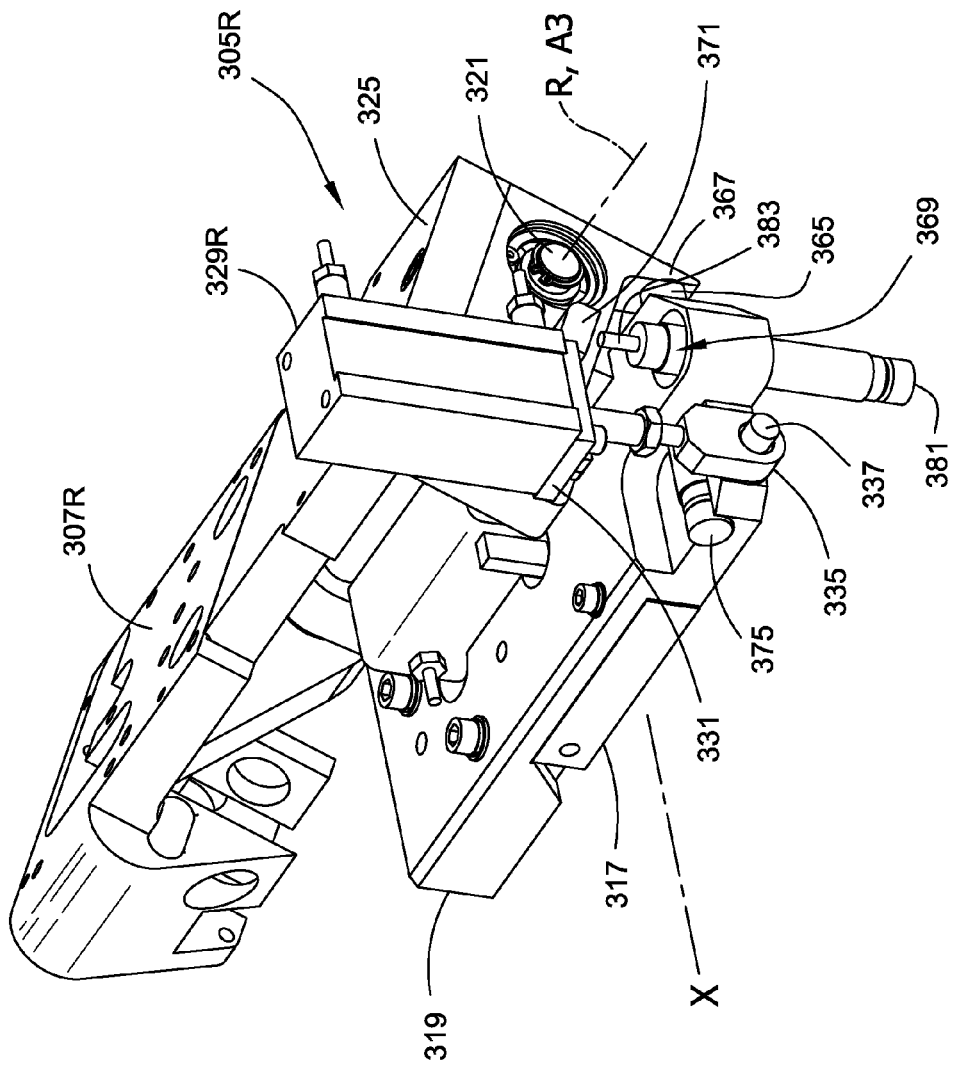
FIG. 18 is a view similar to FIG. 17 showing the mechanism in a rotated position.
Figure 19:
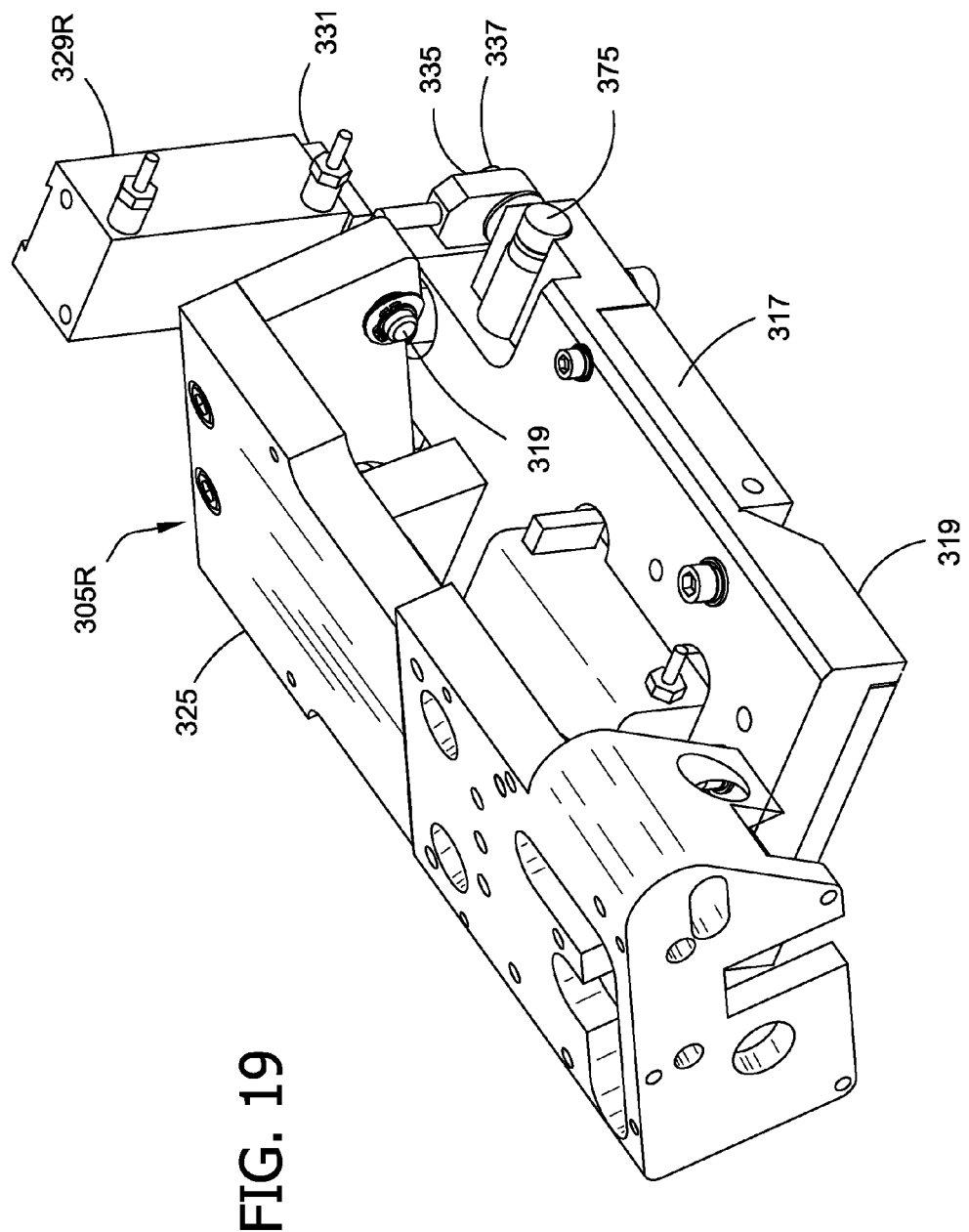
FIG. 19 is a view similar to FIG. 18 but showing the mechanism as viewed from an opposite end of the mechanism.

The construction of the right carriage 305R is shown in FIGS. 17-19. The carriage 305R comprises a slider 317 engageable in conventional fashion with the track 301, a base 319 affixed to the slider, a shaft 321 mounted on the base having a longitudinal axis A3 corresponding to axis R, and a pivot block 325 mounted on the shaft for rotation on axis R. The pivot block 325 carries the right robot arm 307R and is rotatable by a power actuator which, in the preferred embodiment, is a double-acting pneumatic cylinder 329R. The cylinder 329R is mounted on a platform 331 pivotally secured at 333 in FIG. 19 to the pivot block 325 and has a rod end having a clevis pivot connection 335 with a shaft 337 extending from the base 319, the arrangement being such that the extension of the cylinder rod causes the pivot block 325 to rotate in a first (clockwise) direction from the generally horizontal "home" position shown in FIG. 17 to the tilted position shown in FIG. 18, and retraction of the rod causes the pivot block to rotate in the opposite (counterclockwise) direction. During such extension and retraction, the platform 331 pivots relative to the pivot block 325 and the clevis connection 335 rotates on the shaft 337. Extension and retraction of the cylinder 329R is controlled by a suitable pneumatic system, one such system being designated 341 in FIG. 2. In this embodiment, an inert gas (e.g., argon or nitrogen) is supplied to opposite ends of the cylinder 329R by two lines 343, 345, the first of which (343) supplies gas at a relatively high pressure (e.g., 60 psig) to one end of the cylinder for extending the cylinder to rotate the pivot block 325 to its angled (tilted) position, and the second of which (345) supplies gas at a lower pressure (e.g., 40 psig) to the opposite end of the cylinder. Both gas lines 343, 345 are connected to a suitable source 351 of high pressure gas (e.g., argon or other inert gas). Regulators 353 are used to control the pressure in the lines 343, 345. A solenoid valve 357 in line 343 controls the supply of high pressure gas to the cylinder 329R. Both lines contain orifices 361 adjacent the cylinder 329R to restrict the flow of gas to dampen the movement of the cylinder, and thus the rotational movement of the pivot block 325 and robot arm 307R. When the solenoid valve 357 is open to provide high pressure gas to the cylinder, the piston of the cylinder extends against the lower pressure gas to rotate the pivot block 325. When the solenoid valve 357 is closed, gas is vented from the high-pressure end of the cylinder 329R, allowing the piston to move in the opposite direction under the influence of the lower pressure gas to rotate the pivot block 325 in the opposite direction. Other pneumatic circuits may be used. Similarly, other types of power actuators may be used for rotating the pivot block 325. Further, other damping means may be used to dampen the rate of pivotal movement of the pivot block 325 and robot arm 307R about axis R. For example, a suitable damping device could be positioned between the pivot block 325 and the base 319.

The range of rotational movement of the pivot block 325 is determined by stops (see FIGS. 17 and 18). In the preferred embodiment, movement in the clockwise direction is determined by the location of a first adjustable stop 365 on the base 319 engageable by a first stop 367 on the pivot block 325, and rotational movement of the pivot block in the counterclockwise direction is determined by the location of a second adjustable stop 369 on the base engageable with a second stop 371 on the pivot block.

The first adjustable stop 365 comprises a damping cylinder 375 mounted on the base 319 in a generally horizontal position, and a rod 377 (FIG. 17) extending from the cylinder having an upper end engageable by the first stop 367 on the pivot block 325. The cylinder 375 has a threaded connection with the base 319 so that the cylinder may be moved along its axis to adjust the axial position of the rod 377. A jamb nut (not shown) may be used to secure the cylinder in adjusted position. The damping cylinder 375 contains fluid movable through an optimally adjustable orifice to damp movement of the rod 377 as it moves to its final fixed position, as will be understood by those skilled in the art. The cylinder and rod are of conventional design. A suitable damping cylinder 375 is commercially available from Humphrey of Kalamazoo, Mich., Part No. HKSH5×8.

The second adjustable stop 369 is similar to the first adjustable stop 365 described above except that the cylinder (designated 381) is mounted in a generally vertical position for engagement of its rod 383 by the second stop 371 on the pivot block 325.

It will be understood, therefore, that the range of rotational movement of the pivot block 325 can be adjusted by setting the location of the adjustable stops 365, 369 to the desired locations. In the preferred embodiment, the range of motion is through a range of about 25°, preferably between a position in which the cannula 21 is vertical and one where the cannula is 25° off vertical, although this range may vary without departing from the scope of this invention. Whatever the range, the pivot block 325 in its tilted position should rotate the robot arm 307R to a position in which the cannula 21 is held at an angle corresponding to the angle, θ, of the cannula passages 215 in the reactors 9M so that the cannulas can be inserted through the passages.

The range of rotational movement of the pivot block 325 can be limited in other ways without departing from the scope of this invention.

Figure 20:
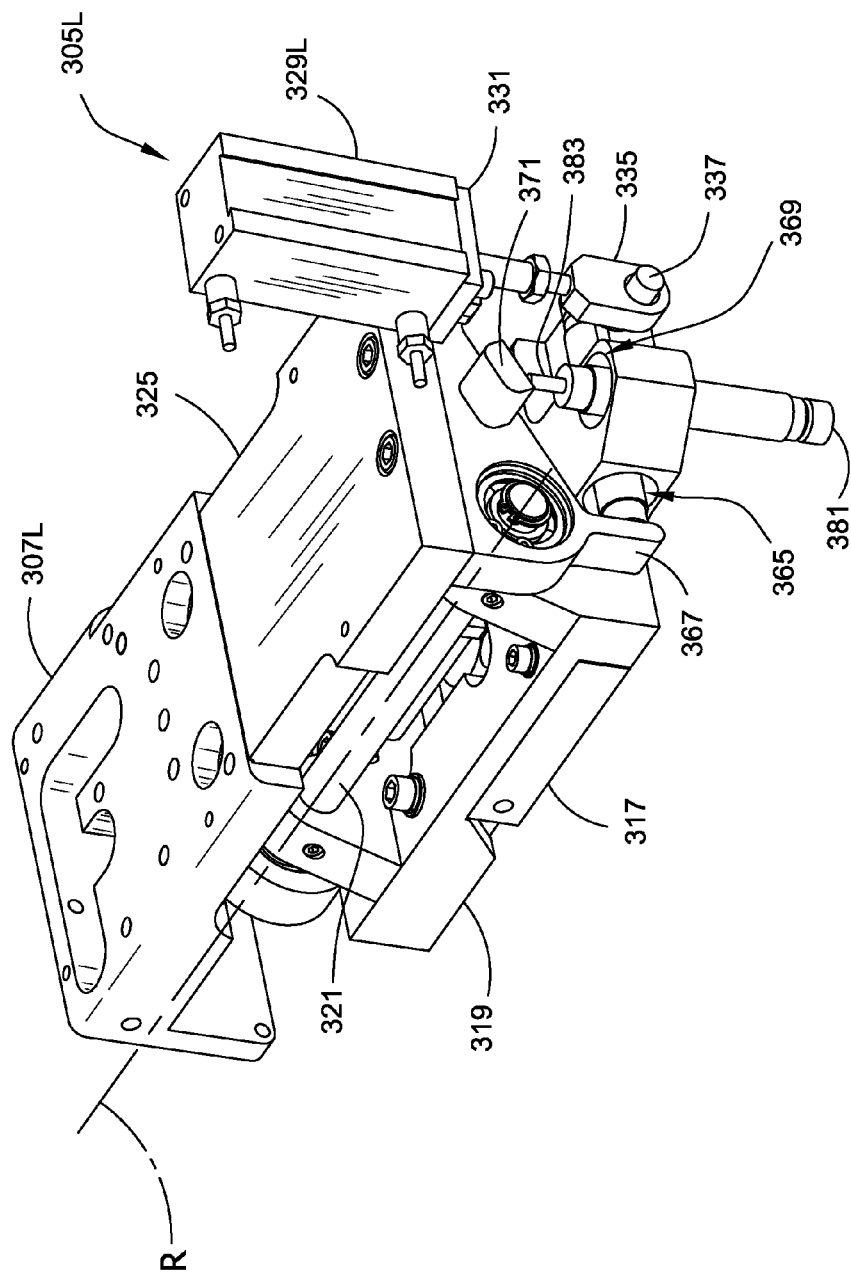
FIG. 20 is a perspective showing a mechanism for rotating the left robot arm about its axis, the mechanism being shown in a flat or non-rotated position.
Figure 21:
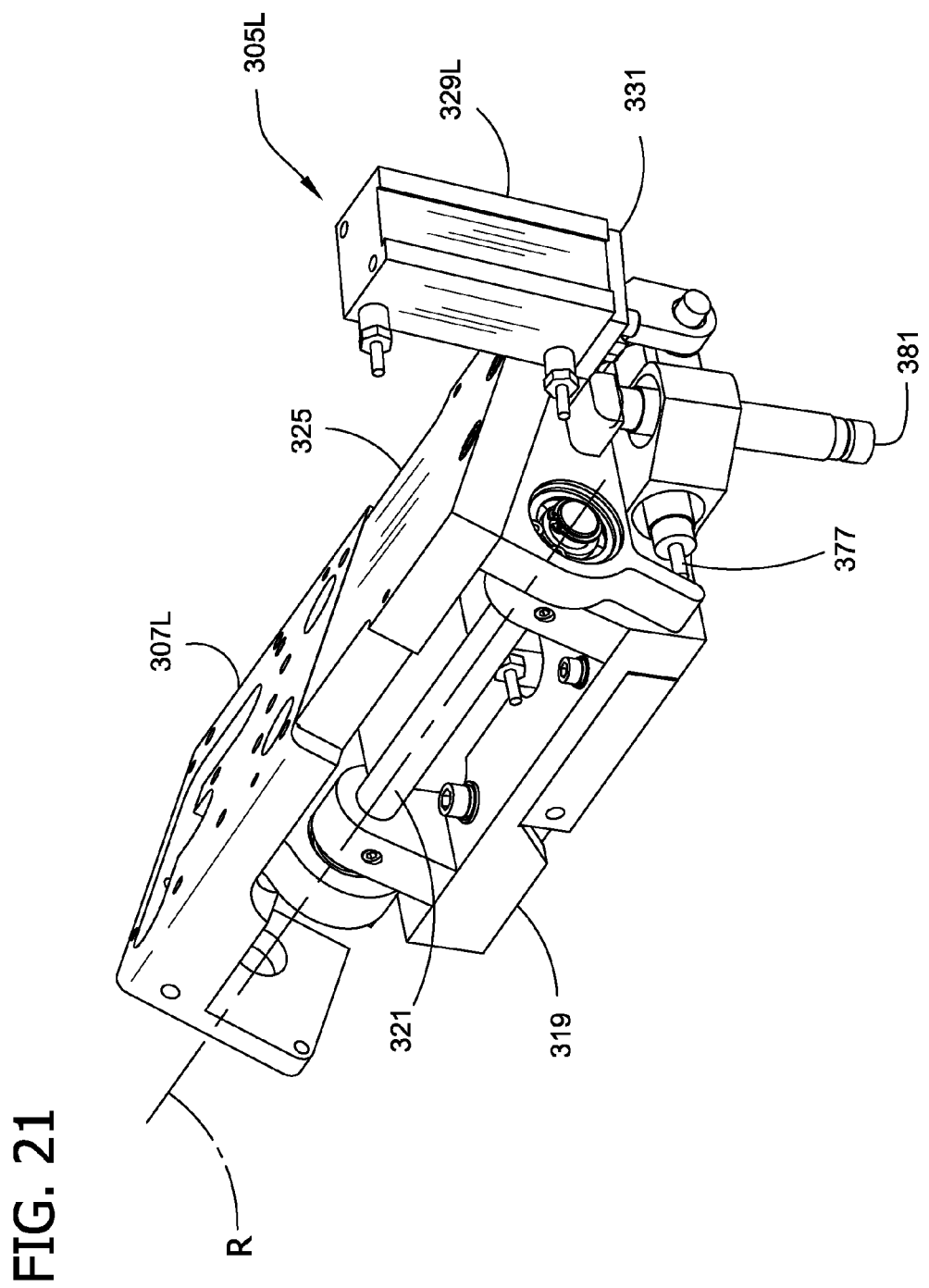
FIG. 21 is a view similar to FIG. 20 showing the mechanism in a rotated position.
Figure 22:
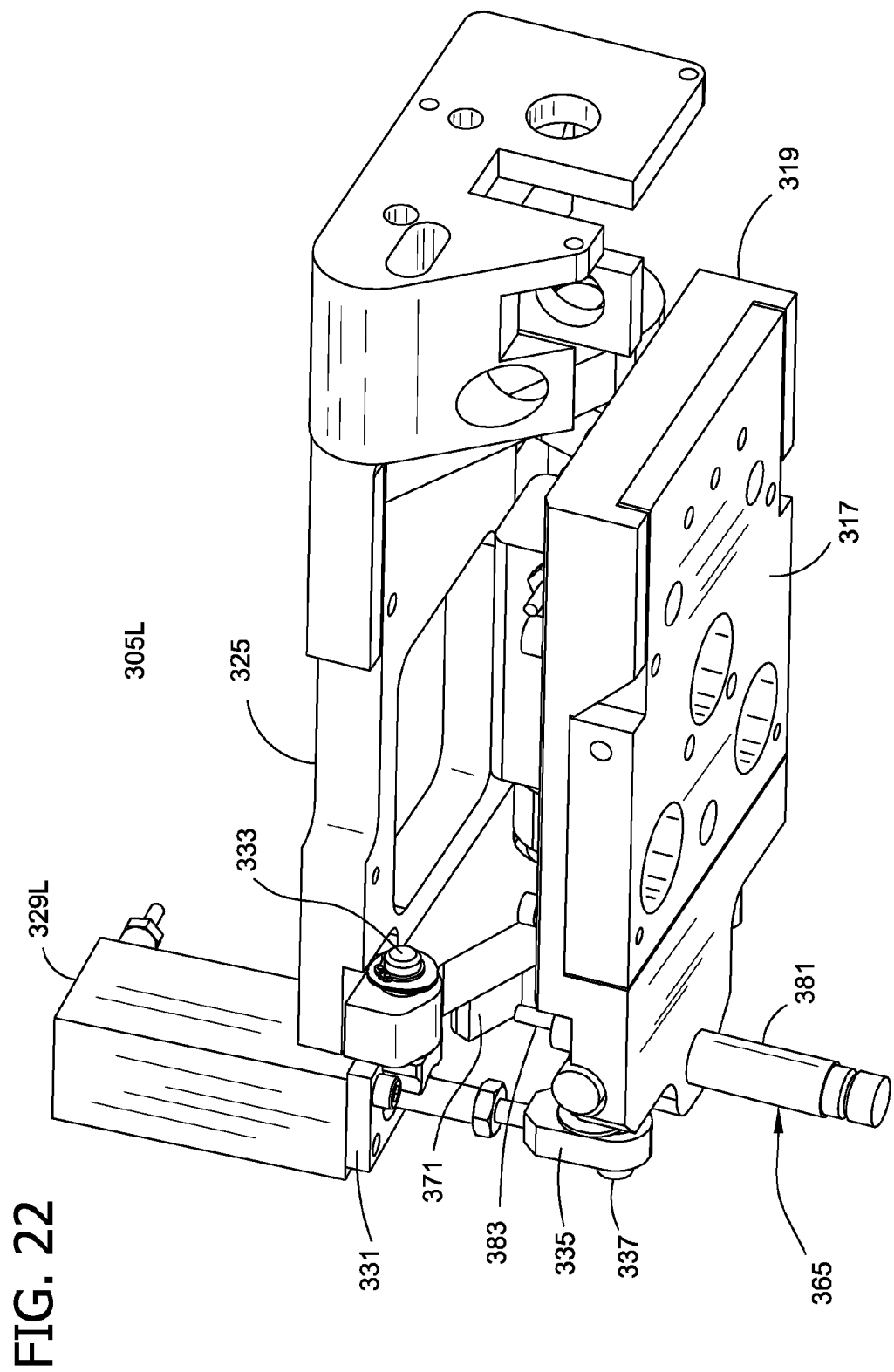
FIG. 22 is a view similar to FIG. 20 but showing the mechanism as viewed from below.

The left carriage 305L for the left robot arm 307L is shown in FIGS. 20-22. The construction of the left carriage is very similar to the construction of the right carriage 307R, and corresponding parts are designated by the same reference numbers. However, there are some differences between the two carriages even though the left and right robot arms are mirror images of one another. This is because, in the preferred embodiment shown in the drawings (e.g., FIG. 9), the entry ports of the cannula passages 215 of the reactor modules 9M all face in the same lateral direction, i.e., toward the left end of the dry box 3 shown in FIG. 1. Another reason for the different construction is the preference to maintain the R-axis of rotation of each robot arm 307L, 307R in line with the Z-axis of travel to reduce the complexity of the motion control for the robot. In any event, the most significant difference in construction is that, for the left carriage 305L, the pivot shaft 321 is on the opposite side of the base 319, and the cylinder 329 is mounted so that retraction of the cylinder causes the pivot block 325 (and the left robot arm 307L) to rotate from its home position shown in FIG. 20 to its angled position shown in FIG. 21, and extension of the cylinder causes the pivot block to rotate from its angled position back to its home position.

It will be understood that the construction of the left and right carriages 305L, 305R could be different from that shown without departing from the scope of this invention.

The condensate delivery system 501 is adapted for delivering low boiling reaction materials to the reaction vessels in the form of liquid phase condensates. More particularly, the condensate delivery system delivers the low boiling reaction material condensate to the reaction vessels within the reactor module 9M through the cannula 21 mounted on one or both of the robot arms 307L, 307R of the robot system 23. By introducing low boiling reaction materials in the liquid phase, the present invention allows for the delivery of reasonably accurate, and more importantly, reproducible quantities of such materials to the reaction vessels. The condensate delivery system may operate on the basis of maintaining the low boiling reaction material under relatively high pressure and/or at reduced temperature in order to deliver the material in the form of liquid phase condensates. Although described herein in the context of condensate delivery, a skilled artisan would appreciate that the present invention, including the various embodiments described herein, can also be adapted and used for withdrawing reaction mixture samples, especially samples of a reaction mixture comprising low boiling reaction materials. As such, the condensate delivery system described in detail hereinafter is more generally referred to as a condensate transfer system, and when used for withdrawing samples of a reaction mixture, can be a condensate sampling or condensate withdrawal system.

Figure 23:
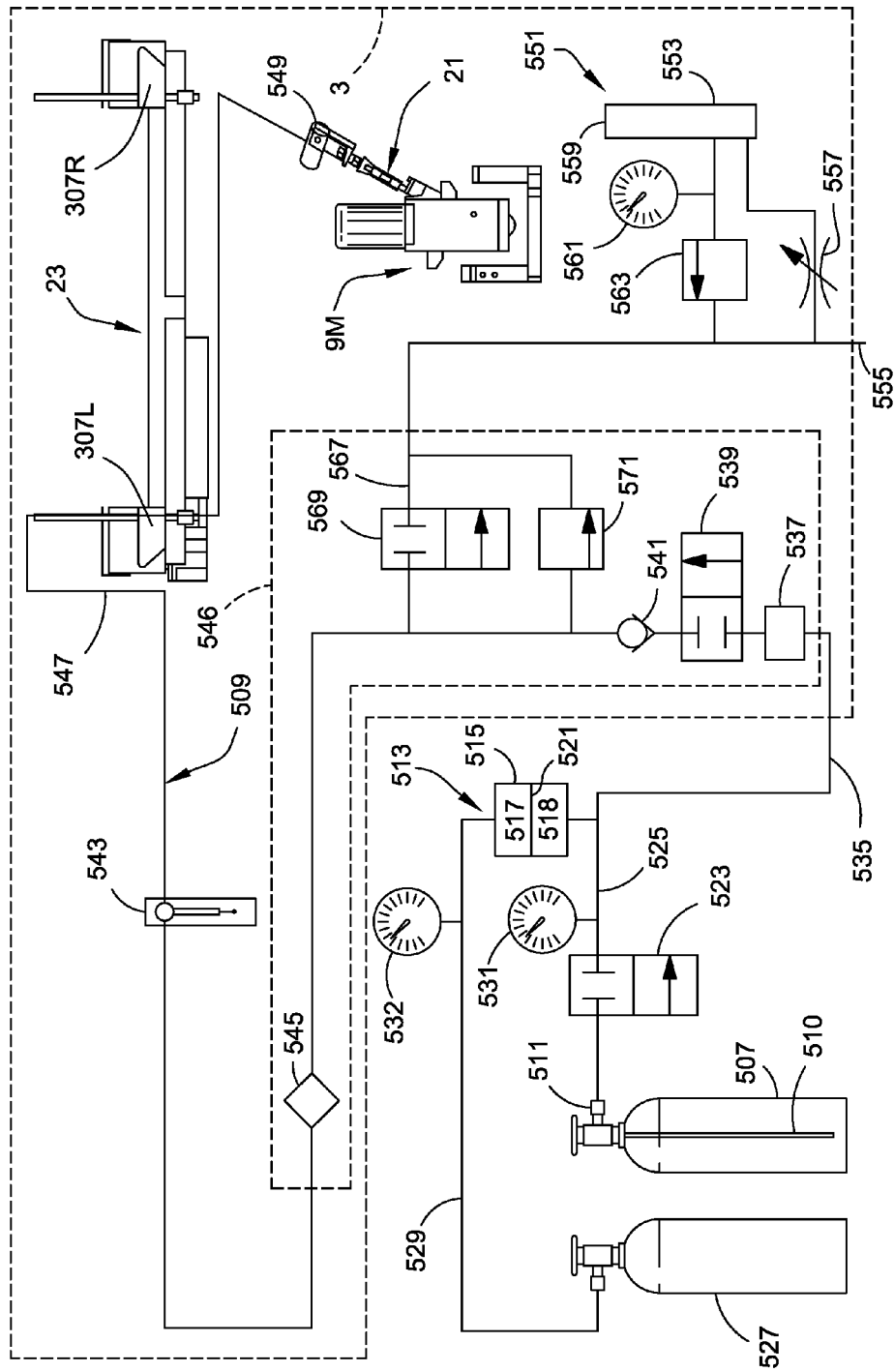
FIG. 23 is a schematic flow diagram of the parallel reactor showing key components of one embodiment of the condensate delivery system for delivering low boiling reaction materials to the reaction vessels in the form of liquid phase condensates.

A first embodiment of the condensate transfer system 501 is illustrated in the schematic of FIG. 23. (For purposes of simplicity, the reactor is shown in FIG. 23 as comprising a single reactor module 9M and other components of the parallel reactor system 1 described above have been omitted.) The condensate delivery system comprises a source 507 of the low boiling reaction material (i.e., condensate) and a flow path generally designated 509 extending from the condensate source to the outlet port of the cannula 21 (e.g., the cannula 21 mounted on the left robot arm 307L as shown in FIGS. 1 and 3). The condensate source 507 can be located inside or outside the enclosure 3 (shown in FIG. 23 as a dashed line). Preferably, the condensate source 507 is maintained at a pressure at least as great as the vapor pressure of the low boiling reaction material. That is, the condensate source comprises condensed gaseous reaction material under pressure. By way of example only, the condensate source 507 may be a pressurized cylinder containing a saturated vapor of the low boiling reaction material in equilibrium with the low boiling reaction material condensate at ambient temperature (e.g., 25° C.). The cylinder (or other source) is preferably adapted for the delivery of the low boiling reaction material condensate into the flow path 509. For example, the cylinder may be inverted such that the liquid level in the cylinder is above the outlet port through which the condensate is removed from the cylinder. Alternatively, as shown in FIG. 23, the cylinder may be equipped with a conventional dip tube 510 in fluid communication with the outlet port 511 through which the condensate is removed from the cylinder and extending inside the cylinder nearly to the bottom thereof. The vapor pressure in the head space above the liquid level in the cylinder is sufficient to force liquid condensate up the dip tube 510 to the outlet port 511 of the cylinder. A suitable mechanism (e.g., liquid level sensor) for indicating the amount of liquid condensate remaining in the cylinder or other source 507 may also be provided.

The flow path 509 includes a reservoir in which the low boiling reaction material condensate is maintained at a variable, selected pressure at least as great as the vapor pressure of the reaction material. As depicted in FIG. 23, such a variable pressure reservoir may be provided by a conventional accumulator assembly generally designated 513. The accumulator assembly can be located inside or outside the enclosure 3 and comprises a pressure vessel 515 divided into two chambers 517, 518 by an internal flexible barrier 521. Chamber 518 serves as the reservoir for containing the pressurized liquid condensate, while the other chamber 517 is filled with a pressurizing fluid. Low boiling reaction material condensate is withdrawn from the source 507 by opening the valve on the source and two-way valve 523 and directed through outlet port 511 and flow line 525 into the reservoir chamber 518 of the accumulator vessel 515. Pressurizing fluid (e.g., $N_2$, He, Ar or other inert gas) from a source 527 is introduced through flow line 529 into the other chamber 517 of the accumulator vessel. The pressurizing fluid source 527 is provided with a regulator (not shown) and the pressure in lines 525, 529 and chambers 517, 518 is monitored by pressure indicators 531, 532. As described in greater detail below, the pressurizing fluid pushes against the flexible barrier 521 and pressurizes the low boiling reaction material condensate contained in the reservoir chamber 518 of the accumulator vessel 515 to the desired pressure.

The accumulator vessel 515 may take various forms, including bladder-type accumulators and accumulators having an accordion or bellows-type metal barrier separating the two chambers within the accumulator vessel. The accumulator vessel preferably has a reservoir chamber of sufficient volume such that the entire quantity of low boiling reaction material needed for a particular procedure or experiment can be supplied to all of the desired reaction vessels without having to recharge the reservoir. The material from which the accumulator vessel is constructed, including the barrier dividing the chambers, should be selected such that it is substantially inert with respect to the low boiling reaction material as well as the pressurizing fluid. For this reason, an accumulator vessel having a metal bellows-type barrier may be preferred in some applications. Accumulator vessels are commercially available for a wide range of operating pressures of up to 3000 psig and higher. Examples of suitable accumulator vessels include bladder accumulator Model No. BA001B3T28A1 available from the Hydraulic Accumulator Division of Parker Hannifin Corporation of Rockford, Ill. and bellows-type accumulator vessels available from Belfab Products of Daytona Beach, Fla.

Flow path 509 includes flow line 535 which is in fluid communication with the reservoir chamber 518 and passes through a suitable fitting (not shown) into the enclosure 3. Flow line 535 includes an excess flow valve 537, two-way valve 539 and check valve 541. Excess flow valve 537 is an optional mechanical safety valve which is triggered and prevents flow in line 535 into enclosure 3 upon detection of excessive flow in the line. Two-way valve 539 allows the downstream components of the condensate delivery system 501 to be isolated from the condensate source 507 as needed during operation and maintenance of the reactor system 1. Check valve 541 prevents back-flow of low boiling reaction material condensate in flow line 535 to the condensate source 507.

The condensate delivery system further comprises a pump 543 in line 535 for pumping the low boiling reaction material condensate through the flow path 509 to the cannula 21. This pump 543 is suitably the smaller volume syringe pump 43b previously described. However, other pumps may also be used. Preferably, flow line 535 includes a filter 545 upstream of the pump 543 to remove particulate impurities from the flow of condensed phase liquid reaction material in flow path 509 that might damage the pump and other downstream components of the condensate delivery system. Suitable filters include sintered metal filters such as Part No. SS-2F-60 available from Swagelok Company of Solon, Ohio, an in-line 60 µm filter. Excess flow valve 537, two-way valve 539, check valve 541, filter 545 and other components of the condensate delivery system 501 may be disposed in a housing 546 secured to an end carriage plate 67a (FIGS. 1 and 3).

The flow path 509 further includes a flow line 547 connecting the output of the pump 543 to the inlet port of the cannula 21. Flow lines 525, 535 and 547 may be provided by flexible plastic (e.g., ETFE) tubing. Portions of the flow path 509 may also be of rigid construction. A solenoid-operated control or injection valve 549 in the flow line 547 upstream of and adjacent the inlet port of the cannula 21 is adapted to open and deliver a quantity of pressurized condensate to the cannula as will be described in greater detail below.

Figure 14:
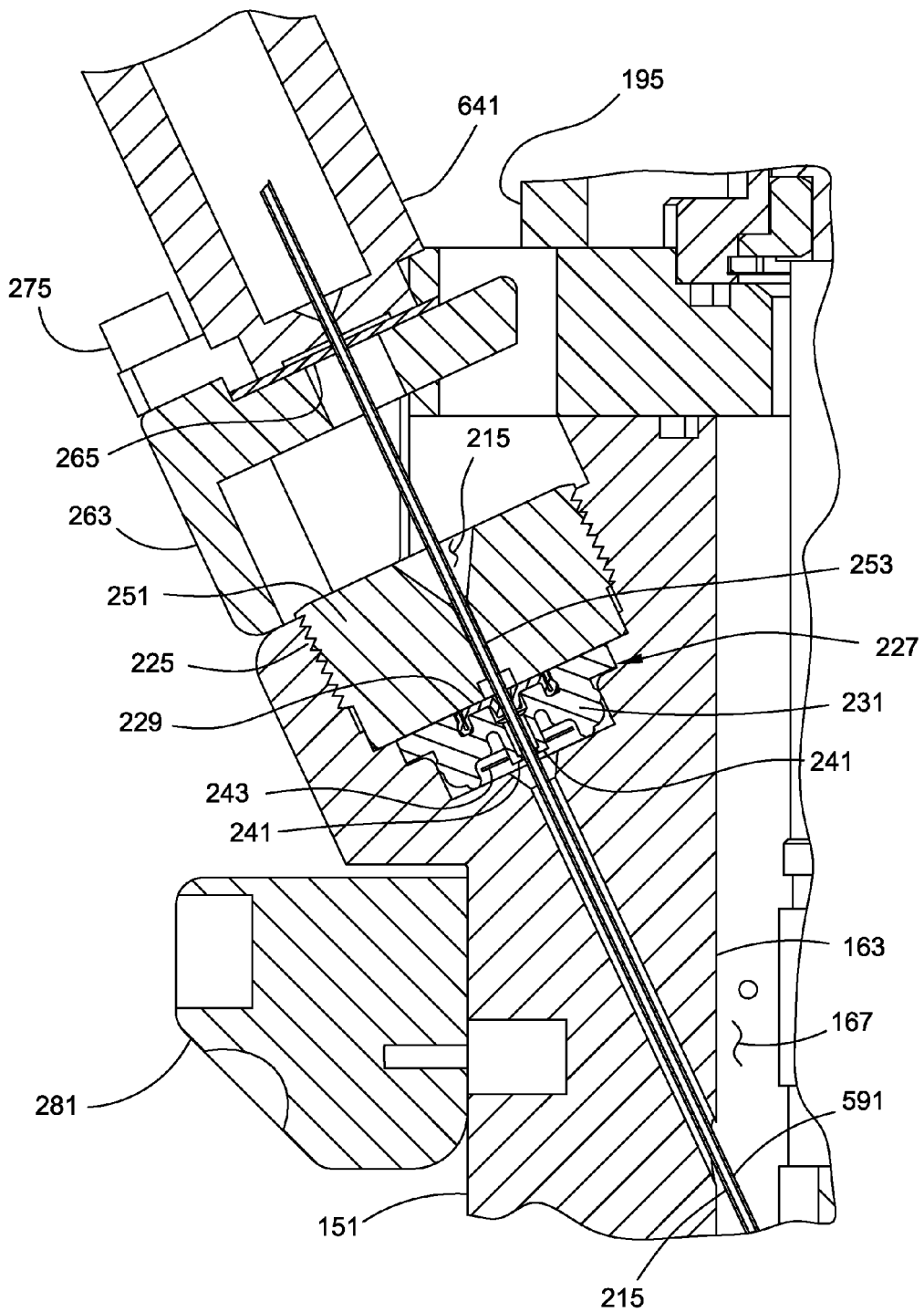
Figure 24:
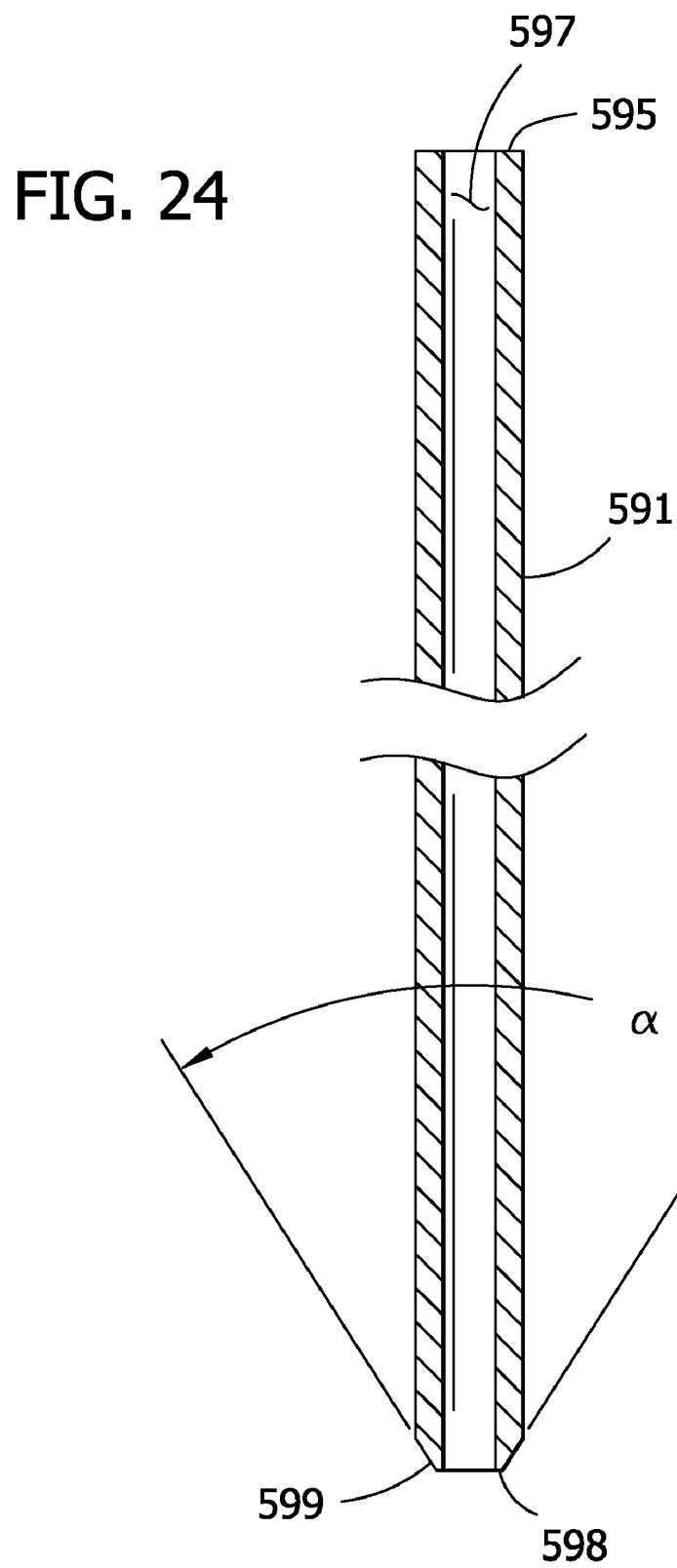
FIG. 24 is a fragmentary vertical section of the needle of the cannula.
Figure 25:
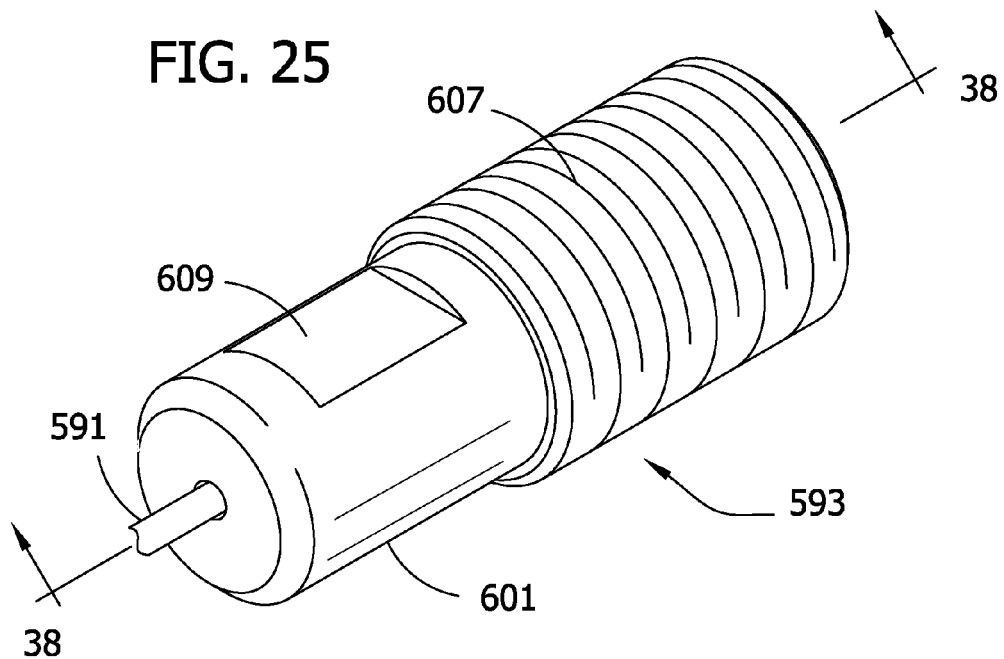
FIG. 25 is a perspective view of the connector of the cannula.
Figure 26:
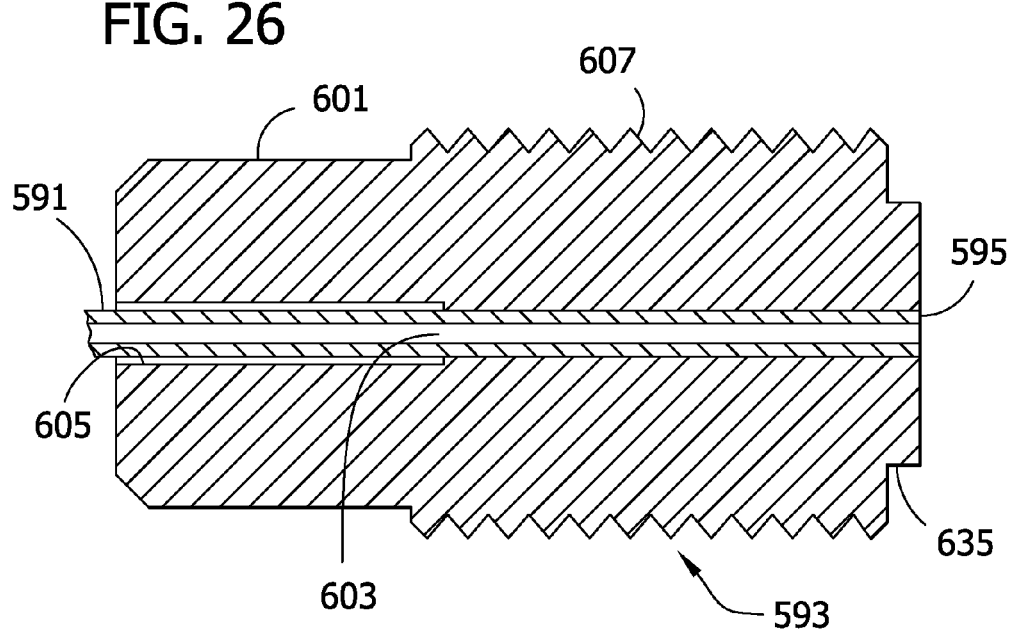
FIG. 26 is a sectional view of the connector.

A cannula 21 used in the delivery of low boiling reaction material condensate is shown in FIGS. 24, 25 and 26. The cannula 21 comprises a long, thin straight tube 591 (hereinafter referred to alternatively as a "needle") attached to and extending coaxially with a connector generally designated 593. The needle 591 is preferably formed from metal tubing (e.g., 304 stainless steel). In the embodiment shown in FIG. 24, the needle 591 is formed from straight tubing to have an open upper (proximal) end 595, defining an inlet port, and an axial passage 597 through the needle terminating at a lower (distal) end 598, defining an outlet port. The outlet port 598 faces axially and is chamfered, as indicated at 599, at an angle, α (e.g., 65°). The chamfered periphery of the outlet port 598 assists in parting the spring-biased duckbill lips 241 of the sealing mechanism 221 used to seal the cannula passages 215 of the reactor module 9M when the distal end of the cannula 21 is inserted into the cannula passages for delivery of liquid phase condensate to the reaction vessels within the modules 9M (FIGS. 12-14). The needle 591 may have an outside dimension (e.g., circular diameter) in the range of about 0.020-0.10 in. (0.051-0.25 cm), and more preferably about 0.028 in. (0.071 cm), an inside dimension (e.g., circular diameter) in the range of about 0.01-0.09 in. (0.03-0.23 cm), more preferably about 0.012 in. (0.030 cm), and a length in the range of about 1.5-5.0 in. (3.8-13 cm), more preferably in the range of about 2.0-4.0 in. (5.1-10 cm), and most preferably about 3.9 in. (9.9 cm). The exterior surface of the needle 591 should be polished for sealing engagement with the seal 229 of the sealing mechanism 221 when inserted into the cannula passages 215 and to reduce wear on the sealing mechanism.

Referring to FIGS. 25 and 26, the connector 593 has a generally cylindric body 601 with a central passage 603 therethrough for receiving the needle 591. The connector 593 is preferably formed from the same material as the needle 591 (e.g., 304 stainless steel). The needle 591 is inserted into and extends the length of passage 603 and is fixed (e.g., laser welded) to the connector 593 at its upper end 595. The connector passage 603 is counterbored to an inside diameter slightly larger than the outside diameter of the needle 591 as indicated at 605 in FIG. 26. The inside diameter of the remainder of the connector passage 603 is sized to snugly receive the upper end of the needle 591. The upper portion of the connector body 601 is formed with external threads 607 for threaded connection to the injection valve 549, as will be described hereinafter. The lower portion of the connector body 601 is formed with opposing wrench flats 609 (only one shown in FIG. 25) to facilitate tightening of the connector in the injection valve 549. For ease of manufacture, the outside diameter of the lower portion of the connector body 601 is the same as the outside diameter of the upper portion of the body at the root of the threads 607 thereon.

Figure 29:
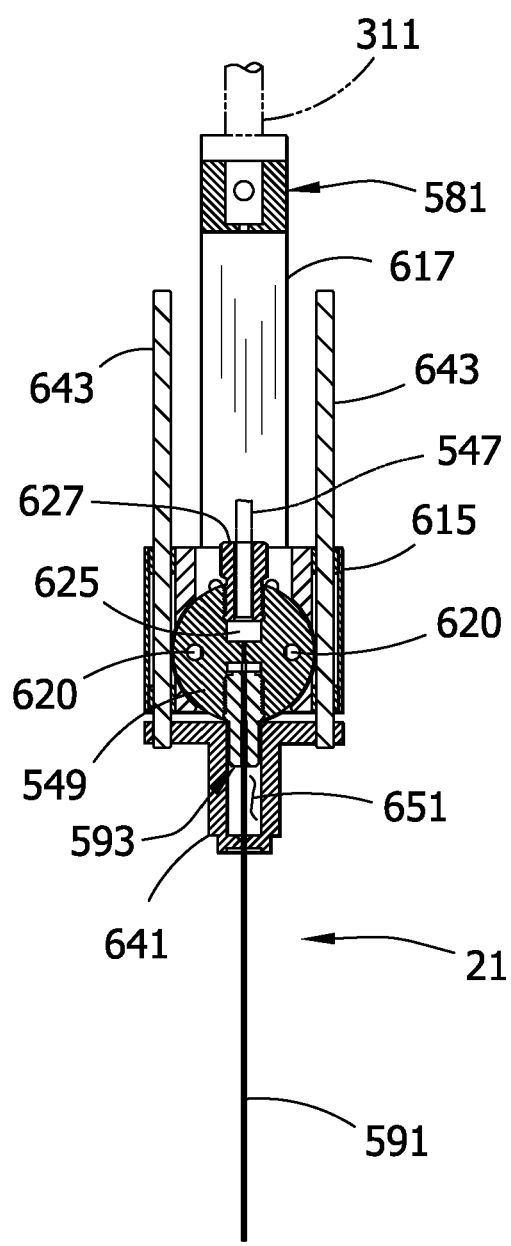
FIG. 29 is a vertical section taken on line 29-29 of FIG. 27.
Figure 29A:
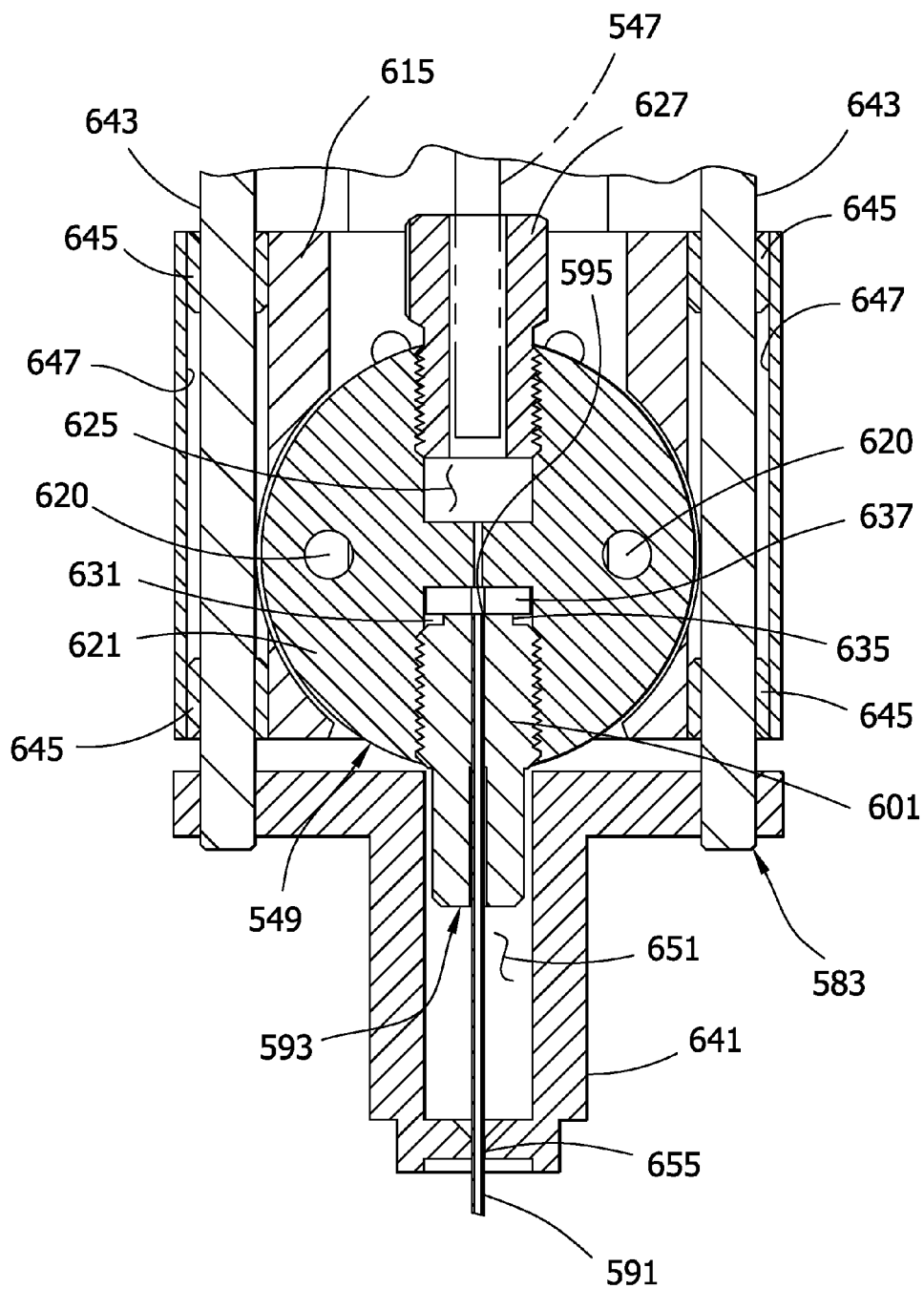
FIG. 29A is an enlarged portion of FIG. 29.
Figure 30:
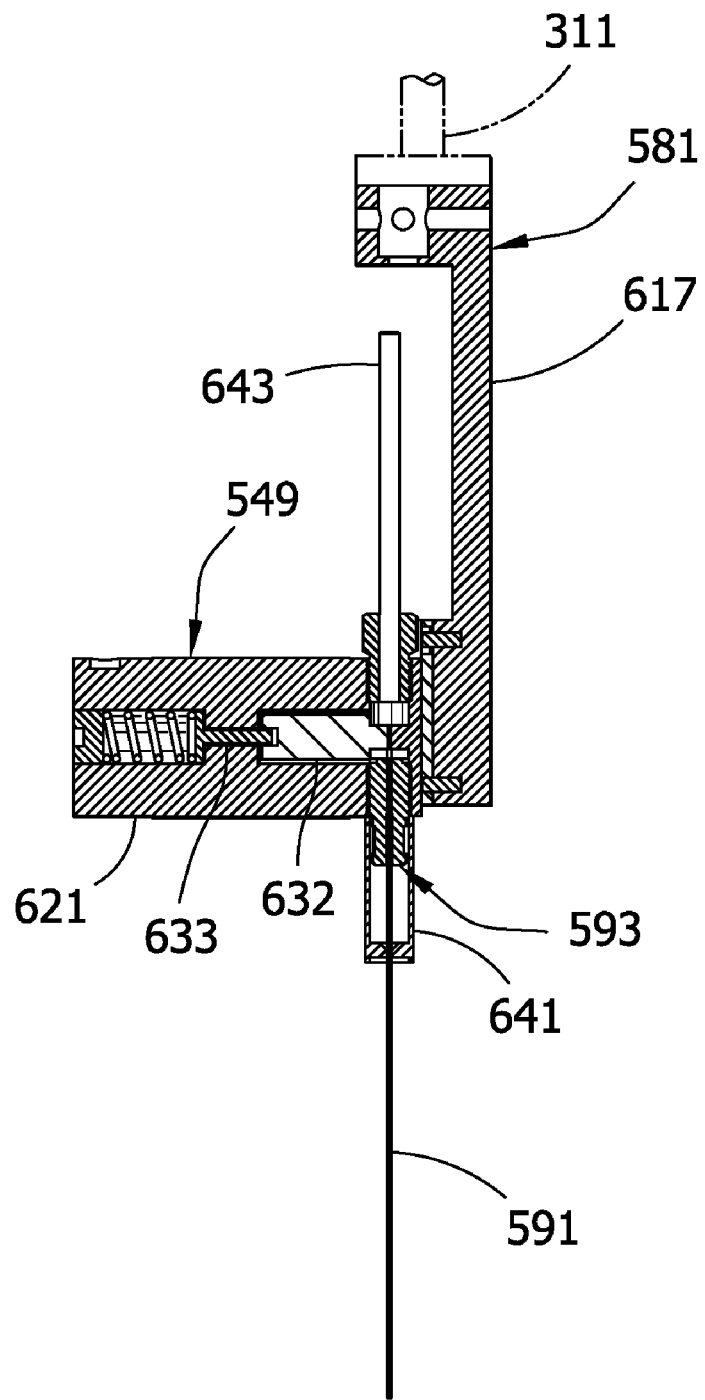
FIG. 30 is a vertical section taken on line 30-30 of FIG. 28.

The condensate delivery system 501 for delivering condensed, low boiling reaction materials may service one or both cannulas 21 mounted on robot arms 307R, 307L. In the embodiment shown in FIGS. 1, 3 and 23, the condensate delivery system includes the cannula 21 mounted on the left robot arm 307L. As shown in FIGS. 27-30, cannula mount and support mechanisms for the cannula design shown in FIGS. 24, 25 and 26 (i.e., including a needle 591 with an axially facing outlet port) are generally designated 581 and 583, respectively. In particular, the cannula mount 581 comprises a bracket 617 secured at its upper end to the elongate rack 311 extending down from the robot arm. A rectangular mounting block 615 is secured to the bracket 617 by fasteners 619 such as socket-head cap screws (FIG. 28). The injection valve 549 is received in a recess in the block 615 and releasably secured to the block by fasteners 620 (FIGS. 29 and 29A). To avoid interference between the injection valve 549 and the reactor module 9M during delivery of condensate to the reaction vessels, the bracket 617 is secured to rack 311 such that the longitudinal axis of the valve 549 extends generally parallel to the length of the reactor module 9M as shown in FIG. 9.

The injection valve 549 comprises a valve body 621 having passaging therein including a first bore 625 which receives a fitting 627 for releasably connecting the condensate flow line 547 to the valve, and a second bore 631 in fluid communication with the first bore 625 by a suitable passage 632 (FIG. 30) in the valve body. In one embodiment, the valve 549 has a solenoid operated valve member 633 movably mounted in the valve body 621 for opening and closing this passage 632 to control the flow of condensate to the cannula 21. The fitting 627 provides a sealing connection of the flow line 547 to the valve body 621 for the flow of low boiling reaction material condensate between the pump 543 and the cannula 21, as occurs during operation of the condensate delivery system. This connection may be effected by means of a plastic (e.g., ETFE) ferrule and stainless steel locking ring (not shown) such as Part No. P259X commercially available from Upchurch Scientific of Oak Harbor, Wash. The condensate flow line 547 may be routed from the cannula mount 581 back to the pump 543 through hollow tubing which forms the elongate rack 311. The second bore 631 of the valve body 621 is tapped for threadably receiving the upper threaded portion of the body 601 of the cannula connector 593. The upper end of the cannula connector body 601 is of reduced diameter, as indicated at 635 in FIGS. 26 and 29A, for sealingly engaging a sealing gasket 637 in the second bore 631 of the valve body 621 to prevent leakage.

As described in greater detail below, in order to maintain the low boiling reaction material condensate in the liquid phase upon being delivered into a reaction vessel, the vessel is maintained at a pressure at least as great as the vapor pressure of the condensate at the temperature conditions prevailing in the vessel. For example, in the case of propylene condensate, the reaction vessel may be pressurized to a pressure of 500 psig or more. Accordingly, the condensate delivery system 501, including the injection valve 549, must be operable to maintain a sufficient pressure in the flow path 509 such that condensate remains in the liquid phase both prior to delivery of the condensate while the valve is closed and during delivery when the valve is open and must also be operable to provide sufficient pressure in the flow path 509 to pump condensate into the pressurized reaction vessels. A solenoid injection valve suitable for use in the system is manufactured by Bio/Chem Valve Inc. of Boonton, N.J., Part No. 100T2-PP493.

The cannula support mechanism 583 for supporting and stabilizing the condensed gas cannula 21 as it is moved also includes a head 641 fixedly mounted on a pair of guide rods 643 which are slidable in bushings 645 mounted in parallel bores 647 in the mounting block 615 (FIG. 29A). The head 641 is provided with a bore 651 for accommodating the diameter of the connector 593. The lower end portion of the connector body 601 has a clearance fit inside this bore 651 to permit movement of the head 641 toward and away from the mounting block 615. The lower end of the head 641 has a central guide hole 655 therein sized for a close clearance fit with the outside diameter of the needle 591 of the cannula at a position intermediate the ends of the needle. The head 641 is movable relative to the mounting block 615 from a lowered position in which the head is spaced from the mounting block for engagement with a more distal portion of the needle 591, and a raised position (shown in FIGS. 27-30) in which the head is closer to the mounting block for engagement with a more proximal portion of the needle to allow for insertion of the more distal portion of the needle into a cannula passage 215. The head 641 and guide rods 643 affixed thereto are biased by gravity toward the lowered position. A retaining pin (not shown) on at least one of the guide rods 643 is engageable with the mounting block 615 for limiting the downward movement of the head. The close clearance fit of the needle 591 in the bore 655 of the head 641 (FIG. 29A) maintains the needle in the required precise angular position, and also stabilizes the needle to prevent buckling of the needle in use, as when the needle is pushed to penetrate the sealing mechanism 221. (This mechanism may be resistant to penetration if the pressures in the reactor chamber is large.) Preferably, the bore 655 in the head 641 is sized to be about 0.001-0.010 in. (0.003-0.025 cm) larger than the outside diameter of the needle 591, and more preferably about 0.004 in. (0.010 cm) larger.

Figure 24A:
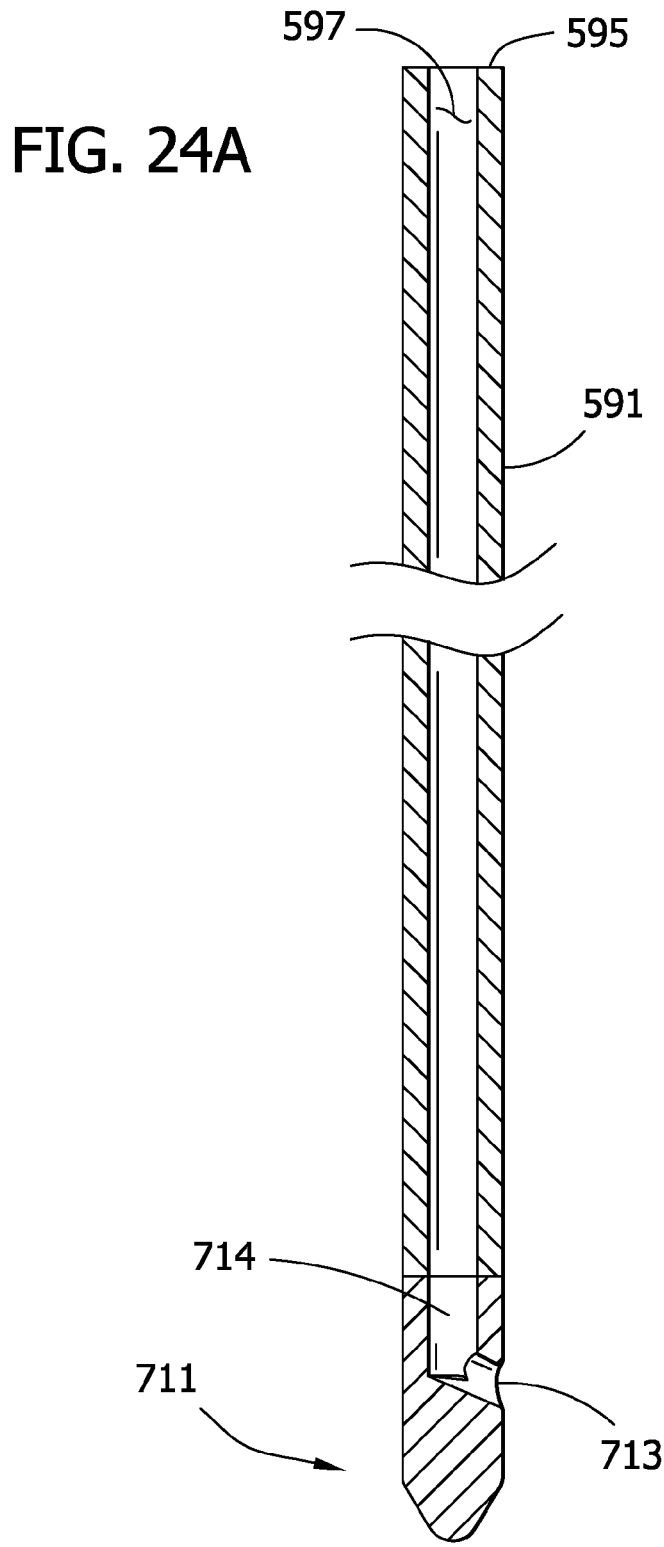
FIG. 24A is a fragmentary vertical section of an alternative needle configuration with a laterally facing outlet port.

An alternative embodiment of the cannula needle is shown in FIG. 24A. In this embodiment, the needle, generally designated 701, has a different distal end configuration. More particularly, the distal end of the needle is rounded, preferably formed by a tip piece 711 having a generally conical distal end. Tip 711 has a laterally facing outlet port 713 in fluid communication with the axial passage 597 of the needle 701 via passage 714 therein. Like the chamfered periphery of the axially facing outlet port 598 of the needle 591 shown in FIG. 24, the conical tip 711 facilitates opening of the duckbill lips 241 of the sealing mechanism 221 used to seal the cannula passages 215 of the reactor modules 9M and reduces the chance of buckling the needle 701 upon insertion into the reaction vessels for delivery of low boiling reaction material condensate. Further, the bluntness of this configuration reduces the wear on the sealing mechanism 221 during insertion of the needle into the cannula passages 215. The needle 701 shown in FIG. 24A can be manufactured by joining (e.g., laser welding) the proximal end of a suitably formed conical tip piece 711 to one end of a piece of straight tubing. Preferably, the end of the tubing to which the tip is joined is prepared by cutting the tubing perpendicular to the axis thereof using electron discharge machining (EDM) to provide a smooth joining surface. Once joined to the tubing, the outlet port 713 of the conical tip piece 711 is in fluid communication with the axial passage 597 of the needle 591 via passage 714 therein. The passage 714 within tip 711 can be formed prior to joining the tip to the tubing, for example, by making two intersecting bores in a solid conical tip, one from the proximal end thereof along the longitudinal axis and the other from the side at an angle to the longitudinal axis. These bores may be formed by EDM or other suitable drilling technique. The tubing and the tip piece 711 are preferably formed of the same material (e.g., 304 stainless steel). After the passage 714 is formed, as by drilling, the inside surfaces of the passage and the axial passage 597 at the juncture between the tubing and the tip 711 are preferably polished or otherwise smoothed to eliminate any irregular surfaces which might inhibit the flow of material through the needle. The exterior surface of the needle 701, including the tip piece 711, should be similarly polished. Preferably, the inside diameter of the passage 714 in the tip 711 is essentially the same as the inside diameter of the axial passage 597 of the needle 591 as set forth above.

A cannula having a needle with a laterally opening outlet port allows condensed liquid phase reaction material to be delivered from the port in a downward direction onto the interior bottom surface of the reaction vessel (e.g., vial 165) or the surface of the contents in the reaction vessel rather than onto the side wall of the vessel when the needle is inserted through the cannula passage 215 and into the reaction chamber. Other needle configurations having rounded tips and laterally opening ports may also be suitable. For example, a cannula having a needle with a rounded tip and a laterally facing outlet port can be constructed as shown and described in the aforementioned co-owned U.S. application Ser. No. 10/040,988, filed Jan. 7, 2002 by Dales et al., now U.S. Pat. No. 6,913,934, issued Jul. 5, 2005, and U.S. application Ser. No. 09/772,101, filed Jan. 26, 2001 by Dales et al., now U.S. Pat. No. 6,759,014, issued Jul. 6, 2004, which are incorporated herein by reference, it being noted that the cannula would not require a reservoir as disclosed therein. For a cannula comprising a needle with a laterally facing outlet port, the cannula mount and support mechanisms for attaching the cannula to the robot arm will differ from that described above so that the cannula can be secured in a fashion to allow the cannula needle to be readily oriented such that the outlet port at the distal end of the needle faces in a generally downward direction when the cannula is in its fluid delivery position. Suitable cannula mounts and support mechanisms for such purpose are shown and described in the two U.S. applications last mentioned above.

Referring again to FIG. 23, the condensate delivery system 501 further comprises a purge station, generally designated 551, which provides a means for evacuating gas bubbles from the flow path 509 that otherwise might be present during delivery of low boiling reaction material condensates and affect the quantity of material introduced into the reaction vessels. The purge station 551 comprises a receptacle 553 connected to a vent line 555 having a bleed valve 557 therein. The vent line 555 passes out of the enclosure 3 through a suitable fitting (not shown). Receptacle 553 has an inlet end 559 provided with a vertical cannula passage and a sealing mechanism in the cannula passage (neither shown) similar to the cannula passage 215 and sealing mechanism 221 associated with the reactor modules 9M as previously described. Thus, the inlet end 559 of the receptacle 553 is adapted to receive the cannula 21 in the same manner as the reactor modules 9M. Low boiling reaction material vapor in the receptacle 553 is vented from the enclosure 3 through the vent line 555 by opening the bleed valve 557. The purge station 551 may further comprise a pressure indicator 561 for monitoring the pressure within the receptacle 553 and an adjustable pressure relief valve 563 for preventing the pressure within the receptacle from exceeding a desired value. The receptacle 553 and other components of the purge station 551 may be secured to an end carriage plate 67a (FIGS. 1 and 3).

Flow line 535 is in selective fluid communication with the vent line 555 through a connecting line 567 provided with a two-way vent valve 569. Opening valve 569, allows venting of the flow path 509 from the reservoir chamber 518 of the accumulator assembly 513 to the condensate pump 543. Flow line 535 is also provided with an adjustable pressure relief valve 571 in communication with the vent line 555 through connecting line 567 to prevent excessive pressures within the condensed gas delivery system.

The operation of the robot system 23, the various valves for delivering reaction materials to and from the reaction vessels, and other electronic components of the system are under the control of a suitable system processor and software (or firmware). Reference may be made to the aforementioned International Application No. PCT/US99/18358 (International Publication No. WO 00/09255) for more detail. For example, the robot system 23 may be operated to use the left robot arm 307L and associated cannula 21 to deliver low boiling reaction material condensate to the reactor modules 9M, while the right robot arm 307R and associated cannula 21 is used to deliver a different reaction material to the reactor modules 9M (e.g., a reaction material aspirated from the vials in rack 17 in FIGS. 1 and 3). Alternatively, the cannula mounted on both robot arms 307L, 307R may be used to deliver low boiling reaction material condensate, the left robot arm 307L servicing one bank of reactor modules 9M (e.g., the left three modules in FIGS. 1 and 3) and the right robot arm 307R servicing the remaining modules 9M (e.g., the right three modules in FIGS. 1 and 3). Using multiple robot arms to service different sections of the reactor matrix speeds set-up of the parallel reactor system and manipulation during the course of the reactions. Alternatively, the robot system could have only one arm 307 to service all modules, or three robot arms could be used. When using multiple robot arms, different arms could be dedicated to delivering different reaction materials to all or less than all of the reactor modules. The precise locations of the various components of the reactor system (e.g., cannula passage 215 entry ports on the reactor modules 9M and purge station receptacle 553, wash towers 101, 111, ultrasonic cleaners 141, vial positions in the racks 17) are programmed into the robot system in a manner which will be understood by those skilled in the art.

The general operation of the parallel reactor including the condensate delivery system 501 shown in FIG. 23 for delivering condensed low boiling reaction material to the reaction vessels in the reactor module 9M will now be described. In general, low boiling reaction material can be delivered to one or more reaction vessels, simultaneously or sequentially, either before or during the course of a reaction carried out in batch, continuous or semi-continuous fashion. If the reaction protocol requires that one or more low boiling reaction materials be introduced into the reaction vessels in the form of a liquid phase condensate along with other components (e.g., gas and liquid reactants, catalysts, etc.), it is generally preferable to deliver the low boiling reaction material(s) to the reaction vessels first.

First, vessels and stirrers are installed and the reactor covers 195 are replaced and secured. The temperature within the reaction vessels is set and controlled as desired using, for example a temperature control system associated with the reactor modules 9M such as that shown and described in the aforementioned International Application No. PCT/US99/18358 (International Publication No. WO 00/09255). Optionally, but preferably, a set of purge procedures is followed to purge all lines 57 and reaction vessels so that these components contain a desired atmosphere or gas. In the case where a low boiling reaction material condensate is to be delivered to the reaction vessels, the vessels are purged using the gas form of the low boiling reaction material to substantially remove all other gases from the reaction vessels and saturate the environment within the vessels with the gaseous low boiling reaction material. This may be achieved by delivering the gaseous reaction material to the vessels through process gas lines 57 connected to one of the gas manifolds 281 of the reactor block 151. Once the reaction vessels are filled such that the pressure therein is equal to the pressure of the source of the gaseous low boiling reaction material, the solenoid valves 285 in the process gas lines are closed and the valves in the vent lines 57 connected to the other manifold 281 on the opposite side of the reactor block 151 are opened to vent the reaction material from the reaction vessels. Preferably, the reaction vessels are filled with the gaseous form of the low boiling reaction material and subsequently vented several times to ensure substantially complete removal of all other gases from the vessels. After the last time the reaction vessels are filled with the gaseous low boiling reaction material, the vessels are not vented so as to pre-saturate the environment within the vessels with the gaseous low boiling reaction material. The pressure within the reaction vessels upon being filled the last time with the gaseous low boiling reaction material is preferably at least as great as the vapor pressure of the low boiling reaction material. For example, in the case of propylene, the pressure in the reaction vessels will typically be from about 120 to about 160 psig depending on the ambient temperature and the temperature of the reactor modules 9M.

The reservoir chamber 518 of the accumulator vessel 515 is charged with a quantity of the low boiling reaction material to be introduced into the reaction vessels. This is achieved by first pre-pressurizing (e.g., to 40 psig) the other chamber 517 of the accumulator vessel 515 by introducing pressurizing fluid from source 527 to expand the flexible barrier 521. The pressure in the chamber 517 as monitored using pressure indicator 532 and is controlled using a regulator associated with the pressurizing fluid source 527. With valve 539 in flow line 535 open and vent valve 569 closed, the valve on the condensate source 507 and valve 523 in flow line 525 are opened to permit low boiling reaction material condensate to flow from source 507 into the flow path 509 and fill reservoir chamber 518. After several minutes, the pressure within the flow line 525, reservoir chamber 518 and flow line 535 as monitored using pressure indicator 531 will equilibrate to the pressure of the condensate source 507, which is preferably at least as great as the vapor pressure of the reaction material. Once the reservoir chamber 518 is fully charged, valve 523 is closed to isolate the condensate source 507 from the remainder of the condensate delivery system 501. The pressure within the reservoir chamber 518 and flow line 535 upstream of the pump 543, now filled with condensed liquid phase reaction material, is then increased isothermally to the desired value by setting the regulator associated with pressurizing fluid source 527 such that additional pressurizing fluid flows into the other chamber 517 of the accumulator vessel 515. The pressure within the reservoir chamber 518 should be increased well above the vapor pressure of low boiling reaction material contained therein (i.e., to a point above the liquid-vapor saturation curve) to ensure that the reaction material remains in the liquid phase despite any pressure drop experienced as the material passes through the flow path 509. That is, the difference between the pressure within the reservoir chamber 518 and the pressure drop across the flow path 509 downstream of the reservoir chamber should remain at least as great as the vapor pressure of the low boiling reaction material within the flow path, and preferably, well in excess of the vapor pressure of the reaction material. Typically, this requires that the reservoir chamber 518 be pressurized to a pressure at least 100 psi in excess of the vapor pressure of the low boiling reaction material contained therein. For example, in the case of propylene, which has a vapor pressure of about 154 psig at 25° C., condensate in the reservoir chamber 518 is preferably pressurized to at least about 300 psig. For 1,3-butadiene, which has a vapor pressure of about 26 psig at 25° C., condensate in the reservoir chamber 518 is preferably pressurized to at least about 200 psig.

Preferably, the condensate delivery system 501 is then purged to remove gas bubbles from the flow path 509 that may be trapped during charging of the accumulator 513. This may be achieved using the purge station 551. The robot system 23 is actuated to move the cannula 21 of the condensate delivery system 501 (e.g., the cannula mounted on robot arm 307L) over the inlet end 559 of the receptacle 553 in its home (or non-tilted) position such that the cannula is oriented vertically. The cannula 21 is thereafter inserted into the vertical cannula passage of the receptacle 553 and through the sealing mechanism therein. Once the cannula 21 is inserted, the pump 543 aspirates a measured volume of pressurized condensate into its syringe from flow line 535, the injection valve 549 is opened and the pump forces the volume of pressurized condensate from the syringe through flow line 547 and the cannula into receptacle 553. The injection valve is then closed. Preferably, several small volumes (e.g., 1.0 ml each) of condensate are delivered to the receptacle 553 in this manner to ensure gas bubbles are removed from the flow path 509. The pressure in the receptacle 553 will typically increase to somewhat above the vapor pressure of the low boiling reaction material due to displacement of the headspace volume by the condensate and can be monitored using pressure monitor 561. The robot system 23 is then operated to lift the cannula 21 along the Z-axis of robot arm 307L to withdraw the cannula from the cannula passage of the receptacle 553 to a height sufficient to clear the reactor modules 9M. After purging, low boiling reaction material can be vented from receptacle 553 through line 555.

The robot system is then actuated to move the cannula 21 to each of the cannula passages 215 of the reactor modules 9M corresponding to the reaction vessels that are to receive low boiling reaction material condensate. More particularly, with the cannula 21 at a height along the Z-axis of the respective robot arm (e.g., 307L) sufficient to clear the reactor modules 9M, the power actuator 329 is operated to rotate the robot arm on its R-axis to tilt the cannula to its fluid-delivery angle (e.g., 25°); and the cannula is moved along X and/or Y-axes to a position in which the needle is ready for insertion into the cannula passage 215 leading to the first reaction vessel to be loaded with the low boiling condensate, as shown in FIG. 12. The cannula 21 is held in this position for a short dwell period (e.g., 1-2 seconds) sufficient to allow any vibratory or harmonic movement of the needle to cease, following which the angled cannula is moved along the Z-axis of the elongate rack 311 to cause the needle 591 to penetrate the wiper member 265 to wipe any material off the outside of the needle. The needle continues to advance into the entry port of the cannula passage 215 and through the annular seal 229 to a position (FIG. 13) immediately upstream of the duckbill valve lips 241, where the advance of the needle 591 is paused while the robot is signaled to increase the speed of the needle along the Z-axis of the rack 311. After a dwell in the position of FIG. 13, the needle is pushed forward at a relatively high speed through the valve, forcing the lips 241 of the duckbill valve apart, and down through the passage 215 to the fluid delivery or dispensing position at the fluid transfer location shown in FIGS. 10 and 14. As the needle approaches its dispensing position, the head 641 of the cannula support 583 engages the wiper member frame 263 and remains in that position as the needle continues to advance to the position shown in FIG. 10 where the outlet port at the distal end of the needle 591 is disposed inside the vial 165 at a level above the contents of the vial.

In a preferred embodiment, the reaction vials 165 used in the reactor modules 9M should have a cross-sectional shape corresponding to the cross-sectional shape of the wells 163 (e.g., circular), a volume somewhat greater than the total volume of reaction materials and/or products to be contained by a vessel, and a height such that when the vial is placed in a well 163, the rim of the vial is at an elevation below where the cannula passage 215 enters the well. Preferably, the open upper end of the reaction vial is positioned for receiving the distal end of the needle 591 in its delivery or dispensing position, with the outlet port of the needle located inside the vial at an elevation below the upper end of the vial. Thus, the height of the vial will vary depending on various factors, including the angle of the cannula passage 215, the reactor height, the depth of the well 163, and other factors. In the preferred embodiment, the vial has a rounded bottom and a cylindric side wall extending up from the bottom and terminating in a rim defining an open upper end of the vessel. For use in a reactor block of the type shown in FIG. 10, the side wall of the reaction vial has an inside diameter in the range of about 0.5-2.5 in. (1.3-6.4 cm), more preferably in the range of about 0.5-0.75 in. (1.3-1.9 cm), and most preferably about 0.609 in. (1.55 cm); the vial has an overall height in the range of about 1.0-4.0 in. (2.5-10.2 cm), more preferably in the range of about 1.5-3.0 in. (3.8-7.6 cm), and most preferably about 2.15 in (5.46 cm); and the vial defines a volume in the range of about 5-200 ml, and preferably in the range of about 5-20 ml, and most preferably about 10 ml. Although a preferred embodiment includes the use of reaction material-containing vials 165, the use of vials or other liner is not required.

The injection valve 549 is maintained in a closed position until the needle 591 of the cannula 21 is inserted in a cannula passage 215 to the stated fluid delivery or dispensing position (FIG. 10). With the needle 591 in its delivery or dispensing position, the pump 543 aspirates a measured volume of pressurized low boiling reaction material condensate from flow line 535 into its syringe, the injection valve 549 is opened and the pump forces the volume of pressurized condensate from the syringe through flow line 547 and the cannula 21 into the vial 165. In order to deliver condensate to the reaction vessels, the pump 543 must overcome the pressure at which the contents of the vessel are maintained (preferably, a pressure at least as great as the vapor pressure of the low boiling reaction material) as well as the pressure drop in the flow path 509 downstream of the pump (e.g., flow line 547 and cannula 21). Accordingly, the pump 543 should have the capability of generating a delivery pressure of up to 500 psig or greater. Preferably, the syringe pump 543 is used to deliver condensate to the reaction vessels in relatively small volumes (e.g., 1.0 ml). If the reaction protocol calls for larger quantities of low boiling condensate to be delivered to a reaction vessel, the total amount can be introduced incrementally (e.g., in 1.0 ml portions). The syringe pump is also operable to deliver fractional volumes (e.g., 0.2 ml) of pressurized condensate as needed. Once the pump 543 has completed operation following each aspiration of condensate into the syringe, the injection valve 549 remains open for a short period (e.g., 5 seconds) before closing to allow condensate in line 547 to flow into the reactor vessel. The pump 543 then aspirates a further quantity of pressurized condensate from flow line 535 into its syringe in preparation for the next delivery. In typical research reactor applications, the total amount of low boiling reaction material condensate delivered to a reaction vessel will vary from about 250 µl to about 10 ml, more preferably from about 0.5 ml to about 5 ml, and most preferably from about 4 ml to about 5 ml. Larger volumes are possible, for example, in small production reactor applications.

In some instances, it may be necessary to introduce additional low boiling reaction material condensate into the reaction vessel in order to compensate for the dead volume in the flow path 509 downstream of the injection valve 549 to the outlet port of the cannula 21 prior to delivery of the first quantity of condensate to the reaction vessel. Thus, for example, if the quantity of low boiling reaction material to be delivered to the reaction vessels is a whole number multiple of 1.0 ml, the last quantity of condensate delivered to the vessel will be a fraction of 1.0 ml equivalent to this dead volume in the flow path 509. The volume of this portion of the flow path can be readily determined and is preferably minimized (e.g., 200 µl). In addition to minimizing the dead volume in the flow path 509 downstream of the pump 543, reducing the inside diameter of flow line 547 and the needle 591 is also important to provide sufficient flow resistance once the injection valve 549 is opened so as to facilitate delivery of an accurate volume of material. In the case of propylene as the low boiling reaction material, this can be achieved with a flow line 547 having an inside diameter of about 0.004-0.012 in. (0.010-0.030 cm), preferably about 0.010 in. (0.025 cm), and a needle 591 having a passage 597 with an inside diameter of about 0.006-0.016 in. (0.015-0.040 cm), preferably about 0.012 in. (0.030 cm) and the length of flow path 509 downstream of the pump 543 is preferably about 100-120 in. (2.5-3 m). The inside diameter of flow lines 525 and 535 are typically about 0.062-0.125 in. (0.159-0.318 cm) and the total length of the flow path 509 is typically from about 15-22 ft. (4.6-6.7 m).

Following delivery of the condensate material to the vial 165 in the first reaction vessel, the robot is operable to withdraw the distal end of the needle 591 at high speed past the lips 241 of the duckbill valve to the position shown in FIG. 13 between the lips 241 and the seal 229. The needle is held in this position for a short dwell period (e.g., 1-2 seconds) sufficient to enable the lips 241 of the valve to close and for the robot speed along the Z-axis of the rack to be reduced to a slower speed (i.e., the robot arm speed along the Z-axis is reset at this point to normal). During this time the annular seal 229 is in sealing engagement with exterior surface of the needle 591 to prevent any substantial leakage past the lips while they are closing. The robot then moves the needle at the slower speed to a position where it is completely withdrawn from the cannula passage and the cannula is again at a height sufficient to clear the reactor modules 9M. As the needle 591 is withdrawn from the cannula passage 215, the head 641 of the cannula support 583 slides under the force of gravity to its lowered position in which the head is spaced from the mounting block 615 for engagement with a more distal portion of the needle 591.

Upon withdrawal of the cannula 21 from the cannula passage 215, condensate in the flow path 509 downstream from the injection valve 549 will vaporize and escape into the enclosure 3. To minimize this waste, the needle passage 597 should be small in diameter (e.g., about 0.012 in. (0.030 cm)), and the overall length of the flow path 509 between valve member 633 of the injection valve 549 and the outlet port of the needle 591 should be as short as practical.

The flow rate of condensed low boiling reaction material from the flow line 535 into the syringe pump 543 and from the syringe pump to the cannula 21 is preferably controlled to avoid cavitation and substantial pressure drops which could cause vaporization of the condensate. For propylene and 1,3-butadiene condensate, for example, a preferred flow rate is up to 150 µl/second, more preferably from about 50 to about 100 µl/second.

After each delivery of low boiling reaction material condensate to a reaction vessel and withdrawal of the cannula 21 from the cannula passage 215, the cannula may optionally be cleaned using the appropriate wash tower 101, 111 and/or ultrasonic cleaning device 141. The power cylinder 329L of robot carriage 305L is actuated to rotate robot arm 307L to its home (or non-tilted) position in which the needle is vertical. The cannula is moved along X and/or Y-axes to a position over the desired cleaning apparatus and then lowered for cleaning.

The robot system 23 is operated to move the cannula 21 to a second and subsequent reaction vessel for delivery of condensate as necessary to load the reactor. The speed at which the robots move the cannulas may vary to reduce the time needed to load the vessels. For example, the cannula 21 may be moved at higher speeds when larger distances are being traversed, and at slower speeds at other times, as when the cannula is approaching various destinations and during the initial stages of needle insertion into a cannula passage 215.

Once the low boiling reaction material condensates have been loaded into the reaction vessels, the other liquid components of the reaction mixtures are introduced into the vessels. For example, if catalytic materials for a polymerization reaction are to be characterized, the vessels may contain a solvent or diluent and other liquid reagents (e.g., a liquid co-monomer, such as 1-octene, 1-hexene or styrene, if desired). Suitable solvents may be polar or non-polar and include toluene and hexanes. Thereafter, the temperature set point of the reaction is set and the temperature is allowed to stabilize. Then the reaction vessels are charged with the atmospheric gas for the reaction, which may be an inert gas or reactant gas, in order to bring the vessels to the desired operating pressure, which is typically in the range of from 0-500 psig. If the reaction atmosphere is a reactant gas (e.g., a gaseous monomer, such as ethylene), the liquid reagents are typically allowed to become saturated with the gaseous monomer such that the reaction vessel contents reach an equilibrium point. If required, a catalyst is introduced typically as the last component of the reaction mixture. After the reaction vessels have been loaded, the reactions are monitored for a desired interval of time or reaction stage or until the reactions are considered to be finished, following which quenching gas (e.g., CO2) is delivered to the vessels through lines 57 to terminate the reaction.

After the reaction is completed, and prior to removing samples and vessels, appropriate venting procedures should be followed to ensure that there is no loss of product through the vent lines. Specifically, if venting of the reaction vessels is too fast particulate materials (e.g., such as polymer particles) may vent through the vent lines 57. Venting procedures may include slow venting (e.g., vent valve cycling) and/or inert gas purging (e.g., argon or nitrogen). After the appropriate venting procedures are complete, the reactor covers 195 are removed to allow removal of the reaction samples and replacement of the removable vials and stirrers 175.

When introducing a low boiling reaction material into a reactor in the form of a liquid phase condensate, care should be taken to maintain the reaction material in the liquid phase, taking into account the localized temperature and pressure conditions within the reactor system.

Figure 31:
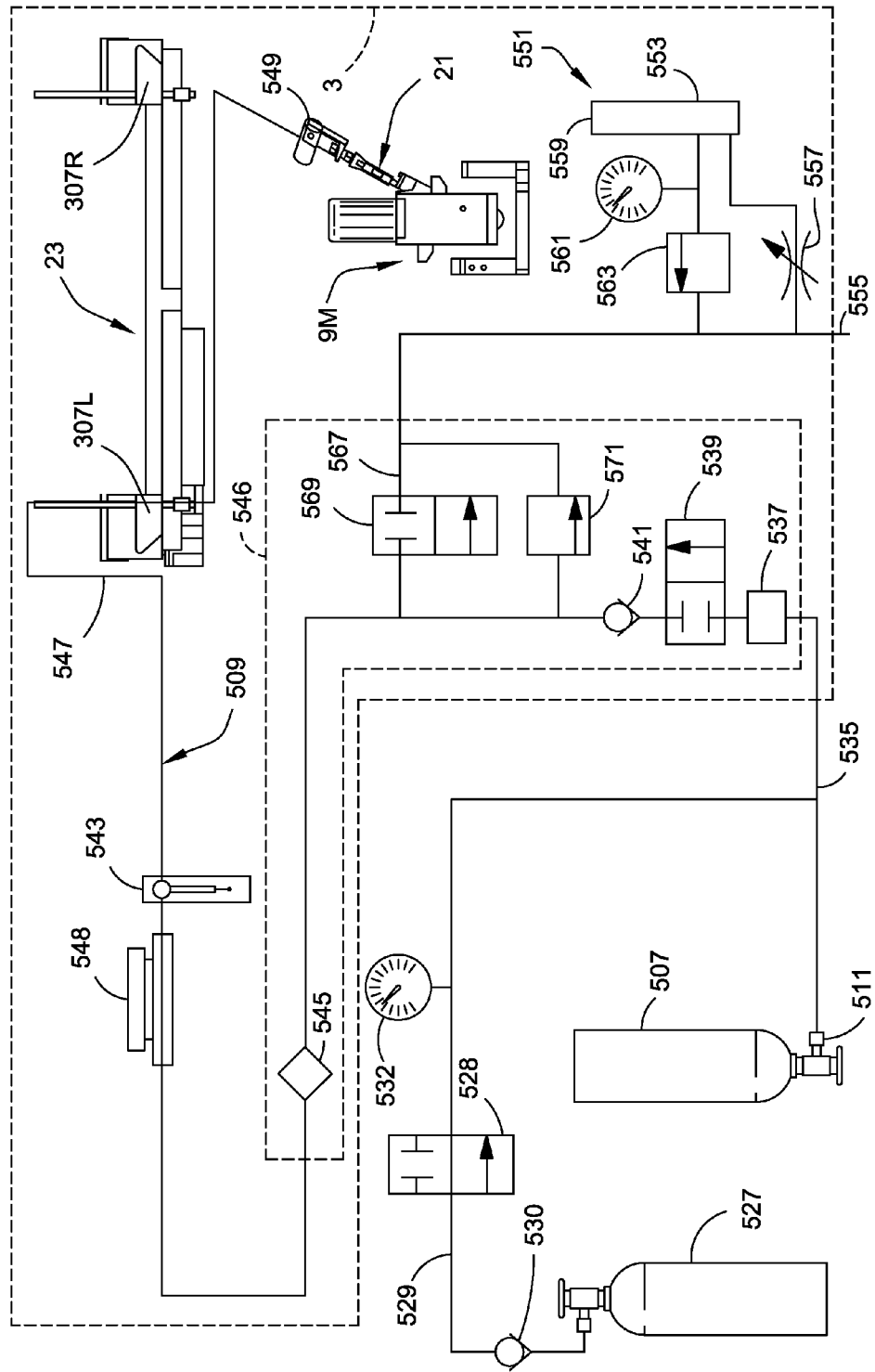
FIG. 31 is a schematic flow diagram of the parallel reactor showing key components of another embodiment of the condensate delivery system.

FIG. 31 is a schematic flow diagram of the parallel reactor showing key components of an alternative embodiment of the condensate transfer system 501 for delivering low boiling reaction materials to the reaction vessels in the form of liquid phase condensates. In contrast to the condensate transfer system previously described and shown in FIG. 23, the system of FIG. 31 operates on the basis of cooling the low boiling reaction material to reduced temperatures (i.e., below the boiling point of the reaction material at the prevailing pressure) in order to deliver the material in the form of a liquid phase condensate. Although shown as a separate embodiment, this temperature-control approach can also be used together with the previously described pressure-control approach.

Figure 32:
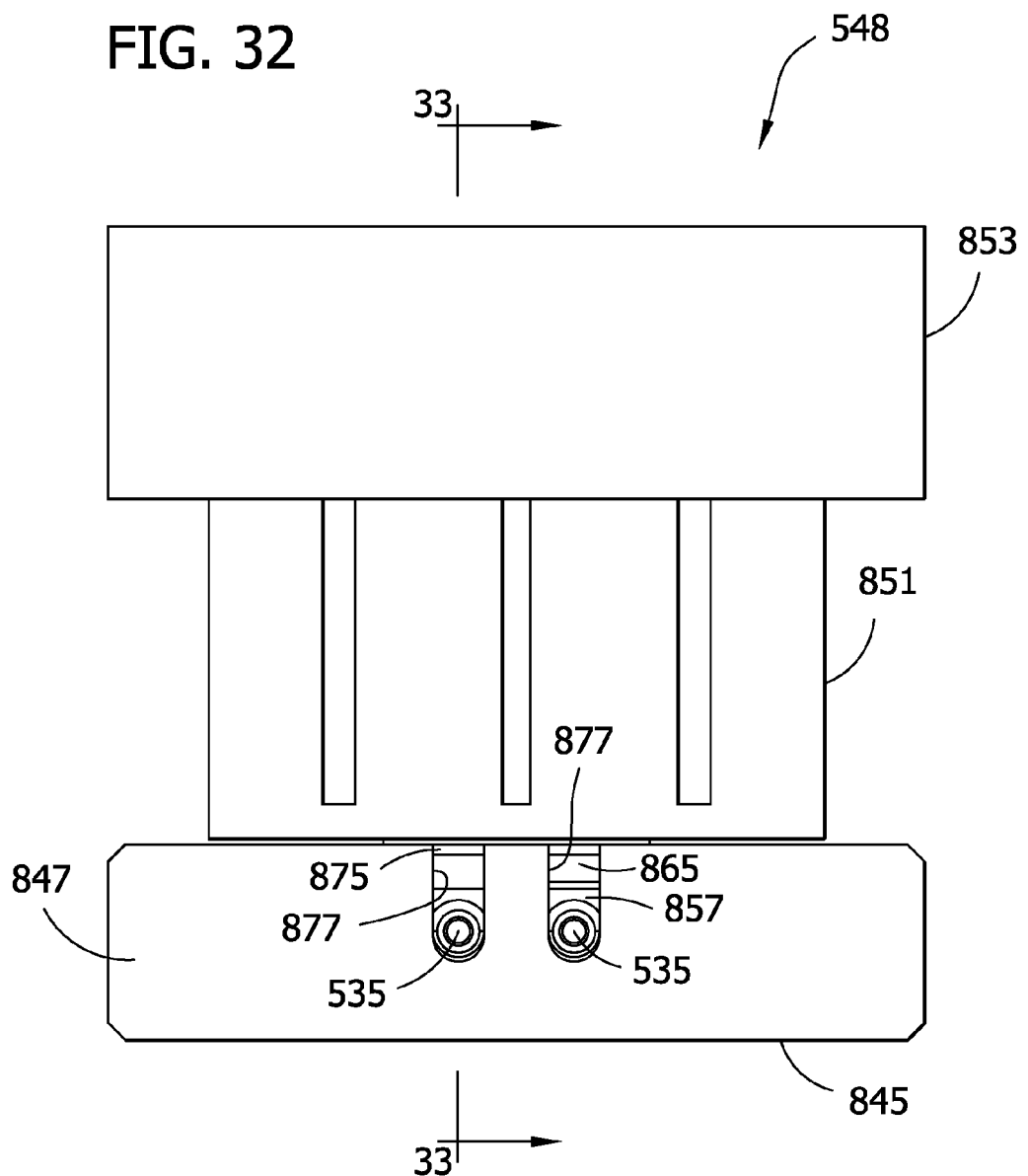
FIG. 32 is a side elevation of a condenser shown in the flow diagram of FIG. 31.
Figure 33:
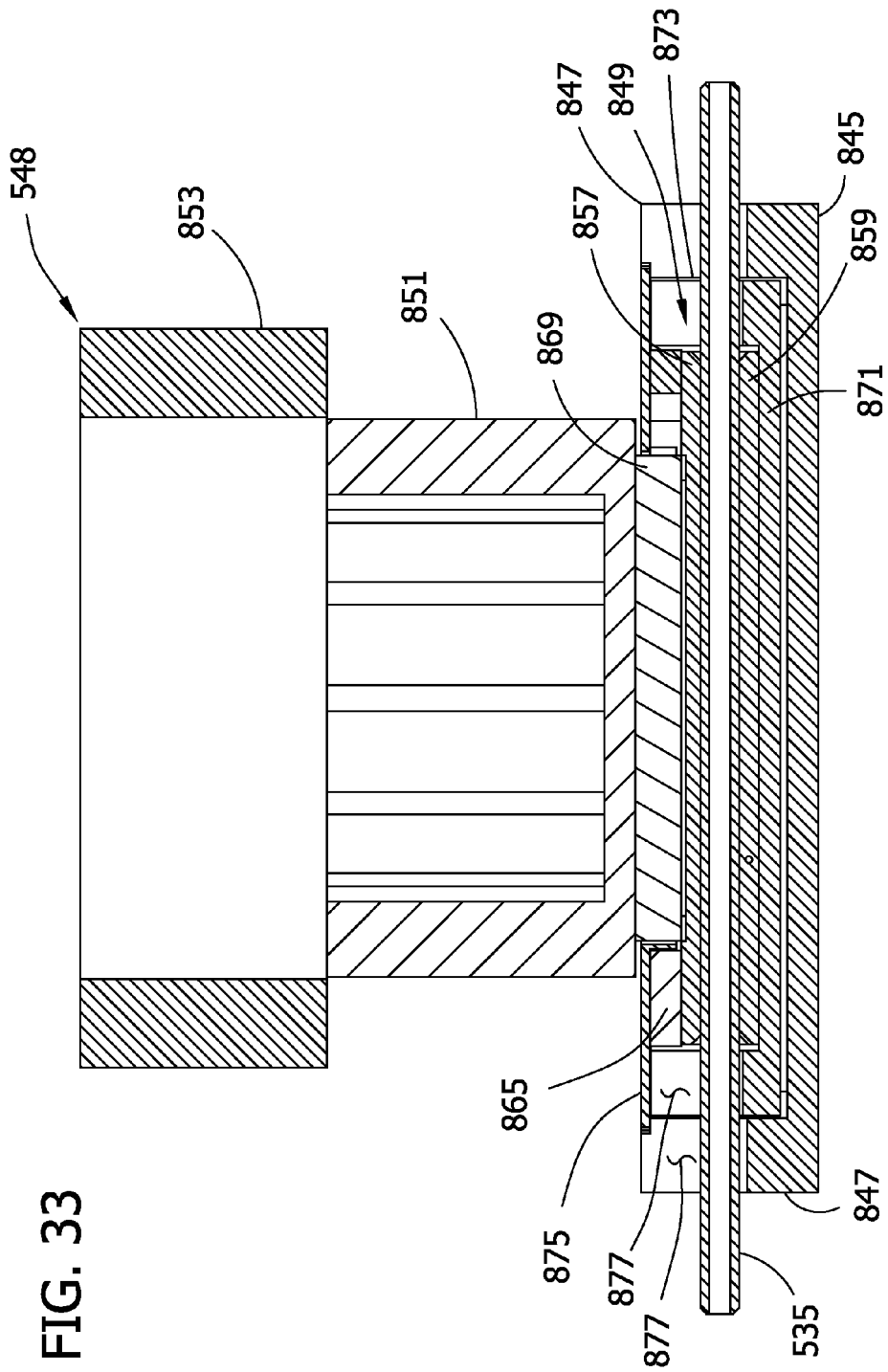
FIG. 33 is a vertical sectional view along lines 33-33 of FIG. 32.

Many components of the condensate transfer system shown in FIG. 31 are the same as that previously described. The primary difference is that a means for cooling the low boiling reaction material in flow path 509 is provided between the condensate source 507 and the outlet port of the cannula 21. For example, a heat sink, such as a condenser, generally designated 548, may be positioned in heat transfer relation with at least a portion of the flow line 535, preferably just upstream of the syringe pump 543. As best shown in FIGS. 32 and 33, the condenser 548 comprises a base 845 with a peripheral wall 847 extending up from the base, and a series of components mounted on the base inside the wall, including a thermoelectric assembly, generally designated 849, for cooling (and heating, if necessary) flow line 535, a heat sink 851 and a fan 853. The thermoelectric assembly 849 comprises a pair (i.e., upper and lower) metal (e.g., copper or aluminum) heat transfer plates 857, 859 having mating grooves for receiving the flow line 535 (or lines if more than one is provided), a thermoelectric device 869 for cooling (and heating, if necessary) the heat transfer plates, and suitable fasteners (not shown) for clamping the thermoelectric device and heat transfer plates together with the flow line 535 in heat transfer contact with the heat transfer plates and the upper heat transfer plate 857 in heat transfer contact with the thermoelectric device 869. A suitable thermoelectric device is commercially available from Tellurex Corporation of Traverse City, Mich., Part No. C1-14-63-165. The entire thermoelectric assembly 849 is thermally insulated by upper and lower insulating members 865, 871 of thermal insulating material (e.g., calcium silicate or other thermal insulating material). The lower insulating member 871 has an upwardly extending rim 873 defining a cavity for receiving the thermoelectric assembly 849. The upper insulating member 865 overlies the upper heat transfer plate 857 and surrounds the thermoelectric device 869. A cover plate 875 is secured to the peripheral wall 847 of the base 845 to enclose the thermoelectric assembly 849 and insulating members 865, 871. The flow line 535 extends out through notches 877 formed in the rim 873 of the lower insulating member 871 and the upstanding wall 847 of the base 845.

A temperature controller (not shown) is provided for controlling the temperature of the condenser 548. The temperature controller for controlling the temperature of the thermoelectric device 869 may be of any suitable type, such as an assembly including a thermocouple for sensing the temperature of one of the heat transfer plates 857, 859 (e.g., the lower plate), a display for displaying the temperature, and a variable DC power supply (e.g., a 0-30 VDC, 0-6A power supply). In this embodiment, DC power is applied to the thermoelectric device 869 to cool the heat transfer plates 857, 859 and the contents of flow line 535 by indirect heat transfer. While maintaining a constant voltage, the current may be varied until a desired temperature is achieved, as indicated by the display, using known performance characteristics of the thermoelectric device 869 as a guide. An automatic temperature controller comprising a thermostatic controller for cycling the thermoelectric device 869 on and off as needed may also be used.

As in the previously described embodiment of the condensate delivery system, the source 507 of the low boiling reaction material is preferably maintained at a pressure at least as great as the vapor pressure of the reaction material (i.e., the source comprises condensed gaseous reaction material under pressure). As shown in FIG. 31, condensate source 507 is a pressurized cylinder containing a saturated vapor of the low boiling reaction material in equilibrium with liquid reaction material condensate at ambient temperature (e.g., 25° C.). In order to deliver liquid phase low boiling reaction material into the flow path 509, the cylinder is inverted such that the liquid level in the cylinder is above the outlet port 511 through which the condensate is removed from the cylinder. A pressurizing fluid having a boiling point lower than the boiling point of the low boiling reaction material (e.g., $N_2$, He, Ar or other inert gas) may be introduced from a source 527 through flow line 529 into the headspace above the liquid level in the source 507 to further pressurize the condensate contained therein. However, because in this embodiment of the condensate delivery system 501 the low boiling reaction material is cooled in the flow path 509, it may be not necessary to increase the pressure within the condensate source significantly above the vapor pressure of the low boiling reaction material contained therein. Moreover, depending on the solubility of the pressurizing gas in the low boiling reaction material, this practice will result in the condensate introduced into the reaction vessels having some quantity of the pressurizing fluid dissolved therein. Flow line 529 is provided with a two-way valve 528 and check valve 530 for preventing backflow of low boiling reaction material condensate into the source 527 of the pressurizing fluid. The pressurizing fluid source 527 is provided with a regulator (not shown) and the pressure in lines 529 and 535 and source 507 is monitored by pressure indicator 532.

During operation, low boiling reaction material condensate is withdrawn from the source 507 by opening the valve on the source and directed through outlet port 511 into flow line 535. The thermoelectric device 869 within the condenser 548 functions to cool the low boiling reaction material in the flow line 535 to a temperature sufficient to ensure that gaseous reaction material is condensed to (or remains condensed in) the liquid phase, thereby avoiding bubbles and pockets of vaporized gas which might interfere with the delivery of accurate quantities of reaction material through the cannula 21 to the reaction vessels. The low boiling reaction material in flow line 535 should be cooled well below the boiling point of the material at the prevailing pressure conditions. For example, in the case of propylene introduced into the flow path 509 at a pressure near its vapor pressure of about 154 psig at 25° C., propylene condensate is preferably cooled to a temperature at least as low as about −40° C., more preferably, at least as low as about −80° C. in the condenser 548. For 1,3-butadiene introduced into the flow path 509 at a pressure near its vapor pressure of about 26 psig at 25° C., condensate is preferably cooled to a temperature at least as low as about −5° C., more preferably, at least as low as about −10° C. in the condenser 548. As discussed earlier, the flow rate of low boiling reaction material condensate from the source 507 to the syringe pump 543 and from the syringe pump to the cannula 21 is preferably controlled to avoid cavitation and substantial pressure drops which could cause vaporization of the reaction material condensate. When using the condensate delivery system 501 depicted in FIG. 31 to deliver condensed propylene and 1,3-butadiene gases, for example, a preferred flow rate is up to 50 μl/second, and more preferably, in the range of from about 20 to about 30 μl/second.

Although it is preferred that the low boiling reaction material withdrawn from the source 507 and passing through flow line 535 to the condenser 548 be in liquid form, it should be understood the low boiling reaction material may be introduced as a gas into flow path 509 and condensed to liquid form upon cooling in the condenser. However, operating the condensate delivery system in this manner may necessitate additional purging of the flow path 509 prior to delivering condensate to the reaction vessels to ensure removal of gas bubbles from the flow lines.

It should be further understood that condenser described above could vary considerably in construction and operation and that other cooling means could be employed to cool the low boiling reaction material in the flow path 509 and condense or maintain them in the liquid phase without departing from the scope of the present invention. For example, if a chilled coolant system is used to cool the reactor modules 9M, the coolant from the same system could be used in a condenser to cool a portion of the flow line 535. Alternatively, a portion of the flow path 509 could be routed through a low temperature bath (e.g., liquid $N_2$). Moreover, the cooling of low boiling reaction material could take place at multiple positions along flow path 509 (e.g., to compensate for localized heating effects).

For most applications, it is believed that the condensate delivery system shown in FIG. 23 in which the cannula is supplied with pressurized low boiling reaction material condensate from a reservoir maintained at relatively high pressure and ambient temperature is generally preferred. This is because the low temperature embodiment shown in FIG. 31 may require additional engineering efforts to minimize or avoid localized heating and vaporization of the low boiling reaction material along the condensate flow path. As previously noted, it is also contemplated in a further embodiment of the present invention that the condensate delivery system include both a high pressure reservoir of the low boiling reaction material and means for cooling the condensate in the flow path to the cannula. For example, a condenser could be located anywhere along the flow path 509 of the system shown in FIG. 23 to compensate for localized heating effects that tend to vaporize the low boiling reaction material. Alternatively, the flow path 509 of the pressure-control system shown in FIG. 23 may be maintained at ambient temperature.

It will be observed from the foregoing that the parallel reactor system of the present invention represents an advance over prior systems. The system can be used to deliver accurate quantities of hard-to-handle low boiling reaction materials in the form of liquid phase condensates. Because the condensate delivery system maintains the low boiling reaction material in liquid form, there is no need to cool the reactor modules 9M or other equipment to the extremely cold temperatures which would otherwise be necessary to condense the gas.

The following example is simply intended to further illustrate and explain the present invention. This invention, therefore, should not be limited to any of the details in this example.

EXAMPLE

A parallel reactor system including a condensate delivery system comprising an accumulator assembly 513 as depicted in FIG. 23 is used to introduce liquid propylene condensate into the reaction vessels of the reactor module 9M.

In general, with the reactor modules 9M in a benign state, and the reactor covers 195 removed, reaction vials 165 are inserted in the reactor wells 163. Disposable stirrers 175 are attached to the drivers 179 and checked to ensure that the coupling 181 is engaged. Before the covers 195 are re-secured, a metal tool is used to push each vial all the way to the bottom of the reactor well 163, ensuring the vial is not obstructing the cannula passage 215. After the vials are verified to be in the correct position, the reactor covers 195 are secured to the reactor module 9M. The reaction vessels within the module 9M are purged several times with gaseous propylene and then pre-pressurized with propylene to a pressure of from about 120 to about 160 psig (depending on the temperature of the environment and the reactor). The environment inside of the reactor vessels is now saturated with propylene.

The reservoir chamber 518 of the accumulator 513 and flow lines 525 and 535 downstream of valve 523 to pump 543 are charged with propylene condensate and pressurized to 300 psig as described earlier. The flow path 509 is purged of any gas bubbles that may be trapped during the charging and pressurizing of the accumulator 513. A software program is run using a system processor to direct the robot system 23 to move and insert the cannula into the receptacle 553 of the purge station 551 and then to perform three 1.0 ml injections of propylene condensate. A typical reading on indicator 561 after these three purging injections is around 170 psig. This pressure is indicative of the vapor pressure of propylene at room temperature plus an increase in pressure due to the displacement of the headspace volume from the introduced liquid.

After purging, a specified quantity (e.g., 4 ml) of propylene condensate is delivered to the reaction vessels within the module 9M using a software program and the system processor to operate the robot system 23 and the various valves and other components of the condensate delivery system as described above. The sequence is as follows:

The pump 543 and robot arm 307 carrying the cannula 21 are initialized and the robot arm speeds are set as follows (all speeds are in mm/s and acceleration in mm/s$^2$):

```
<XStartSpeed>44.68
<XEndSpeed>100
<XAcceleration>670.2
<YStartSpeed>14.22
<YEndSpeed>100
<YAcceleration>426.6
<ZStartSpeed>9.8
<ZEndSpeed>100
<ZAcceleration>147
```

The cannula 21 is moved to the position shown in FIG. 12 and the robot arm speeds are changed to the following:

```
<XStartSpeed>11.17
<XEndSpeed>893.6
<XAcceleration>800
<YStartSpeed>14.22
<YEndSpeed>312.84
<YAcceleration>900
<ZStartSpeed>9.8
<ZEndSpeed>196
<ZAcceleration>175
```

The cannula 21 is moved to the position shown in FIG. 13 and the robot arm speeds are changed to the following:

```
<XStartSpeed>11.17
<XEndSpeed>893.6
<XAcceleration>900
<YStartSpeed>14.22
<YEndSpeed>312.84
<YAcceleration>800
<ZStartSpeed>9.8
<ZEndSpeed>196
<ZAcceleration>175
```

The cannula 21 is then moved to the position shown in FIGS. 10 and 14 for injection of propylene condensate. The injection sequence is as follows.

The syringe speeds (flow rates) are set to the following (all flow rates are in ml/s and slope in ml/sec$^2$):

```
<Start>150
<Top>150
<Cutoff>150
<Slope>416.666667
```

The syringe pump 543 then aspirates 1.0 ml of propylene condensate. After a delay 0.5 seconds to let things settle, the injection valve 549 is instructed to open after which the syringe pump pushes the 1.0 ml of condensate through delivery line 547. After a delay of 5 seconds to allow the condensate to exit the delivery line 547, the injection valve 549 is instructed to close. This injection sequence is repeated as many times as necessary to deliver the specified amount of propylene condensate to the reaction vessel (e.g., 4 times for 4 ml). Next, a further amount of propylene condensate corresponding to the dead volume (e.g., 200 µl) in flow path 547 downstream of the pump 549 is aspirated into the pump and delivered to the reaction vessel in the same manner in order to compensate for the dead volume present prior to the delivery of the first 1.0 ml portion into the vessel.

The cannula 21 is then moved to the position shown in FIG. 13 and the robot arm speeds and accelerations are set as follows:

```
<XStartSpeed>11.17
<XEndSpeed>893.6
<XAcceleration>1500
<YStartSpeed>14.22
<YEndSpeed>312.84
<YAcceleration>1200
<ZStartSpeed>9.8
<ZEndSpeed>196
<ZAcceleration>500
```

The cannula 21 is then moved to the position shown in FIG. 12 and the robot arm speeds and accelerations are set as follows:

```
<XStartSpeed>11.17
<XEndSpeed>893.6
<XAcceleration>2234
<YStartSpeed>14.22
<YEndSpeed>312.8
<YAcceleration>2844
<ZStartSpeed>9.8
<ZEndSpeed>196
<ZAcceleration>1470
```

The program instructs the robot arm carrying the cannula 21 to proceed to the next reactor vessel and the above sequence of moves and injections is repeated until each of the reaction vessels is loaded with the specified quantity of propylene.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

What is claimed is:

1. Apparatus for parallel processing of multiple reaction mixtures, said apparatus comprising
   a reactor having an exterior surface,
   vessels within the reactor for holding the reaction mixtures comprising a low boiling reaction material delivered to the vessels in the form of a liquid phase condensate, the vessels and reactor adapted to maintain the reaction mixtures in the vessels at a pressure in excess of the vapor pressure of the condensate delivered to the vessels,
   a condensate delivery system comprising a source of the low boiling reaction material, a cannula having an inlet port and an outlet port, and a flow path for the low boiling reaction material from said source to the inlet port of said cannula, the condensate delivery system being adapted for delivering the liquid phase condensate of the low boiling reaction material to the reaction vessels through the cannula, cannula passages in the reactor extending between the exterior surface of the reactor and the vessels, a sealing mechanism in each cannula passage, and a robot system operable to insert the cannula into the cannula passages to a point past the sealing mechanism for the delivery of the condensate from the cannula to a respective vessel, and to withdraw the cannula from the passages after said delivery, the sealing mechanism being adapted to seal the cannula passage upon withdrawal of the cannula from the passage.

2. Apparatus as set forth in claim 1 wherein the low boiling reaction material in said source is maintained at a pressure at least as great as the vapor pressure of the low boiling reaction material condensate.

3. Apparatus as set forth in claim 2 wherein said condensate delivery system further comprises means for cooling the low boiling reaction material in at least a portion of said flow path.

4. Apparatus as set forth in claim 2 further comprising a pressurized reservoir in said flow path, said reservoir containing liquid phase condensate of the low boiling reaction material.

5. Apparatus as set forth in claim 4 wherein said reservoir in said flow path is a reservoir chamber of an accumulator assembly comprising an accumulator vessel containing said reservoir chamber and a second chamber separated from said reservoir chamber by a flexible barrier.

6. Apparatus as set forth in claim 5 wherein the accumulator assembly comprises a bladder-type accumulator vessel.

7. Apparatus as set forth in claim 5 wherein the accumulator assembly comprises a bellows-type accumulator vessel.

8. Apparatus as set forth in claim 2 wherein said condensate delivery system further comprises a pump in the flow path for pumping liquid phase condensate of the low boiling reaction material to the inlet port of said cannula, and an injection valve in said flow path upstream from the inlet port of the cannula adapted to open and deliver a quantity of condensate under pressure to said cannula.

9. Apparatus as set forth in claim 8 further comprising a mount for mounting the cannula on the robot system, said cannula comprising a long metal tube, and wherein said apparatus further comprises a cannula support on the mount engageable with the tube intermediate the ends of the tube for supporting and stabilizing the tube in precise position as the cannula is moved.

10. Apparatus as set forth in claim 9 wherein said injection valve is secured to said cannula mount adjacent said inlet port of the cannula.

11. Apparatus as set forth in claim 1 wherein said condensate delivery system is operable to deliver said condensate to said injection valve at a pressure of at least about 500 psig.

12. Apparatus as set forth in claim 1 wherein said condensate delivery system is operable to deliver said condensate to the inlet port of said cannula at a pressure of at least about 500 psig.

13. Apparatus as set forth in claim 1 wherein said robot system is operable to insert the cannula into each of said cannula passages into a respective vessel for sequential delivery of said condensate into the vessels.

14. Apparatus as set forth in claim 1 wherein said sealing mechanism comprises a valve movable between a closed position for sealing the cannula passage and an open position permitting movement of the cannula through the passage, and a seal in the passage sealingly engageable with the cannula when the valve is in its open position, said seal being located on a side of the valve opposite said vessel.

15. Apparatus as set forth in claim 14 wherein said robot system is operable to insert said cannula into a cannula passage to a delivery position in which the distal end of the cannula is downstream from the valve for delivery of condensate to a respective vessel, then to withdraw the cannula to an intermediate position in which the distal end of the cannula is between the valve and said seal, the robot system holding the cannula in said intermediate position for a dwell period sufficient to allow the valve to close and seal the cannula passage prior to completely withdrawing the cannula from the passage.

16. Apparatus as set forth in claim 15 wherein each of said cannula passages extends at an angle relative to a longitudinal axis of a respective vessel in the reactor.

17. Apparatus as set forth in claim 1 wherein the condensate delivery system further comprises a second cannula having an inlet port and an outlet port, and a flow path for the low boiling reaction material from said source to the inlet port of said second cannula, the condensate delivery system being adapted for delivering the liquid phase condensate of the low boiling reaction material to the reaction vessels through the second cannula, said robot system being operable to insert the second cannula into the cannula passages to a point past the sealing mechanism for the delivery of the condensate from the cannula to a respective vessel, and to withdraw the second cannula from the passages after said delivery, said robot system being further operable to insert the cannulas into said cannula passages of two vessels for simultaneous delivery of said condensate into the vessels.

18. Apparatus for parallel processing of multiple reaction mixtures, said apparatus comprising a reactor having an exterior surface, vessels within the reactor for holding the reaction mixtures comprising a low boiling reaction material delivered to the vessels in the form of a liquid phase condensate, the vessels and reactor adapted to maintain the reaction mixtures in the vessels at a pressure in excess of the vapor pressure of the condensate delivered to the vessels, a condensate delivery system comprising a source of the low boiling reaction material, a cannula having an inlet port and an outlet port, a flow path for the low boiling reaction material from said source to the inlet port of said cannula, and means for cooling the low boiling reaction material in at least a portion of said flow path, the condensate delivery system being adapted for delivering the liquid phase condensate of the low boiling reaction material to the reaction vessels through the cannula, cannula passages in the reactor extending between the exterior surface of the reactor and the vessels, each of said cannula passages extending at an angle relative to a longitudinal axis of a respective vessel in the reactor, a sealing mechanism in each cannula passage, and a robot system operable to insert the cannula into the cannula passages to a point past the sealing mechanism for the delivery of the condensate from the cannula to a respective vessel, and to withdraw the cannula from the passages after said delivery, the sealing mechanism being adapted to seal the cannula passage upon withdrawal of the cannula from the passage.

19. Apparatus as set forth in claim 18 further comprising a pressurized reservoir in said flow path, said reservoir containing liquid phase condensate of the low boiling reaction material.

20. Apparatus as set forth in claim 19 wherein said reservoir in said flow path is a reservoir chamber of an accumulator assembly comprising an accumulator vessel containing said reservoir chamber and a second chamber separated from said reservoir chamber by a flexible barrier.

21. Apparatus as set forth in claim 18 wherein said condensate delivery system further comprises a pump in the flow path for pumping liquid phase condensate of the low boiling reaction material to the inlet port of said cannula, and an injection valve in said flow path upstream from the inlet port of the cannula adapted to open and deliver a quantity of condensate under pressure to said cannula.

22. Apparatus as set forth in claim 21 further comprising a mount for mounting the cannula on the robot system, said cannula comprising a long metal tube, and wherein said apparatus further comprises a cannula support on the mount engageable with the tube intermediate the ends of the tube for supporting and stabilizing the tube in precise position as the cannula is moved.

23. Apparatus as set forth in claim 22 wherein said injection valve is secured to said cannula mount adjacent said inlet port of the cannula.

* * * * *